(12) United States Patent
Matsuyama et al.

(10) Patent No.: US 10,384,322 B2
(45) Date of Patent: *Aug. 20, 2019

(54) LUBRICANT MATERIAL FOR ASSISTING MACHINING PROCESS AND MACHINING METHOD

(71) Applicant: Mitsubishi Gas Chemical Company, Inc., Tokyo (JP)

(72) Inventors: Yousuke Matsuyama, Yonezawa (JP); Takaaki Ogashiwa, Yonezawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/750,431

(22) PCT Filed: Aug. 4, 2016

(86) PCT No.: PCT/JP2016/072929
§ 371 (c)(1),
(2) Date: Feb. 5, 2018

(87) PCT Pub. No.: WO2017/022822
PCT Pub. Date: Feb. 9, 2017

(65) Prior Publication Data
US 2018/0229339 A1 Aug. 16, 2018

(30) Foreign Application Priority Data

Aug. 6, 2015 (JP) .................................. 2015-156386
Nov. 5, 2015 (JP) .................................. 2015-217797
(Continued)

(51) Int. Cl.
*B23Q 11/10* (2006.01)
*B23B 35/00* (2006.01)
(Continued)

(52) U.S. Cl.
CPC .......... *B23Q 11/1046* (2013.01); *B23B 35/00* (2013.01); *B23Q 11/10* (2013.01);
(Continued)

(58) Field of Classification Search
CPC ............. B23Q 11/1046; C10M 107/12; C10M 107/24; C10M 107/32; C10M 107/26;
(Continued)

(56) References Cited

U.S. PATENT DOCUMENTS

| 5,026,612 A * | 6/1991 | Selwood .............. B23K 11/185 29/469.5 |
|---|---|---|
| 2005/0003169 A1 | 1/2005 | Ikeguchi |
| 2015/0125228 A1 | 5/2015 | Sugimoto et al. |

FOREIGN PATENT DOCUMENTS

| CN | 102504909 A | 6/2012 |
| CN | 104245256 A | 12/2014 |

(Continued)

OTHER PUBLICATIONS https://www.sigmaaldrich.com/catalog/product/aldrich/808113?lang=en&region=US (Year: 2018).*

(Continued)

*Primary Examiner* — Taiwo Oladapo
(74) *Attorney, Agent, or Firm* — Fitch, Even, Tabin & Flannery LLP

(57) ABSTRACT

The present invention provides a lubricant material for assisting machining process comprising a high molecular weight compound (A) having a weight average molecular weight of $5\times10^4$ or higher and $1\times10^6$ or lower, a medium molecular weight compound (B) having a weight average molecular weight of $1\times10^3$ or higher and lower than $5\times10^4$, and a carbon (C) having an average particle size of 100 μm or larger.

25 Claims, 12 Drawing Sheets

(30) Foreign Application Priority Data

| Nov. 5, 2015 | (JP) | 2015-217799 |
| Nov. 9, 2015 | (JP) | 2015-219830 |
| Nov. 9, 2015 | (JP) | 2015-219832 |
| Nov. 11, 2015 | (JP) | 2015-221031 |
| Nov. 11, 2015 | (JP) | 2015-221032 |
| Nov. 11, 2015 | (JP) | 2015-221629 |
| Nov. 11, 2015 | (JP) | 2015-221630 |

(51) Int. Cl.
```
C10M 107/12      (2006.01)
C10M 107/24      (2006.01)
C10M 107/26      (2006.01)
C10M 107/28      (2006.01)
C10M 107/32      (2006.01)
C10M 111/04      (2006.01)
C09J 201/00      (2006.01)
C09J 7/20        (2018.01)
C10M 125/02      (2006.01)
C10M 103/02      (2006.01)
C10M 107/00      (2006.01)
C10M 107/34      (2006.01)
C10M 107/36      (2006.01)
C10M 107/38      (2006.01)
C10M 107/42      (2006.01)
C10M 107/44      (2006.01)
C10N 20/04       (2006.01)
C10N 20/06       (2006.01)
C10N 30/16       (2006.01)
C10N 30/18       (2006.01)
C10N 40/20       (2006.01)
```
(52) U.S. Cl.
CPC ............... *C09J 7/20* (2018.01); *C09J 201/00* (2013.01); *C10M 107/12* (2013.01); *C10M 107/24* (2013.01); *C10M 107/26* (2013.01); *C10M 107/28* (2013.01); *C10M 107/32* (2013.01); *C10M 111/04* (2013.01); *C10M 125/02* (2013.01); *C10M 103/02* (2013.01); *C10M 107/00* (2013.01); *C10M 107/34* (2013.01); *C10M 107/36* (2013.01); *C10M 107/38* (2013.01); *C10M 107/42* (2013.01); *C10M 107/44* (2013.01); *C10M 2201/041* (2013.01); *C10N 2020/04* (2013.01); *C10N 2020/06* (2013.01); *C10N 2030/16* (2013.01); *C10N 2030/18* (2013.01); *C10N 2040/20* (2013.01)

(58) Field of Classification Search
CPC ............... C10M 125/02; C10M 107/28; C10M 111/04; C10M 2201/041; C10N 2020/06; C10N 2030/16; C10N 2020/04; C10N 2030/18; C10N 2040/20
See application file for complete search history.

(56) References Cited

FOREIGN PATENT DOCUMENTS

| EP | 0642297 A | 3/1995 |
| JP | S50-053768A A | 5/1975 |
| JP | S58-019716 B2 | 4/1983 |
| JP | 2003-301187 A | 10/2003 |
| JP | 2005-019657 A | 1/2005 |
| JP | 2006-150557 A | 6/2006 |
| JP | 2008-222762 A | 9/2008 |
| JP | 2008222762 A * | 9/2008 |
| JP | 2012-210689 A | 11/2012 |
| JP | 2014-019157 A | 2/2014 |

OTHER PUBLICATIONS

Zalucha et al., The Chemistry of Structural Adhesives: Epoxy, Urethane, and Acrylic Adhesives, 2007, p. 291 (Year: 2007).*

* cited by examiner

LUBRICANT MATERIAL FOR ASSISTING MACHINING PROCESS AND MACHINING METHOD

CROSS-REFERENCE TO RELATED APPLICATIONS

This application is a U.S. national phase application filed under 35 U.S.C. § 371 of International Application PCT/JP2016/072929, filed on Aug. 4, 2016, designating the United States, which claims priority from Japanese Application Number 2015-156386, filed Aug. 6, 2015; Japanese Application Number 2015-217797, filed Nov. 5, 2015; Japanese Application Number 2015-217799, filed Nov. 5, 2015; Japanese Application Number 2015-219830, filed Nov. 9, 2015; Japanese Application Number 2015-219832, filed Nov. 9, 2015; Japanese Application Number 2015-221629, filed Nov. 11, 2015; Japanese Application Number 2015-221630, filed Nov. 11, 2015; Japanese Application Number 2015-221031, filed Nov. 11, 2015; and Japanese Application Number 2015-221032, filed Nov. 11, 2015.

FIELD OF THE INVENTION

The present invention relates to a lubricant material for assisting machining process and a machining method.

BACKGROUND OF THE INVENTION

Fiber reinforced composite materials typified by fiber reinforced plastics (FRP), in particular, carbon fiber reinforced plastics (CFRP), have large tensile strength and tensile elastic force and small density, as compared with glass fiber reinforced plastics (GFRP), aramid fiber reinforced plastics (AFRP), or stainless steel (SUS), and have therefore tended to be frequently used as outer panels or the like of aircrafts or vehicles in recent years. In this context, CFRP refers to plastics prepared by hot molding or hot press molding one or two or more layers of prepregs containing carbon fiber impregnated with a matrix resin. A member formed from this CFRP is fixed to a structure using a fastening factor such as a bolt or a rivet. Therefore, machining work, in particular, machining work to make many holes for passing a fastening factor in CFRP, is necessary for fixing CFRP to a structure such as an aircraft part.

Some techniques have already been proposed in order to obtain high quality holes by the machining process of CFRP. Examples of such a technique include a method which involves gradually changing the shape of a tool, for example, the curvature of a machining face or the point angle of a drill (see, for example, Patent Literature 1).

Materials for the bodywork structures (structural materials) of aircrafts are composed mainly of metal materials, most of which are occupied by aluminum alloy. Heat resistant alloy such as titanium alloy or stainless steel is used in a site capable of becoming a higher temperature, for example, a jet exhaust site or the neighborhood of an afterburner, in a bodywork structure. If the speed up of aircrafts will progress in the future, the strength of conventional aluminum alloy will be reduced due to aerodynamic heating. Therefore, it is expected that harder titanium alloy or stainless steel will be used as main structural materials for bodywork structures. These structural materials constituting the bodyworks of aircrafts need to undergo drilling work with a drill for bolting metal materials or a metal material with another structural material such as CFRP.

Some techniques have already been proposed for such drilling work of metals. For example, a titanium alloy material is a difficult-to-machining material and therefore shortens a drill lifespan very much. In response to such a problem, for example, a processing method which involves spraying a machining oil, and a method which involves changing the shape of a drill to thereby reduce load to the drill and circumvent reduction in the lifespan of the drill are listed (see, for example, Patent Literature 2).

CITATION LIST

Patent Literature

Patent Literature 1: Japanese Patent Laid-Open No. 2012-210689
Patent Literature 2: Japanese Patent Laid-Open No. 2006-150557

SUMMARY OF INVENTION

Machining process of fiber reinforced composite materials, is typically performed using a drill. In the general drilling with a drill, the drill has an exceedingly short lifespan, and the drill bit suffers abrasion with increase in the number of processed holes, resulting in reduction in the quality of processed holes. Specifically, the processed holes are more likely to have a small inside diameter, and the splintering of carbon fiber (which is a phenomenon in which a part of fiber constituting a fiber reinforced composite material remains as burrs around processed holes without being cut off) occurs easily at the exit portion of drill penetration. Furthermore, peeling between layers of prepregs constituting a fiber reinforced composite material (hereinafter, referred to as "delamination") also occurs easily. In addition, each processed hole has a nonuniform inside diameter due to the abrasion of a drill bit, and delamination may occur from the irregularity of the processed hole. Such a phenomenon is accepted as a serious defect. As mentioned above, the abrasion of a drill bit is likely to cause problems associated with the quality of processed holes. Meanwhile, for example, the production of structures using CFRP for aircrafts particularly requires high quality machining process. Thus, it is very important to solve the problems described above, such as splintering and delamination.

In the machining work of CFRP, the problems associated with the quality of processed holes arise more easily as the abrasion of a machining tool proceeds with machining resistance increased. Particularly, for example, high strength CFRP intended for aircrafts contains carbon fiber at a high density. Therefore, the frequency of rubbing of carbon fiber by a drill is increased so that the abrasion of the machining tool proceeds more rapidly. As measures against this, the tool is changed at shorter intervals in order to maintain hole quality. Under present circumstances, the ratio of tooling cost to processing cost is high.

In this respect, as described in Patent Literature 1, improvement in the workability of fiber reinforced composite materials (e.g., CFRP), for which machining process is difficult, has been studied in terms of tools, but has produced insufficient effects.

The machining process of metals is typically performed using a drill. Even if a drill dedicated to metals is used, the drill has a short lifespan. In the case of using a general drill, the drill has an exceedingly short lifespan. Furthermore, the drill bit suffers abrasion with increase in the number of processed holes, resulting in reduction in the quality of processed holes. Specifically, the processed holes are more likely to have a small inside diameter, and burrs also occur easily at the exit portion of drill penetration. In addition, the abrasion of the drill may create the space between a metal material and another structural material (e.g., CFRP) to be bolted. Thus, uplift may arise between these structural materials, or scraps may enter the created space. Such a phenomenon is accepted as a serious defect. As mentioned above, the abrasion of a drill bit is likely to cause problems associated with the quality of processed holes. Under these circumstances, for example, the production of structures using titanium alloy materials for aircrafts particularly requires high quality drilling work. Thus, it is very important to solve the problems described above, such as drill lifespans and uplift between a metal material and a different structural material.

In the case of performing the drilling work of metals using a drill, the heat or friction is generated between the rotating drill and a metal and locally elevates the ambient temperature of a processed hole. Thus, when the number of processed holes is large, heat accumulates on the drill and the workpiece material metal with increase in the number of processed holes. Since a metal having low thermal conductivity insufficiently releases heat, the ambient temperature of a processed hole is elevated. In this respect, the metal is softened as its temperature is elevated. Therefore, burrs occur at the exit portion of drill penetration of the processed hole. Also, metal scraps adhere to the drill due to processing heat so that excessive load may be applied to the drill to halt the processing apparatus. As mentioned above, heat accumulation at the time of drilling work is likely to cause problems associated with the quality of processed holes. Under these circumstances, for example, the production of structures using titanium alloy materials for aircrafts particularly requires high quality drilling work. Thus, it is very important to solve the problems associated with burrs as described above.

In order to prevent such heat accumulation on a processing site and a drill, wet work using a machining oil or the like has heretofore been performed. However, the wet work requires a washing step at the completion of machining process. If an oil remains around or inside processed holes, there is the possibility that a screw serving as a fastener for fastening at through-holes is deteriorated or a fastening portion is loosened. These problems might lead to a deadly accident.

In this respect, as described in Patent Literature 2, improvement in the workability of metals, for which machining process is difficult, has been studied in terms of machining tools or machining methods, but has produced insufficient effects.

Conventional processing methods are more likely to cause the abrasion of a drill with increase in the diameters of holes and the diameter of a drill bit used, as compared with the drilling work of small holes. Unfortunately, this facilitates causing burrs, chippings, or splintering at the entry portion or the exit portion of drill penetration (hereinafter, these portions are also collectively referred to as the "periphery of a machined portion"). This is because a larger diameter of a drill bit increases the volume of a workpiece material to be removed by machining process and increases load to the drill bit.

Moreover, conventional processing methods are more likely to cause the abrasion of a machining tool with increase in the thickness of a workpiece material, as compared with the processing of a workpiece material having a small thickness. Unfortunately, this facilitates causing burrs, chippings, or splintering at the entry portion or the exit portion of machining tool penetration (hereinafter, these portions are also collectively referred to as the "periphery of a machined portion"). This is because a larger thickness of a workpiece material increases the volume of the workpiece material to be removed by machining process and increases load to a machining tool.

The present invention has been made in light of the problems described above, and an object of the present invention is to provide a lubricant material for assisting machining process which can reduce load to a machining tool in the machining process of a workpiece material (particularly, the machining process of a difficult-to-machining material having a curved surface, the machining process of a difficult-to-machining material to form holes having a large diameter, or the machining process of a thick difficult-to-machining material) and can thereby reduce the occurrence of chippings, burrs, or splintering at the periphery of a machined portion, and a machining method using the lubricant material for assisting machining process. The "difficult-to-machining material" refers to a fiber reinforced composite material, a difficult-to-machining metal material, or a composite material of the fiber reinforced composite material and the difficult-to-machining metal material.

The present inventors have conducted diligent studies to attain the object. As a result, the present inventors have completed the present invention by finding that the object can be attained by a lubricant material for assisting machining process comprising a high molecular weight compound (A), a medium molecular weight compound (B), and a carbon (C) having a predetermined average particle size.

Specifically, the present invention is as follows:

[1]

A lubricant material for assisting machining process comprising:

a high molecular weight compound (A) having a weight average molecular weight of $5\times10^4$ or higher and $1\times10^6$ or lower;

a medium molecular weight compound (B) having a weight average molecular weight of $1\times10^3$ or higher and lower than $5\times10^4$; and a carbon (C) having an average particle size of 100 μm or larger.

[2]

The lubricant material for assisting machining process according to [1], wherein the lubricant material for assisting machining process is used in a machining method comprising a machining step of machining a workpiece material with a machining tool while bringing the lubricant material for assisting machining process into contact with the machining tool and/or the to-be-processed portion of the workpiece material.

[3]

The lubricant material for assisting machining process according to [1] or [2], wherein a shape of the carbon (C) is a flake shape.

[4]

The lubricant material for assisting machining process according to any one of [1] to [3], wherein the high molecular weight compound (A) is a thermoplastic resin having a weight average molecular weight of $5\times10^4$ or higher and $1\times10^6$ or lower, and the medium molecular weight compound (B) is a thermoplastic resin having a weight average molecular weight of $1\times10^3$ or higher and $2\times10^4$ or lower.

[5]

The lubricant material for assisting machining process according to any one of [1] to [4], wherein the high molecular weight compound (A) comprises a water soluble thermoplastic resin and/or a non-water soluble thermoplastic resin, wherein the water soluble thermoplastic resin is one or more resins selected from the group consisting of a polyalkylene oxide compound, a polyalkylene glycol compound, an ester compound of polyalkylene glycol, an ether compound of polyalkylene glycol, a monostearate compound of polyalkylene glycol, a water soluble urethane, a water soluble polyether resin, a water soluble polyester, sodium poly(meth)acrylate, polyacrylamide, polyvinylpyrrolidone, polyvinyl alcohol, saccharides, and modified polyamide, and the non-water soluble thermoplastic resin is one or more resins selected from the group consisting of a urethane polymer, an acrylic polymer, a vinyl acetate polymer, a vinyl chloride polymer, a polyester polymer, a polystyrene resin, and a copolymer thereof.

[6]

The lubricant material for assisting machining process according to any one of [1] to [5], wherein the medium molecular weight compound (B) is one or more compounds selected from the group consisting of a polyalkylene glycol compound, a monoether compound of polyalkylene oxide, a monostearate compound of polyalkylene oxide, and a polyalkylene oxide compound.

[7]

The lubricant material for assisting machining process according to any one of [1] to [6], wherein a content of the high molecular weight compound (A) is 20 to 60 parts by mass with respect to 100 parts by mass in total of the high molecular weight compound (A), the medium molecular weight compound (B), and the carbon (C), a content of the medium molecular weight compound (B) is 10 to 75 parts by mass with respect to 100 parts by mass in total of the high molecular weight compound (A), the medium molecular weight compound (B), and the carbon (C), and a content of the carbon (C) is 5 to 70 parts by mass with respect to 100 parts by mass in a total of the high molecular weight compound (A), the medium molecular weight compound (B), and the carbon (C).

[8]

The lubricant material for assisting machining process according to any one of [1] to [7], wherein the lubricant material for assisting machining process has a sheet shape having a thickness of 0.1 mm or larger and 20 mm or smaller.

[9]

The lubricant material for assisting machining process according to any one of [1] to [8], wherein a flexible volume is 5 mm or larger.

[10]

The lubricant material for assisting machining process according to any one of [1] to [9], further comprising an adhesive layer on a face to be brought into contact with the workpiece material.

[11]

The lubricant material for assisting machining process according to [10], wherein the adhesive layer comprises an acrylic polymer.

[12]

The lubricant material for assisting machining process according to any one of [1] to [11], wherein when the lubricant material for assisting machining process is removed from the workpiece material after machining the workpiece material, a total amount of components of the lubricant material for assisting machining process and the adhesive layer attached to the workpiece material is $1.0 \times 10^{-8}$ g or smaller per $mm^2$ of a total of an area of the contact portion between the workpiece material and the lubricant material for assisting machining process and an area of the machined portion.

[13]

A machining method comprising a machining step of forming a machined portion by machining a workpiece material with a machining tool while bringing a lubricant material for assisting machining process according to any of [1] to [12] into contact with the machining tool and/or the to-be-processed portion of the workpiece material, wherein the workpiece material comprises a fiber reinforced composite material, a difficult-to-machining metal material, or a composite material of the fiber reinforced composite material and the difficult-to-machining metal material.

[14]

The machining method according to [13], wherein the machining step is a step of forming a machined portion having an exit and an entrance of the machining tool, and the machining method comprises, before the machining step, a close contact step of closely bringing in advance the lubricant material for assisting machining process into contact with a portion to be the exit and/or a portion to be an entry of the machining tool, in the workpiece material.

[15]

The machining method according to [14], wherein in the close contact step, the lubricant material for assisting machining process is closely brought in advance into contact with a portion to be the exit of the machining tool, in the workpiece material.

[16]

The machining method according to [14] or [15], wherein in the close contact step, the lubricant material for assisting machining process is closely brought in advance into contact with a portion to be the entry of the machining tool, in the workpiece material.

[17]

The machining method according to any one of [13] to [16], wherein the machining method comprises, before the machining step, a contact step of bringing in advance the lubricant material for assisting machining process into contact with the machining tool.

[18]

The machining method according to any one of [13] to [17], wherein in the machining step, the machined portion is formed by machining the workpiece material closely brought into contact with the lubricant material for assisting machining process in a state where another lubricant material for assisting machining process is brought into contact with the machining tool.

[19]

The machining method according to any one of [13] to [18], wherein the thickness of the workpiece material is 10 mm or larger.

[20]

The machining method according to any one of [13] to [19], wherein in the machining step, a hole is opened by drilling work using a drill as the machining tool.

[21]

The machining method according to [20], wherein a diameter of the hole is 10 mm or larger.

[22]

The machining method according to any one of [13] to [21], wherein the fiber reinforced composite material is a carbon fiber reinforced plastic.

[23]

The machining method according to any one of [13] to [22], wherein the difficult-to-machining metal material comprises at least one member selected from the group consisting of titanium alloy, aluminum alloy, magnesium alloy, low alloy steel, stainless steel, and heat resistant alloy.

[24]

The machining method according to [23], wherein the difficult-to-machining metal material is Ti-6Al-4V titanium alloy.

[25]

The machining method according to any one of [13] to [24], wherein the to-be-processed portion of the workpiece material has a curved surface.

The present invention can provide a lubricant material for assisting machining process which can reduce load to a machining tool in the machining process of a workpiece material (particularly, the machining process of a difficult-to-machining material having a curved surface, the machining process of a difficult-to-machining material to form holes having a large diameter, or the machining process of a thick difficult-to-machining material) and can thereby reduce the occurrence of chippings, burrs, or splintering at the periphery of a machined portion, and a machining method using the lubricant material for assisting machining process.

DESCRIPTION OF EMBODIMENTS

Hereinafter, the mode for carrying out the present invention (hereinafter, referred to as the "present embodiment") will be described in detail. However, the present invention is not intended to be limited by the present embodiment, and various changes or modifications can be made without departing from the spirit of the present invention.

[Lubricant Material for Assisting Machining Process]

The lubricant material for assisting machining process of the present embodiment comprises a high molecular weight compound (A) having a weight average molecular weight of $5 \times 10^4$ or higher and $1 \times 10^6$ or lower, a medium molecular weight compound (B) having a weight average molecular weight of $1 \times 10^3$ or higher and lower than $5 \times 10^4$, and a carbon (C) having an average particle size of 100 μm or larger.

The lubricant material for assisting machining process of the present embodiment can be used in a machining method comprising a machining step of machining a workpiece material with a machining tool while bringing the lubricant material for assisting machining process into contact with the machining tool and/or the to-be-processed portion of the workpiece material. The shape of the lubricant material for assisting machining process is not particularly limited as long as the lubricant material for assisting machining process is in a form that can be used in a machining method mentioned later. Examples thereof include a lubricant material for assisting machining process having a sheet shape, a lubricant material for assisting machining process in a block state such as a round bar shape or a square bar shape, and a lubricant material for assisting machining process in a melted state.

Figure 1:
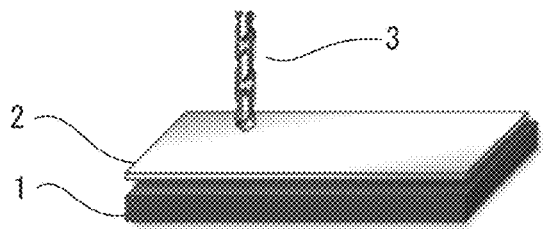
FIG. 1 shows a schematic diagram illustrating one embodiment of the machining method of the present embodiment.
Figure 2:
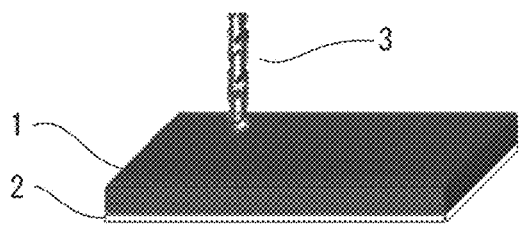
FIG. 2 shows a schematic diagram illustrating another embodiment of the machining method of the present embodiment.
Figure 3:
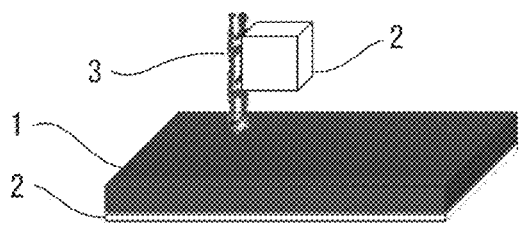
FIG. 3 shows a schematic diagram illustrating a further alternative embodiment of the machining method of the present embodiment.
Figure 4:
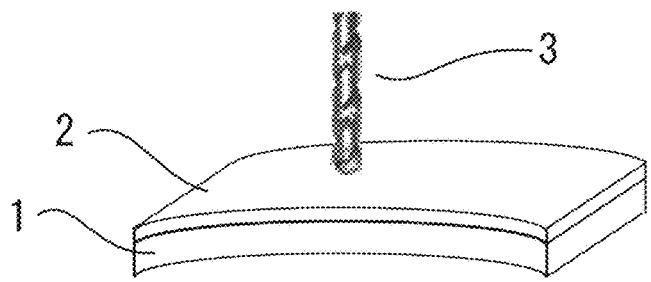
FIG. 4 shows a schematic diagram illustrating a further alternative embodiment of the machining method of the present embodiment.

FIG. 1 shows a schematic diagram illustrating one embodiment of the lubricant material for assisting machining process of the present embodiment (also see FIGS. 2 to 4). As shown in FIG. 1, a lubricant material for assisting machining process 2 of the present embodiment is used in the machining process (e.g., drilling work) of a workpiece material 1, particularly, a difficult-to-machining material. Specifically, in FIG. 1, the lubricant material for assisting machining process 2 is placed on the surface of the workpiece material 1, and the workpiece material 1 is processed using a machining tool 3 from the lubricant material for assisting machining process 2 side. The lubricant material for assisting machining process of the present embodiment can be preferably used not only when the to-be-processed portion of the workpiece material has a flat surface but when the to-be-processed portion has a curved surface, as with the flat surface (FIG. 4). Specifically, the lubricant material for assisting machining process of the present embodiment, which has a high molecular weight compound (A) and a medium molecular weight compound (B), is excellent in flexibility and to-be-processed portion following properties, and permits machining process in close contact with a workpiece material having a curved surface. The lubricant material for assisting machining process of the present embodiment preferably has a configuration that impairs neither the flexibility of a sheet itself nor its to-be-processed portion following properties, and specifically, is preferably in a form free from thick metal foil or the like, though the configuration is not particularly limited thereto. This further improves the machining processability of the workpiece material having a curved surface. Also, the lubricant material for assisting machining process free from metal foil can prevent the workpiece material from being contaminated by the adhesion of metal foil-derived metal scraps to the workpiece material. As a result, this machining process can form a machined portion superior in quality to that of the machining process of conventional techniques.

The lubricant material for assisting machining process of the present embodiment may be a monolayer body containing only a high molecular weight compound (A), a medium molecular weight compound (B), and a carbon (C) having an average particle size of 100 μm or larger, or may be used in the form of a multilayer body having a layer containing a high molecular weight compound (A), a medium molecular weight compound (B), and a carbon (C) having an average particle size of 100 μm or larger, and an additional layer. Examples of the additional layer include an adhesive layer for improving the adhesion between the lubricant material for assisting machining process and the workpiece material, and a protective layer for preventing scratches on the surface of the lubricant material for assisting machining process. The lubricant material for assisting machining process of the present embodiment in the form of a multilayer body or molded into a sheet shape can also be referred to as a "lubricant sheet for assisting machining process". The lubricant material for assisting machining process in the form of a multilayer body, i.e., the lubricant sheet for assisting machining process, may have a layer consisting of the lubricant material for assisting machining process and an additional layer.

Use of the lubricant material for assisting machining process of the present embodiment in machining process can reduce load to a machining tool (e.g., a drill), suppress the abrasion of the machining tool, and prolong the lifespan of the machining tool. As a result, cost required for machining tools, the number of runs of a machining tool change step, or the like can be reduced. Thus, machining process excellent in productivity is achieved. In this context, the "machining process" is not particularly limited as long as the machining process is a process to machine a workpiece material. Examples thereof include drilling work, grooving work, turning work, and parting work. Among them, the lubricant material for assisting machining process of the present embodiment is suitable for drilling work using a drill.

Furthermore, use of the lubricant material for assisting machining process of the present embodiment in the machining process of a fiber reinforced composite material can suppress the occurrence of chippings or splintering at the periphery of a machined portion. As a result, a higher quality machined portion than that of conventional methods can be obtained.

Moreover, use of the lubricant material for assisting machining process of the present embodiment in the machining process of a difficult-to-machining metal material permits effective absorption of heat accumulating at the periphery of a machined portion at the time of machining process. This can prevent burrs or chippings from occurring at the periphery of a machined portion due to heat accumulation. Therefore, high quality machining process can be performed. For example, drilling work is capable of forming drilled holes superior in productivity and quality to those of conventional techniques.

The "machined portion" refers to a space removed with a machining tool, in the workpiece material. The "to-be-processed portion" of the workpiece material refers to a portion that will be removed with a machining tool, in the workpiece material. The "periphery of a machined portion" conceptually refers to a machined portion and its neighborhood and conceptually includes a portion contacted with the machining tool (inside wall and outer edges of the machined portion), in the workpiece material, and its surrounding portions that are influenced by the machining. For example, in the case of forming a hole (machined portion) by drilling work, the periphery of a machined portion includes the edge of the entrance and the edge of the exit of the hole. In the case of forming a groove by grooving work, the periphery of a machined portion includes the edge of the groove. In the case of machining the surface of the workpiece material by turning work, the periphery of a machined portion includes a portion contacted with the machining tool, in the workpiece material.

Hereinafter, the configuration of the lubricant material for assisting machining process of the present embodiment will be described in more detail.

[High Molecular Weight Compound (A)]

The high molecular weight compound (A) can function as a lubricant agent and is capable of exerting the effects of improving the lubricity of the lubricant material for assisting machining process and suppressing the occurrence of chippings, burrs, or splintering at the periphery of a machined portion. The high molecular weight compound (A) can further function as a molding agent and improves the moldability of the lubricant material for assisting machining process. This permits molding of the lubricant material for assisting machining process into various shapes and also permits formation of a monolayer (a layer (sheet) can be formed in itself without the use of a support base material). The high molecular weight compound (A) also has the effect of improving the machining processability of a curved surface by imparting following properties and tenacity to the lubricant material for assisting machining process.

The high molecular weight compound (A) is not particularly limited as long as its weight average molecular weight is $5 \times 10^4$ or higher and $1 \times 10^6$ or lower. Examples thereof include water soluble thermoplastic resins, non-water soluble thermoplastic resins, water soluble thermosetting resins, and non-water soluble thermosetting resins. Among them, a water soluble thermoplastic resin and/or a non-water soluble thermoplastic resin is preferred, and a water soluble thermoplastic resin is more preferred. Examples of the water soluble thermoplastic resin and the non-water soluble thermoplastic resin include, but are not particularly limited to, water soluble resins and non-water soluble resins described below. The "water soluble resin" refers to a high molecular compound that is dissolved in an amount of 1 g or larger with respect to 100 g of water at 25° C. at 1 atm. One high molecular weight compound (A) may be used alone, or two or more thereof may be used in combination.

Use of the water soluble resin tends to improve scrap eliminating properties at the time of machining process by the lubricity of the water soluble resin. Also, use of the water soluble resin moderately softens the surface hardness of the lubricant material for assisting machining process and therefore tends to be able to further reduce load to the machining tool. Furthermore, a resin component attached to the machined portion and its neighborhood can be easily removed after the machining process. Examples of the water soluble thermoplastic resin include, but are not particularly limited to: polyalkylene oxide compounds such as polyethylene oxide, polypropylene oxide, and polyethylene oxide-propylene oxide copolymers; polyalkylene glycol compounds such as polyethylene glycol and polypropylene glycol; ester compounds of polyalkylene glycol; ether compounds of polyalkylene glycol; monostearate compounds of polyalkylene glycol, such as polyethylene glycol monostearate, polypropylene glycol monostearate, and polyglycerin monostearate; water soluble urethanes; water soluble polyether resins; water soluble polyesters; sodium poly(meth)acrylate; polyacrylamide; polyvinylpyrrolidone; polyvinyl alcohol; saccharides such as cellulose and derivatives thereof; and modified polyamide. Among them, polyethylene oxide, polyethylene glycol, and a water soluble polyether resin are preferred from the viewpoint described above.

Use of the non-water soluble resin tends to increase the surface hardness of the lubricant material for assisting machining process, as compared with use of the water soluble resin. This improves the biting performance of a drill, for example, at the time of drilling work, can be opened a hole at a position as designed, further improves the rigidity of the lubricant material for assisting machining process, and improves handleability. Examples of the non-water soluble thermoplastic resin include, but are not particularly limited to: urethane polymers; acrylic polymers; vinyl acetate polymers; vinyl chloride polymers; polyester polymers; polystyrene resins exemplified by polyethylene wax, styrene homopolymers (GPPS), styrene-butadiene copolymers (HIPS), and styrene-(meth)acrylic acid copolymers (e.g., MS resin); and copolymers thereof.

The weight average molecular weight of the high molecular weight compound (A) is $5 \times 10^4$ or higher, preferably $6 \times 10^4$ or higher, more preferably $1 \times 10^5$ or higher, further preferably $1.25 \times 10^5$ or higher. Also, the weight average molecular weight of the high molecular weight compound (A) is $1 \times 10^6$ or lower, preferably $8 \times 10^5$ or lower, more preferably $7 \times 10^5$ or lower, further preferably $6 \times 10^5$ or lower. When the weight average molecular weight of the high molecular weight compound (A) is $5 \times 10^4$ or higher, the moldability of the lubricant material for assisting machining process is further improved, and following properties and tenacity can be imparted to the lubricant material for assisting machining process. This tends to improve the machining processability of a curved surface. When the weight average molecular weight of the high molecular weight compound (A) is $1 \times 10^6$ or lower, the lubricity is further improved. In the case of using two or more high molecular weight compounds (A), it is preferred that the respective weight average molecular weights of these compounds should satisfy the weight average molecular weight described above. In the present embodiment, the weight average molecular weight can be measured by a method described in Examples (the same holds true for the description below).

The high molecular weight compound (A) may comprise a high molecular weight compound (A-1) having a weight average molecular weight of $3 \times 10^5$ or higher and $1 \times 10^6$ or lower and/or a high molecular weight compound (A-2) having a weight average molecular weight of $5 \times 10^4$ or higher and lower than $3 \times 10^5$, and preferably comprises both of the high molecular weight compound (A-1) and the high molecular weight compound (A-2). Combined use of the high molecular weight compound (A-1) and the high molecular weight compound (A-2) tends to further improve the moldability and the lubricity.

The weight average molecular weight of the high molecular weight compound (A-1) is $3\times10^5$ or higher, preferably $4\times10^5$ or higher, more preferably $4.5\times10^5$ or higher, further preferably $5\times10^5$ or higher. Also, the weight average molecular weight of the high molecular weight compound (A-1) is $1\times10^6$ or lower, preferably $8\times10^5$ or lower, more preferably $7\times10^5$ or lower, further preferably $6\times10^5$ or lower.

The content of the high molecular weight compound (A-1) in the lubricant material for assisting machining process is preferably 5 parts by mass or larger, more preferably 10 parts by mass or larger, further preferably 15 parts by mass or larger, with respect to 100 parts by mass in total of the high molecular weight compound (A), the medium molecular weight compound (B), and the carbon (C). Also, the content of the high molecular weight compound (A-1) in the lubricant material for assisting machining process is preferably 35 parts by mass or smaller, more preferably 30 parts by mass or smaller, further preferably 25 parts by mass or smaller, with respect to 100 parts by mass in total of the high molecular weight compound (A), the medium molecular weight compound (B), and the carbon (C). When the content of the high molecular weight compound (A-1) is 5 parts by mass or larger, the moldability tends to be further improved. Also, there is a tendency to improve the following properties and tenacity of the lubricant material for assisting machining process and improve the machining processability of a curved surface. When the content of the high molecular weight compound (A-1) is 35 parts by mass or smaller, the lubricity tends to be further improved.

The weight average molecular weight of the high molecular weight compound (A-2) is $5\times10^4$ or higher, preferably $6\times10^4$ or higher, more preferably $1\times10^5$ or higher, further preferably $1.25\times10^5$ or higher. Also, the weight average molecular weight of the high molecular weight compound (A-2) is lower than $3\times10^5$, preferably $2.5\times10^5$ or lower, more preferably $2\times10^5$ or lower.

The content of the high molecular weight compound (A-2) in the lubricant material for assisting machining process is preferably 5 parts by mass or larger, more preferably 10 parts by mass or larger, further preferably 15 parts by mass or larger, with respect to 100 parts by mass in total of the high molecular weight compound (A), the medium molecular weight compound (B), and the carbon (C). Also, the content of the high molecular weight compound (A-2) in the lubricant material for assisting machining process is preferably 35 parts by mass or smaller, more preferably 30 parts by mass or smaller, further preferably 25 parts by mass or smaller, with respect to 100 parts by mass in total of the high molecular weight compound (A), the medium molecular weight compound (B), and the carbon (C). When the content of the high molecular weight compound (A-2) is 5 parts by mass or larger, the lubricity tends to be further improved. When the content of the high molecular weight compound (A-2) is 35 parts by mass or smaller, the moldability tends to be further improved.

The content of the high molecular weight compound (A) in the lubricant material for assisting machining process is preferably 10 parts by mass or larger, more preferably 20 parts by mass or larger, further preferably 25 parts by mass or larger, still further preferably 30 parts by mass or larger, with respect to 100 parts by mass in total of the high molecular weight compound (A), the medium molecular weight compound (B), and the carbon (C). Also, the content of the high molecular weight compound (A) in the lubricant material for assisting machining process is preferably 60 parts by mass or smaller, more preferably 55 parts by mass or smaller, further preferably 50 parts by mass or smaller, with respect to 100 parts by mass in total of the high molecular weight compound (A), the medium molecular weight compound (B), and the carbon (C). When the content of the high molecular weight compound (A) is 10 parts by mass or larger, the lubricity tends to be further improved. When the content of the high molecular weight compound (A) is 10 parts by mass or larger, there is a tendency to improve the following properties and the tenacity and improve the machining processability of a curved surface. When the content of the high molecular weight compound (A) is 65 parts by mass or smaller, the moldability tends to be further improved.

[Medium Molecular Weight Compound (B)]

The medium molecular weight compound (B) can function as a lubricant agent and is capable of exerting the effects of improving the lubricity of the lubricant material for assisting machining process and reducing the occurrence of chippings, burrs, or splintering at the periphery of a machined portion.

The medium molecular weight compound (B) is not particularly limited as long as its weight average molecular weight is $1\times10^3$ or higher and lower than $5\times10^4$. Examples thereof include water soluble thermoplastic resins, non-water soluble thermoplastic resins, water soluble thermosetting resins, and non-water soluble thermosetting resins. Among them, a water soluble thermoplastic resin or a non-water soluble thermoplastic resin is preferred, and a water soluble thermoplastic resin is more preferred. For example, resins that are resins of the same types as in the water soluble resin and the non-water soluble resin described above and have a weight average molecular weight of $1\times10^3$ or higher and lower than $5\times10^4$ can be used as the water soluble thermoplastic resin and the non-water soluble thermoplastic resin. One medium molecular weight compound (B) may be used alone, or two or more thereof may be used in combination.

Examples of the medium molecular weight compound (B) include, but are not particularly limited to: polyalkylene glycol compounds such as polyethylene glycol, polypropylene glycol, and polytetramethylene glycol; monoether compounds of polyalkylene oxide, such as polyethylene oxide oleyl ether, polyethylene oxide cetyl ether, polyethylene oxide stearyl ether, polyethylene oxide lauryl ether, polyethylene oxide nonyl phenyl ether, and polyethylene oxide octyl phenyl ether; monostearate compounds of polyalkylene oxide, such as polyethylene oxide monostearate, polyethylene oxide sorbitan monostearate, and polyglycerin monostearate; and polyalkylene oxide compounds such as polyethylene oxide, polypropylene oxide, and polyethylene oxide-propylene oxide copolymers. Among them, polyethylene oxide monostearate is preferred. Use of such a medium molecular weight compound (B) tends to further improve the lubricity.

The weight average molecular weight of the medium molecular weight compound (B) is $1\times10^3$ or higher, preferably $1.25\times10^3$ or higher, more preferably $1.5\times10^3$ or higher, further preferably $2\times10^3$ or higher, still further preferably $2.5\times10^3$ or higher, particularly preferably $3\times10^3$ or higher. Also, the weight average molecular weight of the medium molecular weight compound (B) is lower than $5\times10^4$, preferably $2.5\times10^4$ or lower, more preferably $2\times10^4$ or lower, further preferably $1\times10^4$ or lower, still further preferably $7.5\times10^3$ or lower, particularly preferably $5\times10^3$ or lower. When the weight average molecular weight of the medium molecular weight compound (B) is $1\times10^3$ or higher, the moldability is further improved. When the weight average molecular weight of the medium molecular weight compound (B) is lower than $5\times10^4$, the lubricity is further improved.

The content of the medium molecular weight compound (B) in the lubricant material for assisting machining process is preferably 10 parts by mass or larger, more preferably 20 parts by mass or larger, further preferably 30 parts by mass or larger, with respect to 100 parts by mass in total of the high molecular weight compound (A), the medium molecular weight compound (B), and the carbon (C). Also, the content of the medium molecular weight compound (B) in the lubricant material for assisting machining process is preferably 75 parts by mass or smaller, more preferably 60 parts by mass or smaller, further preferably 45 parts by mass or smaller, still further preferably 40 parts by mass or smaller, with respect to 100 parts by mass in total of the high molecular weight compound (A), the medium molecular weight compound (B), and the carbon (C). When the content of the medium molecular weight compound (B) is 10 parts by mass or larger, the lubricity tends to be further improved. When the content of the medium molecular weight compound (B) is 75 parts by mass or smaller, the moldability tends to be further improved.

The high molecular weight compound (A) and the medium molecular weight compound (B), which differ in molecular weight, may also differ in their respective melt viscosities and melting points. By combined use of such a high molecular weight compound (A) and a medium molecular weight compound (B), although use of the high molecular weight compound (A) alone, for example, reduces the moldability or lubricity of the lubricant material for assisting machining process due to too high a viscosity or too high a melting point of the lubricant material for assisting machining process, this can be suppressed. In addition, although use of the medium molecular weight compound (B) alone reduces the moldability or lubricity of the lubricant material for assisting machining process due to too low a viscosity or too low a melting point of the lubricant material for assisting machining process, this can be suppressed.

Among those described above, a combination of the high molecular weight compound (A) which is a thermoplastic resin having a weight average molecular weight of $5\times10^4$ or higher and $1\times10^6$ or lower and the medium molecular weight compound (B) which is a thermoplastic resin having a weight average molecular weight of $1\times10^3$ or higher and $2\times10^4$ or lower is preferred.

[Carbon (C)]

The carbon (C) can function as a solid lubricant agent and is capable of exerting the effects of improving the lubricity of the lubricant material for assisting machining process and prolonging the lifespan of the machining tool. Furthermore, the carbon (C) exists in a solid state having a volume at a temperature of machining process and therefore, can maintain the lubricity at the time of machining process. The carbon (C) is not particularly limited as long as its average particle size is 100 μm or larger. Examples thereof include natural graphite, artificial graphite, active carbon, acetylene black, carbon black, colloidal graphite, pyrolytic graphite, expanded graphite, and flake graphite. Among others, a carbon (C) whose shape is a flake shape is preferred. The carbon (C) whose shape is a flake shape tends to further improve the abrasion reducing performance. One carbon (C) may be used alone, or two or more thereof may be used in combination.

In machining process, particularly, continuous machining process, using the lubricant material for assisting machining process of the present embodiment, the carbon (C) is attached to the surface or groove of the machining tool and the side of a machined portion (e.g., a processed hole) in the workpiece material to thereby exhibit lubricity. In this case, the carbon (C) less varies in volume and hardness due to change in temperature, as compared with the high molecular weight compound (A) and the medium molecular weight compound (B), and can therefore keep constant volume and hardness in machining process even if the temperature of the machining tool or a processing site is elevated. Specifically, the carbon (C) can reside normally between the machining tool and the workpiece material in machining process to thereby enhance lubricity and exhibit effects similar to those of bearings. Therefore, the carbon (C) is effective for suppressing the abrasion of the machining tool. The carbon (C) has moderately high hardness, as compared with other solid lubricant agents, and is therefore excellent in the bearing effects described above and excellent in lubricity. Therefore, problems associated with machining process, such as the promotion of the abrasion of the point of the machining tool or chippings at the point of the machining tool, are suppressed.

The average particle size of the carbon (C) is 100 μm or larger, preferably 125 μm or larger, more preferably 150 μm or larger, further preferably 175 μm or larger, still further preferably 200 μm or larger, still further preferably 225 μm or larger. Also, the average particle size of the carbon (C) is preferably 1000 μm or smaller, more preferably 750 μm or smaller, further preferably 500 μm or smaller, particularly preferably 300 μm or smaller. When the average particle size of the carbon (C) is 100 μm or larger, the lubricity and the moldability are further improved. When the average particle size of the carbon (C) is 100 μm or larger, there is a tendency to further improve the following properties and the tenacity and improve the machining processability of a curved surface. When the average particle size of the carbon (C) is 1000 μm or smaller, there is a tendency to further suppress the abrasion of the machining tool. In the case of comprising two or more carbons (C), it is preferred that the respective average particle sizes of the carbons (C) should satisfy the range described above.

In the present embodiment, the average particle size of the carbon (C) refers to a median size. The median size means a particle diameter that is obtained from the cumulative distribution curve (number based) of particle sizes and becomes 50% height in the curve (D50 value), and can be measured by a method described in Examples.

The content of the carbon (C) in the lubricant material for assisting machining process is preferably 5 parts by mass or larger, more preferably 15 parts by mass or larger, further preferably 20 parts by mass or larger, still further preferably 25 parts by mass or larger, particularly preferably 30 parts by mass or larger, with respect to 100 parts by mass in total of the high molecular weight compound (A), the medium molecular weight compound (B), and the carbon (C). Also, the content of the carbon (C) in the lubricant material for assisting machining process is preferably 70 parts by mass or smaller, more preferably 65 parts by mass or smaller, further preferably 60 parts by mass or smaller, with respect to 100 parts by mass in total of the high molecular weight compound (A), the medium molecular weight compound (B), and the carbon (C). When the content of the carbon (C)

is 5 parts by mass or larger, the lubricity tends to be further improved. When the content of the carbon (C) is 70 parts by mass or smaller, the moldability tends to be further improved. Particularly, when the content of the carbon (C) is 5 parts by mass or larger and 70 parts by mass or smaller, there is a tendency to improve the following properties and tenacity of the lubricant material for assisting machining process and improve the machining processability of a curved surface. When the content of the carbon (C) falls within the range described above, there is a tendency to further reduce load to the machining tool and further suppress the occurrence of burrs or chippings at the periphery of a machined portion.

[Additional Component]

The lubricant material for assisting machining process of the present embodiment may optionally contain an additional component. Examples of the additional component include lubricity improving components, sheet formability improving components, plasticizers, softening agents, surface conditioners, leveling agents, antistatic agents, emulsifiers, antifoaming agents, wax additives, coupling agents, rheology controlling agents, antiseptics, antifungal agents, antioxidants, light stabilizers, nucleating agents, organic fillers, inorganic fillers, solid lubricant agents, heat stabilizers, and colorants.

Examples of the lubricity improving components include, but are not particularly limited to: amide compounds exemplified by ethylenebisstearamide, oleic acid amide, stearic acid amide, and methylenebisstearamide; fatty acid compounds exemplified by lauric acid, stearic acid, palmitic acid, and oleic acid; fatty acid ester compounds typified by butyl stearate, butyl oleate, and glycol laurate; aliphatic hydrocarbon compounds typified by liquid paraffin; and higher aliphatic alcohols typified by oleyl alcohol. At least one of these lubricity improving components can be selected.

Examples of the sheet formability improving components include, but are not particularly limited to, epoxy resins, phenol resins, cyanate resins, melamine resins, urea resins, and thermosetting polyimide, which are thermosetting resins. At least one of these formability improving components can be selected.

When the lubricant material for assisting machining process is placed on the curved surface of a workpiece material, a plasticizer or a softening agent contained in the lubricant material for assisting machining process can suppress cracks in the lubricant material for assisting machining process, for example, by mitigating stress or strain to the lubricant material for assisting machining process, and tends to further improve the curved surface following properties. Examples of the plasticizer or the softening agent include, but are not particularly limited to, phthalic acid ester, adipic acid ester, trimellitic acid ester, polyester, phosphoric acid ester, citric acid ester, epoxidized plant oil, and sebacic acid ester.

Examples of the solid lubricant agents other than the carbon (C) include, but are not particularly limited to, molybdenum disulfide, tungsten disulfide, molybdenum compounds, polytetrafluoroethylene, and polyimide.

The flexible volume of the lubricant material for assisting machining process of the present embodiment is preferably 5 mm or larger, more preferably 10 mm or larger, further preferably 15 mm or larger. The upper limit of the flexible volume is not particularly limited and is preferably 100 mm or smaller, more preferably 50 mm or smaller, further preferably 25 mm or smaller. When the flexible volume is 5 mm or larger, the following properties and the tenacity tend to be further improved. The flexible volume can be controlled to be larger by increasing the content of the high molecular weight compound (A), using the high molecular weight compound (A) having a larger weight average molecular weight, increasing the content of the carbon (C), or using the carbon (C) having a larger average particle size. Specifically, for increasing the flexible volume of the lubricant material for assisting machining process, it is preferred that: the content of the high molecular weight compound (A) should be 10 parts by mass or larger with respect to 100 parts by mass in total of the high molecular weight compound (A), the medium molecular weight compound (B), and the carbon (C); the weight average molecular weight (Mw) of the high molecular weight compound (A) should be $5\times10^4$ or higher; the content of the carbon (C) should be 5 parts by mass or larger with respect to 100 parts by mass in total of the high molecular weight compound (A), the medium molecular weight compound (B), and the carbon (C); or the average particle size of the carbon (C) should be 100 µm or larger. The flexible volume can also be controlled by the thickness of the lubricant material for assisting machining process.

Figure 5:
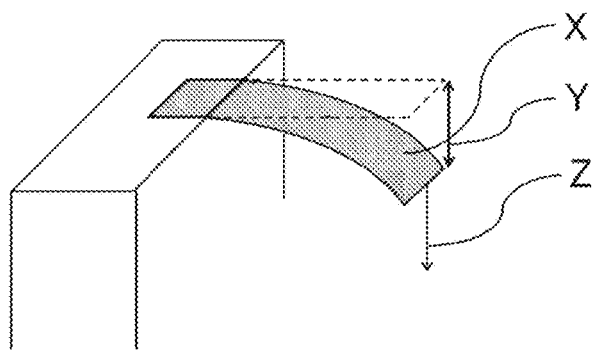
FIG. 5 shows a schematic diagram showing a method for measuring a flexible volume.

The flexible volume can be measured by a method described in Examples. Specifically, as shown in FIG. 5, lubricant material for assisting machining process X having a width of 30 mm and a length of 150 mm is fixed in a state protruding 100 mm to a holding jig. Then, load Z of 25 g is applied to the end portion of the assisting lubricant X for machining process. Displacement Y from the position of the lubricant material for assisting machining process X without the load Z is defined as the flexible volume of the lubricant material for assisting machining process. When the assisting lubricant sheet for machining process is cut off from the supporting point at which the assisting lubricant for machining process is fixed with a holding jig, it is impossible to measure the flexible volume.

The lubricant material for assisting machining process of the present embodiment having the configuration described above is excellent in workpiece material (particularly, difficult-to-machining material having a curved surface) following properties and tenacity. Therefore, the lubricant material for assisting machining process of the present embodiment can be preferably used for workpiece materials having various surface shapes. For example, the lubricant material for assisting machining process can be preferably used not only when the to-be-processed portion of the workpiece material has a flat surface but when the to-be-processed portion has a curved surface, as with the flat surface.

Specifically, the lubricant material for assisting machining process is excellent in to-be-processed portion following properties and therefore permits machining process in close contact of the lubricant material for assisting machining process with the workpiece material having a curved surface. Also, the lubricant material for assisting machining process is excellent in tenacity and attains close contact with various curved surfaces without causing cracks or the like and without any space from the to-be-processed portion of the workpiece material. The lubricant material for assisting machining process acts as a lubricant agent and therefore, can reduce load to a machining tool in machining process by the close contact of the lubricant material for assisting machining process with the to-be-processed portion of the workpiece material without any space. As a result, the lubricant material for assisting machining process can more effectively exert the effect capable of suppressing the occurrence of burrs, chippings, or splintering at the periphery of a machined portion, and permits machining process excellent in productivity. In the present embodiment, the "following properties" refer to properties by which the lubricant material for assisting machining process come in close contact with the workpiece material according to the surface shape of the workpiece material. The "tenacity" refers to the toughness (strength and drawability) of the lubricant material for assisting machining process against stress.

It is preferred that the lubricant material for assisting machining process of the present embodiment should be free from metal foil. This can prevent the machined portion of the workpiece material from being contaminated by the adhesion of metal foil-derived metal scraps to the machined portion of the workpiece material. As a result, a machining process product excellent in the quality of the machined portion can be obtained.

[Adhesive Layer]

The lubricant material for assisting machining process of the present embodiment may have an adhesive layer on its face to be brought into contact with the workpiece material. The adhesive layer carried thereby tends to further improve the adhesion between the lubricant material for assisting machining process and the workpiece material.

The component constituting the adhesive layer is not particularly limited and is, for example, a thermoplastic resin and/or a thermosetting resin. Examples of the thermoplastic resin include, but are not particularly limited to, urethane polymers, acrylic polymers, vinyl acetate polymers, vinyl chloride polymers, polyester polymers, and copolymers thereof. Examples of the thermosetting resin include, but are not particularly limited to, resins such as phenol resins, epoxy resins, melamine resins, urea resins, unsaturated polyester resins, alkyd resins, polyurethane, thermosetting polyimide, and cyanate resins. Among them, an acrylic polymer is preferred because it is required to have the properties of leaving no paste on the workpiece material and being capable of easily adhering at ordinary temperature. A solvent type acrylic pressure sensitive adhesive and an acrylic emulsion type pressure sensitive adhesive (aqueous) are more preferred.

The adhesive layer may optionally contain a degradation preventing agent such as an antioxidant, and an inorganic filler such as calcium carbonate, talc, or silica, as components of the adhesive layer.

When the lubricant material for assisting machining process is removed from the workpiece material after the machining process, the total amount of components of the lubricant material for assisting machining process and the adhesive layer attached to the workpiece material is preferably $1.0 \times 10^{-8}$ g or smaller, more preferably $5.0 \times 10^{-9}$ g or smaller, per $mm^2$ of a total of the contact area between the workpiece material and the lubricant material for assisting machining process and the area of the machined portion. The lower limit of the total amount of components of the lubricant material for assisting machining process and the adhesive layer attached to the workpiece material is not particularly limited and is preferably 0. In this context, the "area of the machined portion" refers to the inside of a processed hole (machined portion) formed by, for example, drilling work.

[Thickness]

The thickness of the lubricant material for assisting machining process excluding the adhesive layer is not particularly limited and is appropriately selected according to a machining method for the machining process of the workpiece material, a cut off method, the area or volume of a portion to be processed, the type of the machining tool, the configuration or thickness of the workpiece material, etc. Among others, the thickness of the lubricant material for assisting machining process is preferably 0.1 mm or larger, more preferably 0.2 mm or larger, further preferably 0.5 mm or larger. Also, the thickness of the lubricant material for assisting machining process is preferably 20 mm or smaller, more preferably 10 mm or smaller, further preferably 5 mm or smaller. When the thickness of the lubricant material for assisting machining process is 0.1 mm or larger, there is a tendency to obtain sufficient reduction in machining stress, decrease load to the machining tool, and be able to further suppress drill breakage or the like. When the thickness of the lubricant material for assisting machining process is 20 mm or smaller, there is a tendency to reduce the twining of the lubricant material for assisting machining process around the machining tool and be able to further suppress the occurrence of cracks in the lubricant material for assisting machining process.

The resin contained in the lubricant material for assisting machining process can be prevented from serving as a binder for machining chips. There is a tendency to be able to prevent machining chips from remaining in a machined portion. This tends to be able to suppress increase in the inside irregularity of the machined portion. In short, the lubricity can be improved by securing the proper composition and thickness of the lubricant material for assisting machining process. The elimination of cutting chips through the groove of a drill can be optimized for, for example, drilling work. For further obtaining the effects of the present invention, it is preferred to appropriately control the total thickness of the lubricant material for assisting machining process within the range mentioned above. A plurality of thin lubricant material for assisting machining process may be layered for use.

The thickness of the adhesive layer is not particularly limited and is preferably 0.01 mm or larger, more preferably 0.05 mm or larger. Also, the thickness of the adhesive layer is preferably 5 mm or smaller, more preferably 2.5 mm or smaller.

The thickness of each layer constituting the lubricant material for assisting machining process of the present embodiment is measured as follows: first, the lubricant material for assisting machining process is cut off in a thickness direction using a cross section polisher (CROSS-SECTION POLISHER SM-09010 manufactured by JEOL Ltd. DATUM Solution Business Operations) or an ultramicrotome (EM UC7 manufactured by Leica Camera AG). Next, the plane of section is observed in a direction perpendicular to the plane of section using a scanning electron microscope (SEM) (VE-7800 manufactured by Keyence Corp.) to measure the thickness of each layer constituting the lubricant material for assisting machining process. In this operation, the thicknesses of 5 sites per field of view are measured, and an average value thereof is used as the thickness of each layer.

[Method for Producing Lubricant Material for Assisting Machining Process]

The method for producing the lubricant material for assisting machining process of the present embodiment is not particularly limited, and a conventional method known in the art for molding a resin composition comprising a resin such as a polymer material, and a filler (e.g., an inorganic filler) into a sheet or the form of a block such as a round bar shape or a square bar shape can be widely used. Examples of such a production method include: a method which involves mixing the high molecular weight compound (A), the medium molecular weight compound (B), and the carbon (C) in the presence or absence of a solvent, applying the mixture to a support, solidifying the mixture by cooling to form a sheet, and then peeling off the support therefrom to obtain the lubricant material for assisting machining process; and a method which involves mixing the high molecular weight compound (A), the medium molecular weight compound (B), and the carbon (C) in the presence or absence of a solvent, extrusion molding the mixture into a sheet shape, and drawing the sheet, if necessary, to obtain the lubricant material for assisting machining process.

When the lubricant material for assisting machining process is the multilayer body mentioned above (e.g., a lubricant sheet for assisting machining process having an adhesive layer and/or a protective layer), examples of the method for producing the multilayer body include, but are not particularly limited to: a method which involves preparing one layer in advance and directly forming another layer on at least one side thereof; and a method which involves laminating one layer prepared in advance and another layer by a lamination method using an adhesive resin or heat.

The method for forming an adhesive layer on the surface of the lubricant material for assisting machining process is not particularly limited as long as the method is known in the art and industrially used. Specific examples thereof include: a method which involves forming the adhesive layer by a roll method, a curtain coating method, a spraying method, or the like; and a method which involves forming in advance the adhesive layer having the desired thickness using a roll, a T-die extruder, or the like. The thickness of the adhesive layer is not particularly limited, and the optimum thickness can be appropriately selected according to the curvature of the workpiece material and the configuration of the lubricant material for assisting machining process.

In the case of producing the lubricant material for assisting machining process in a melted state, examples of the method therefor include: a method using, as the lubricant material for assisting machining process, a resin composition obtained by mixing a resin and a filler; and a method using, as the lubricant material for assisting machining process, a resin composition obtained by mixing a resin, a filler, and a solvent.

[Machining Method]

The machining method of the present embodiment comprises a machining step of forming a machined portion by machining a workpiece material with a machining tool while bringing the lubricant material for assisting machining process into contact with the machining tool and/or the to-be-processed portion of the workpiece material, wherein the workpiece material comprises a fiber reinforced composite material, a difficult-to-machining metal material, or a composite material of the fiber reinforced composite material and the difficult-to-machining metal material.

In this context, examples of the phrase "while contacting" include, but are not particularly limited to, the case where after a contact step of attaching the lubricant material for assisting machining process to the machining tool before machining process, the machining step is carried out with the lubricant material for assisting machining process-attached machining tool, the case where after a close contact step of closely contacting the lubricant material for assisting machining process with the to-be-processed portion of the workpiece material, the to-be-processed portion of the workpiece material is machining from the lubricant material for assisting machining process side, and combined use of both of these cases.

The "machining process" is not particularly limited as long as the machining process is a process to machine a workpiece material. Examples thereof include drilling work, grooving work, turning work, and parting work. Among them, drilling work using a drill (hereinafter, also simply referred to as "drilling work") is preferred.

The machining method of the present embodiment includes, but is not limited to, for example, embodiments described below. Hereinafter, these embodiments will be described each individually.

Embodiment 1

When the machining step is a step of forming a machined portion (e.g., a processed hole) having the exit and the entrance of the machining tool, an embodiment having, before the machining step, a close contact step of closely bringing in advance the lubricant material for assisting machining process into contact with a portion to be the exit and/or a portion to be the entry of the machining tool, in the workpiece material (FIGS. 1 and 2).

Embodiment 1-1

An embodiment in which in the close contact step of embodiment 1, the lubricant material for assisting machining process is closely brought into contact with a portion to be the entry of the machining tool in advance, in the workpiece material.

Embodiment 1-2

An embodiment in which in the close contact step of embodiment 1, the lubricant material for assisting machining process is closely brought into contact with a portion to be the exit of the machining tool in advance, in the workpiece material.

Embodiment 2

An embodiment having, before the machining step, a contact step of bringing in advance the lubricant material for assisting machining process into contact with the machining tool.

Embodiment 3

An embodiment in which in the machining step, the machined portion is formed by machining the workpiece material closely brought into contact with the lubricant material for assisting machining process in a state where another lubricant material for assisting machining process is brought into contact with the machining tool (FIG. 3)

Embodiment 1

When the machining step is a step of forming a machined portion (e.g., a processed hole) having the exit and the entrance of the machining tool, the machining method of embodiment 1 comprises, before the machining step, a close contact step of closely bringing in advance the lubricant material for assisting machining process into contact with a portion to be the exit and/or a portion to be the entry of the machining tool, in the workpiece material. In this context, the "portion to be the exit" can be used interchangeably with a face to serve as the exit if this portion is a face. In response to this, the "portion to be the entry" can be used interchangeably with a face to serve as the entrance.

In drilling work, the neighborhoods of the edges of a hole (machined portion) to be obtained correspond to the "portion to be the entry" and the "portion to be the exit". In grooving work, the neighborhood of the edge of a groove (machined portion) to be obtained corresponds to the "portion to be the entry" of the machining tool. In turning work, the neighborhood of the surface of the workpiece material to be machined corresponds to the "portion to be the entry" of the machining tool. In parting work, the neighborhoods of the edges of the machined face to be obtained correspond to the "portion to be the entry" and the "portion to be the exit".

FIGS. 1 and 2 each show a schematic diagram illustrating one embodiment of the machining method of the present embodiment. As shown in FIGS. 1 and 2, a lubricant material for assisting machining process 2 is used in the machining process of a workpiece material 1, particularly, a difficult-to-machining material.

Embodiment 1-1

In embodiment 1-1, the lubricant material for assisting machining process 2 is closely brought in advance into contact with a portion to be the entry of a machining tool 3, in the workpiece material 1, and the workpiece material 1 is processed with the machining tool 3 (FIG. 1). In this case, the lubricant material for assisting machining process 2 comes in contact with the machining tool 3 prior to the workpiece material 1.

The lubricant material for assisting machining process is placed, for use, at the portion to be the entry of the machining tool to thereby transfer a lubricating component of the lubricant material for assisting machining process to the tip of the tool immediately before processing. Therefore, the lubricating effect of the lubricant material for assisting machining process is exerted more effectively. The lubricant material for assisting machining process placed at the portion to be the entry also acts as a buffer material upon entry of the machining tool into the workpiece material and can suppress chippings at the periphery of a machined portion. This can further reduce load to the machining tool, suppress the abrasion of the machining tool, and prolong the lifespan of the machining tool. As a result, cost required for machining tools, the number of runs of a machining tool change step, or the like can be reduced. Thus, machining process excellent in productivity is achieved. Particularly, for continuous machining process, the machining tool is contacted once with the lubricant material for assisting machining process placed at the portion to be the entry of the machining tool so that the lubricant material for assisting machining process is attached to the machining tool. Therefore, the effects of reducing load to the machining tool, suppressing the abrasion, and prolonging the lifespan can be obtained in subsequent processing. As mentioned above, for this continuous machining process, the machining tool is contacted once with the lubricant material for assisting machining process placed at the portion to be the entry of the machining tool so that the lubricant material for assisting machining process is attached to the machining tool. Therefore, the effects of the lubricant material for assisting machining process are also exerted on the portion to be the exit of the machining tool, in addition to the portion to be the entry of the machining tool. As a result, the occurrence of chippings, burrs, or splintering at the periphery of a machined portion can be suppressed.

The lubricant material for assisting machining process is placed, for use, at the portion to be the entry of the machining tool, in the workpiece material so that chippings or splintering at the entrance of the machined portion can be suppressed in the machining process of a fiber reinforced composite material. This is because the lubricant material for assisting machining process is closely brought into contact with the portion to be the entry of the machining tool to thereby transfer a lubricating component of the lubricant material for assisting machining process to the tip of the tool immediately before processing. This can further reduce load to the machining tool and permits more smooth machining process.

The lubricant material for assisting machining process is placed, for use, at the portion to be the entry of the machining tool, in the workpiece material so that chippings or burrs at the periphery of a machined portion can be suppressed in the machining process of a difficult-to-machining metal material. This is because the lubricant material for assisting machining process is closely brought into contact with the portion to be the entry of the machining tool to thereby transfer a lubricating component of the lubricant material for assisting machining process to the tip of the tool immediately before processing. This can further reduce load to the machining tool and permits efficient absorption of heat generated upon entry of the machining tool into the workpiece material. This can prevent metal burrs or chippings from occurring at the periphery of a machined portion due to heat accumulation and therefore permits high quality machining process. The lubricant material for assisting machining process placed at the portion to be the entry also acts as a buffer material upon entry of the machining tool into the workpiece material and can suppress chippings at the periphery of a machined portion.

Furthermore, the lubricant material for assisting machining process is placed, for use, at the portion to be the entry of the machining tool, in the workpiece material so that chippings, burrs, or splintering at the periphery of a machined portion can also be suppressed in the machining process of a composite material of the fiber reinforced composite material and the difficult-to-machining metal material. When the workpiece material is a composite material of the fiber reinforced composite material and the difficult-to-machining metal material, the possible orders in which the machining tool penetrates the workpiece material are the case where the difficult-to-machining metal material is machined, followed by the machining of the fiber reinforced composite material, and the case where the fiber reinforced composite material is machined, followed by the machining of the difficult-to-machining metal material. For example, in the case of first machined the difficult-to-machining metal material, the abrasion of the machining tool may already proceeds before machined of the fiber reinforced composite material. In this respect, in the case of processing the fiber reinforced composite material with a more worn machining tool, the machining tool cuts the fiber reinforced composite material by pressing and machined the fiber. Therefore, delamination occurs easily between layers of prepregs. As a result, there is the disadvantage that splintering occurs more easily at the exit portion of machining tool penetration. However, use of the lubricant material for assisting machining process suppresses the abrasion of the machining tool at the time of the drilling work of the difficult-to-machining metal material and can greatly relax restrictions on the drilling work of the fiber reinforced composite material susceptible to the abrasion of the machining tool in terms of the quality of processed holes.

(Close Contact Step)

The machining method of embodiment 1-1 comprises a close contact step of closely bringing in advance the lubricant material for assisting machining process into contact with a portion to be the entry of the machining tool, in the workpiece material. The close contact step is a step of closely bringing in advance the lubricant material for assisting machining process into contact with a portion to be the entry of the machining tool, in the workpiece material. The close contact site on the workpiece material with the lubricant material for assisting machining process is set to the portion to be the entry of the machining tool, in advance. This transfers a lubricating component of the lubricant material for assisting machining process to the tip of the tool immediately before processing. Therefore, the lubricating effect of the lubricant material for assisting machining process is sufficiently exerted. This can further reduce load to the machining tool and tends to be able to suppress the occurrence of chippings, burrs, or splintering at the periphery of the entrance of the machining tool.

Examples of the method for closely contacting the lubricant material for assisting machining process with the workpiece material include, but are not particularly limited to: a method which involves physically fixing the lubricant material for assisting machining process and the workpiece material with a clip or a jig; and a method using the lubricant material for assisting machining process having a formed layer of a compound having adhesiveness (adhesive layer) on lubricant material for assisting machining process surface or metal foil surface to be brought into contact with the workpiece material. Among them, the method using the lubricant material for assisting machining process having a formed adhesive layer is preferred because this method eliminates the need of fixation with a jig or the like. In the present specification, the adhesive layer is defined as a layer of a compound having adhesiveness that is used for fixing the workpiece material and the lubricant material for assisting machining process.

Embodiment 1-2

In embodiment 1-2, the lubricant material for assisting machining process 2 is closely brought in advance into contact with a portion to be the exit of the machining tool 3, in the workpiece material 1, and the workpiece material 1 is processed with the machining tool 3 (FIG. 2). In this case, the lubricant material for assisting machining process 2 comes in contact with the machining tool 3 after the completion of penetration into the workpiece material 1.

The lubricant material for assisting machining process is placed, for use, at the portion to be the exit of the machining tool so that the lubricant material for assisting machining process acts as a lubricant agent. This can reduce load to the machining tool at the time of machining process, suppress the abrasion of the machining tool, and prolong the lifespan of the machining tool. As a result, cost required for machining tools, the number of runs of a machining tool change step, or the like can be reduced. Thus, machining process excellent in productivity is achieved. Particularly, for continuous machining process, the machining tool is contacted once with the lubricant material for assisting machining process placed at the portion to be the exit of the machining tool so that the lubricant material for assisting machining process is attached to the machining tool. Therefore, the effects of reducing load to the machining tool, suppressing the abrasion, and prolonging the lifespan can be obtained in subsequent processing. As mentioned above, for this continuous machining process, the machining tool is contacted once with the lubricant material for assisting machining process placed at the portion to be the exit of the machining tool so that the lubricant material for assisting machining process is attached to the machining tool. Therefore, the effects of the lubricant material for assisting machining process are also exerted on the portion to be the entry of the machining tool, in addition to the portion to be the exit of the machining tool. As a result, chippings, burrs, or splintering at the periphery of a machined portion can also be suppressed.

Furthermore, the lubricant material for assisting machining process is placed, for use, at the portion to be the exit of the machining tool, in the workpiece material so that chippings or splintering at the exit portion of machining tool penetration can be suppressed in the machining process of a fiber reinforced composite material. This is because the lubricant material for assisting machining process acts like a lid. In the machining process of a fiber reinforced composite material, the mechanism underlying the occurrence of chippings or splintering at the exit portion of machining tool penetration is as described below. When the tip of a tool starts to penetrate the lowermost layer of the fiber reinforced composite material, the workpiece material starts to split in a direction parallel to the fiber. As the tool gradually comes down, the fiber of the workpiece material is cut off around the center of the hole and cut off in a direction perpendicular to the fiber. Then, as the tool further comes down, the hole is expanded by pushing. In this case, the fiber held in a cantilevered state by the edge of the hole merely falls in the rotational direction of the tool without being cut off. In this respect, processing can be performed with the lubricant material for assisting machining process placed at the exit portion of machining tool penetration in the workpiece material to thereby prevent the fiber of the workpiece material from being held in a cantilevered state by the edge of the hole. Thus, the fiber of the workpiece material can be neatly machined along the edge of the hole. As a result, this approach can suppress the occurrence of chippings or splintering and yield high quality processed holes, as compared with conventional methods. Particularly, for drilling work, drilling work superior in productivity and quality to that of conventional techniques is achieved.

In addition, the lubricant material for assisting machining process is placed, for use, at the portion to be the exit of the machining tool, in the workpiece material so that chippings or burrs at the exit portion of machining tool penetration can be suppressed in the machining process of a difficult-to-machining metal material. This is because use of the lubricant material for assisting machining process in the machining process of a difficult-to-machining metal material permits efficient absorption of heat accumulating at the periphery of a machined portion at the time of machining process. Specifically, the lubricant material for assisting machining process is placed at the portion to be the exit of the machining tool, in the workpiece material so that heat generated upon exit of the machining tool from the workpiece material can be efficiently absorbed. This can prevent metal burrs from occurring at the periphery of a machined portion due to heat accumulation. Also, the lubricant material for assisting machining process can act like a lid at the time of machining process to thereby suppress chippings at the periphery of a machined portion. As a result, higher quality holes can be obtained by machining process, as compared with conventional methods. Particularly, for drilling work, drilling work superior in productivity and quality to that of conventional techniques is achieved.

Use of the lubricant material for assisting machining process in the machining process of a composite material of the fiber reinforced composite material and the difficult-tomachining metal material permits efficient absorption of heat accumulating at the periphery of a machined portion at the time of machining process. Also, the lubricant material for assisting machining process can act like a lid to thereby reduce the occurrence of chippings and splintering at the periphery of a machined portion in the fiber reinforced composite material.

(Close Contact Step)

The machining method of embodiment 1-2 comprises a close contact step of closely bringing in advance the lubricant material for assisting machining process into contact with a portion to be the exit of the machining tool, in the workpiece material. The close contact step is a step of closely bringing in advance the lubricant material for assisting machining process into contact with a portion to be the exit of the machining tool, in the workpiece material. The close contact site on the workpiece material with the lubricant material for assisting machining process is set to the portion to be the exit of the machining tool, in advance. This can reduce load to the machining tool, as mentioned above, and can reduce the occurrence of chippings, burrs, or splintering at the periphery of the exit of the machining tool.

Examples of the method for closely contacting the lubricant material for assisting machining process with the workpiece material include, but are not particularly limited to: a method which involves physically fixing the lubricant material for assisting machining process and the workpiece material with a clip or a jig; and a method using the lubricant material for assisting machining process having a formed layer of a compound having adhesiveness (adhesive layer) on lubricant material for assisting machining process surface or metal foil surface to be brought into contact with the workpiece material. Among them, the method using the lubricant material for assisting machining process having a formed adhesive layer is preferred because this method eliminates the need of fixation with a jig or the like. In the present specification, the adhesive layer is defined as a layer of a compound having adhesiveness that is used for fixing the workpiece material and the lubricant material for assisting machining process.

It is particularly preferred to closely contact in advance the lubricant material for assisting machining process with the portion to be the entry of the machining tool, in the workpiece material, and the portion to be the exit of the machining tool, in the workpiece material.

Embodiment 2

The machining method of embodiment 2 comprises, before the machining step, a contact step of bringing in advance the lubricant material for assisting machining process into contact with the machining tool. The contact of the lubricant material for assisting machining process with the machining tool in advance can produce effects equivalent to those of the case of closely contacting the lubricant material for assisting machining process with a portion to be the entry of the machining tool. The contact method is not particularly limited. For example, the lubricant material for assisting machining process is applied in advance to the machining tool so that the lubricant material for assisting machining process can be attached to the machining tool. Also, the lubricant material for assisting machining process is cut off or drilled with the machining tool before machining process so that the lubricant material for assisting machining process can be attached to the machining tool.

The lubricant material for assisting machining process is placed at a portion to be the entry of the machining tool so that the lubricant material for assisting machining process can be attached to the machining tool before machining process. This case corresponds to embodiment 1-1 described above.

Embodiment 3

In the machining step of the machining method of embodiment 3, the machined portion is formed by machining the workpiece material closely brought into contact with the lubricant material for assisting machining process in a state where another lubricant material for assisting machining process is brought into contact with the machining tool. The contact and attachment of another lubricant material for assisting machining process with the machining tool in the machining step can produce effects equivalent to those of the case of closely contacting the lubricant material for assisting machining process with a portion to be the entry of the machining tool. In the case of machining the workpiece material with the lubricant material for assisting machining process closely brought into contact with both of a portion to be the entry and a portion to be the exit of the machining tool, the machining method of the present embodiment may also comprise, before the machining step, a contact step of bringing in advance the lubricant material for assisting machining process into contact with the machining tool, and may form the machined portion by attaching another lubricant material for assisting machining process to the machining tool in the machining step.

FIG. 3 shows a schematic diagram of a state where another lubricant material for assisting machining process is contacted and attached with the machining tool in the machining step. As shown in FIG. 3, the lubricant material for assisting machining process 2 is constantly supplied to the machining tool by performing machining process while contacting another lubricant material for assisting machining process 2 with the machining tool 3. Thus, efficient processing is achieved. In the case of using the lubricant material for assisting machining process 2 in close contact therewith, the lubricant material for assisting machining process 2 is supplied, in an amount calculated from the thickness of the lubricant material for assisting machining process 2×the diameter of a drill (area of a site to be contacted with the machining tool), to the machining tool. Use of another lubricant material for assisting machining process 2 permits supply of the lubricant material for assisting machining process 2 in a sufficient amount to the machining tool.

Only another lubricant material for assisting machining process may be contacted with the machining tool. The lubricant material for assisting machining process can be attached to the machining tool by performing machining process while bringing the lubricant material for assisting machining process into contact with the machining tool. This case is not particularly limited and corresponds to, for example, the case of using only the lubricant material for assisting machining process 2 in a block form in FIG. 3. Such an embodiment permits continuous supply of the lubricant material for assisting machining process via the machining tool to a portion under machining process.

[Thickness of Workpiece Material]

The machining method of the present embodiment produces the effects described above even on a thick workpiece material. Therefore, the workpiece material may have a larger thickness. The thickness of the workpiece material is preferably 3 mm or larger, more preferably 5 mm or larger, further preferably 10 mm or larger, still further preferably 15 mm or larger, still further preferably 17.5 mm or larger. The upper limit of the thickness of the workpiece material is not particularly limited and is preferably 40 mm or smaller.

Particularly, the processing of a workpiece material having a thickness of 10 mm or larger is more likely to cause the abrasion of the machining tool due to a large thickness, as compared with the processing of a workpiece material having a small thickness, and burrs, chippings, or splintering occurs easily at the periphery of a machined portion. This is because the thick workpiece material increases the volume of the workpiece material to be removed by the machining process and increases load to the machining tool. In this respect, use of the lubricant material for assisting machining process in the machining process of a workpiece material having a thickness of 10 mm or larger can reduce load to the machining tool, suppress the abrasion of the machining tool, and prolong the lifespan of the machining tool, because the lubricant material for assisting machining process acts as a lubricant agent. As a result, cost required for machining tools, the number of runs of a machining tool change step, or the like can be reduced. Thus, machining process excellent in productivity is achieved. Also, use of the lubricant material for assisting machining process in the machining process of a workpiece material having a thickness of 10 mm or larger can suppress burrs, chippings, or splintering at the periphery of a machined portion, because the lubricant material for assisting machining process acts as a lubricant agent. As a result, a high quality machined portion can be obtained, as compared with the case of not using the lubricant material for assisting machining process.

[Workpiece Material Having Curved Surface]

The lubricant material for assisting machining process can be preferably used not only when the to-be-processed portion of the workpiece material has a flat surface but when the to-be-processed portion has a curved surface, as with the flat surface. Specifically, the lubricant material for assisting machining process is excellent in flexibility and to-be-processed portion following properties, and permits machining process in close contact with a workpiece material having a curved surface. The lubricant material for assisting machining process preferably has a configuration that impairs neither the flexibility of the lubricant material for assisting machining process itself nor its to-be-processed portion following properties, and specifically, is preferably in a form free from thick metal foil or the like, though the configuration is not particularly limited thereto. This further improves the machining processability of the workpiece material having a curved surface. Also, the lubricant material for assisting machining process free from metal foil can prevent the machined portion of the workpiece material from being contaminated by the adhesion of metal foil-derived metal scraps to the machined portion of the workpiece material. As a result, this machining process can be superior in quality to the machining process of conventional techniques.

[Machining Step]

In the machining step, the workpiece material is subjected to machining process with the lubricant material for assisting machining process-attached machining tool, or the workpiece material closely brought into contact with the lubricant material for assisting machining process is subjected to machining process with the machining tool. Use of the lubricant material for assisting machining process in this way for machining process, particularly, continuous processing, enhances the lubricity between the machining tool surface including the blade of the machining tool and the inside wall surface of a machined portion, facilitates eliminating fiber or difficult-to-machining particles in a difficult-to-machining metal machined by the blade of the machining tool, and can decrease the frequency and degree of rubbing against the blade of the machining tool. Therefore, the abrasion of the blade of the machining tool is probably reduced. This principle of action applies to every general machining tool.

More specifically, when the workpiece material is a fiber reinforced composite material densely containing fiber, the amount of the fiber cut is large. This tends to facilitate the abrasion of the blade of a machining tool. Use of the lubricant material for assisting machining process of the present embodiment can reduce the abrasion of the blade of a machining tool. In the case of processing a fiber reinforced composite material with a more worn machining tool, the machining tool cuts the fiber reinforced composite material by pressing and cutting the fiber. Therefore, delamination occurs easily between layers of prepregs. As a result, there is the disadvantage that splintering occurs more easily at the exit portion of machining tool penetration in the workpiece material. However, use of the lubricant material for assisting machining process of the present embodiment can further suppress splintering.

When the workpiece material is a UD material, the entry of the blade of a machining tool at an angle to bite and hollow out a fiber bundle is more likely to cause fiber buckling in the inside wall of a machined portion. In this respect, use of the lubricant material for assisting machining process of the present embodiment suppresses fiber buckling and, furthermore, suppresses even a rise in temperature caused by the heat of friction. Therefore, the glass transition point (temperature) or softening point of the matrix resin becomes difficult to reach. Thus, the firmly bundled state of carbon fiber can be maintained, and fiber buckling can be suppressed. In this context, the "UD material" means a fiber reinforced composite material obtained using a cloth material of fibers aligned in only one direction.

When the workpiece material is a difficult-to-machining metal material, abrasive wear arises upon rubbing of the blade of the machining tool against the crystal particles of the difficult-to-machining metal so that the abrasion of the blade of the machining tool proceeds. A metal having higher strength increases the degree of a rise in temperature caused by the heat or friction at the time of machining process and is therefore more likely to increase the amount of burrs generated. In this respect, use of the lubricant material for assisting machining process of the present embodiment enhances the lubricity between the machining tool surface including the drill groove surface and the inside surface of a machined portion, facilitates eliminating difficult-to-machining metal crystal particles in the difficult-to-machining metal machined by the blade of the machining tool, and can decrease the frequency and degree of rubbing against the blade of the machining tool. As a result, the abrasion of the blade of the machining tool is reduced, and a rise in temperature derived from friction can also be suppressed. Therefore, the amount of burrs generated can be reduced.

When the workpiece material is a composite material of the fiber reinforced composite material and the difficult-to-machining metal material, the possible orders in which the machining tool penetrates the workpiece material are the machining process of the difficult-to-machining metal material followed by the machining process of the fiber reinforced composite material, and the machining process of the fiber reinforced composite material followed by the machining process of the difficult-to-machining metal material. For example, in the case of first performing the machining process of the difficult-to-machining metal material, the abrasion of the machining tool may already proceeds before machining process of the fiber reinforced composite material. In this respect, in the case of processing the fiber reinforced composite material with a more worn machining tool, the machining tool cuts the fiber reinforced composite material by pressing and cutting the fiber. Therefore, delamination occurs easily between layers of prepregs. As a result, there is the disadvantage that splintering occurs more easily at the exit portion of machining tool penetration. However, use of the lubricant material for assisting machining process of the present embodiment suppresses the abrasion of the machining tool at the time of the machining process of the difficult-to-machining metal material and can greatly relax restrictions on the machining process of the fiber reinforced composite material susceptible to the abrasion of the machining tool in terms of the quality of a machined portion.

The machining tool used is not particularly limited as long as the machining tool is generally used. In the case of using, for example, a drill, as the machining tool, the drill is not particularly limited by its diameter, material, shape, and presence or absence of a surface coating. The diameter of the drill can be appropriately selected according to an intended purpose and is generally preferably 1 mmϕ or larger and 30 mmϕ or smaller. The diameter of the drill intended for the drilling work of a base material for aircrafts is preferably 2 mmϕ or larger and 7 mmϕ or smaller. Also, the diameter of the drill is preferably 10 mmϕ or larger, more preferably 12.5 mmϕ or larger, further preferably 15 mmϕ or larger, from the viewpoint of forming larger processed holes. The material of the drill is preferably a cemented carbide produced by sintering a powder of a hard metal carbide. Examples of such a cemented carbide include, but are not particularly limited to, a metal produced by sintering a mixture of tungsten carbide and a binder cobalt. Since such a cemented carbide further improves material characteristics according to a usage purpose, titanium carbide, tantalum carbide, or the like may be added thereto. On the other hand, the shape of the drill can be appropriately selected according to the conditions of drilling work, the type and shape of the workpiece material, etc. Examples of the shape of the drill include, but are not particularly limited to, the point angle of the drill, the angle of twist of its groove, and the number of cutting edges. The surface coating of the drill can be appropriately selected according to the conditions of drilling work, the type and shape of the workpiece material, etc. Preferred examples of the type of the surface coating include diamond coating, diamond like coating, and ceramic coating.

In the machining step, a hole is preferably opened by drilling work using a drill as the machining tool. For a large machined portion, the machining method of the present embodiment produces the effects described above even on drilling work, for example, using a drill bit having a large diameter. Therefore, the size of the machined portion, for example, the diameter of the hole to be formed by the drilling work, can be increased. In this case, the diameter of the hole to be formed is preferably 3 mm or larger, more preferably 5 mm or larger, further preferably 6 mm or larger, still further preferably larger than 10 mm, still further preferably 12.5 mm or larger, particularly preferably 15 mm or larger. When the diameter of the hole is 3 mm or larger, an increased machining volume increases load to the drill bit, is more likely to cause the abrasion of the drill, and is more likely to cause burrs, chippings, or splintering at the periphery of a machined portion. In addition, there may arise the problem of reduction in the quality of the machined portion in the workpiece material due to heat accumulation at the time of processing. By contrast, use of the lubricant material for assisting machining process of the present embodiment can reduce load to the drill, can reduce the occurrence of burrs, chippings, or splintering at the periphery of the processed hole, and can be expected to improve the quality of the machined portion in the workpiece material. The "diameter of the hole" can be adjusted by the diameter of the drill used.

Particularly, the processing of the workpiece material to form a hole having a diameter of larger than 10 mm is more likely to cause the abrasion of the drill due to a large diameter of the drill bit, as compared with drilling work to form a small hole, and burrs, chippings, or splintering occurs easily at the periphery of a machined portion. This is because the large diameter of the drill bit increases the volume of the workpiece material to be removed by the machining process and increases load to the drill.

In this respect, use of the lubricant material for assisting machining process of the present embodiment in the drilling work of the workpiece material to form a hole having a diameter of larger than 10 mm can reduce load to the drill, suppress the abrasion of the drill, and prolong the lifespan of the drill, because the lubricant material for assisting machining process acts as a lubricant agent. As a result, cost required for drills, the number of runs of a drill change step, or the like can be reduced. Thus, drilling work excellent in productivity is achieved.

Also, use of the lubricant material for assisting machining process in the drilling work of the workpiece material to form a hole having a diameter of larger than 10 mm can suppress burrs, chippings, or splintering at the periphery of a machined portion, because the lubricant material for assisting machining process acts as a lubricant agent. As a result, a high quality processed hole can be obtained, as compared with the case of not using the lubricant material for assisting machining process.

In the machining step, a general machining process technique can be used. Examples thereof include machining process that is performed while a site under machining process and/or the machining tool is cooled using a gas or a liquid. Examples of the method for cooling a site under machining process and/or the machining tool using a gas include: a method which involves supplying a compressed gas to the site under machining process and/or the machining tool; and a method which involves supplying an ambient gas to the machining process site and/or the machining tool by aspirating the gas in the neighborhood of the site under machining process and/or the machining tool.

In addition, processing other than drilling can also be performed in the same way as above. A tool and a method for machining process are not particularly limited. Specific examples thereof include drilling work to form through-holes or non-through holes using a drill as well as a router, a milling cutter, an end mill, a side cutter, or the like, and processing to cut off a workpiece material with a router, a pipe cutter, an end mill, a metal saw, or the like. Also, a coating film of titanium, diamond, diamond like carbon, or the like may be formed on the cutting edge of the machining tool in order to enhance its hardness and thereby suppress the abrasion. The lubricant material for assisting machining process of the present embodiment can prolong the lifespan of the machining tool even in any processing using such a special machining tool with the coating film formed thereon.

[Workpiece Material]

Examples of the workpiece material that is subject to the lubricant material for assisting machining process of the present embodiment include, but are not particularly limited to, a fiber reinforced composite material, a difficult-to-machining metal material, and a composite material of the fiber reinforced composite material and the difficult-to-machining metal material.

The fiber reinforced composite material is not particularly limited as long as the composite material is made of a matrix resin and a reinforcing fiber. Examples of the matrix resin include, but are not particularly limited to: thermosetting resins such as epoxy resins, phenol resins, cyanate resins, vinyl ester resins, and unsaturated polyester resins; and thermoplastic resins such as ABS (acrylonitrile-butadiene-styrene) resins, PA (polyamide) resins, PP (polypropylene) resins, PC (polycarbonate) resins, methyl methacrylate resins, polyethylene, and acryl, and polyester resins. Examples of the reinforcing fiber include, but are not particularly limited to, glass fiber, carbon fiber, and aramid fiber. Examples of the form of the reinforcing fiber include, but are not particularly limited to, filaments, tows, cloths, blades, chops, milled fibers, felt mats, papers, and prepregs. Specific examples of such a fiber reinforced composite material include, but are not particularly limited to, fiber reinforced plastics (FRP) such as carbon fiber reinforced plastics (CFRP), glass fiber reinforced plastics (GFRP), and aramid fiber reinforced plastics (AFRP). Among them, a carbon fiber reinforced plastic (CFRP) relatively having large tensile strength and tensile elastic force and small density is preferred. The fiber reinforced composite material may optionally contain an additional component such as an inorganic filler or an organic filler. The fiber reinforced plastics (FRP) conceptually comprise a reinforcing fiber and a thermosetting resin and/or a thermoplastic resin. Among others, fiber reinforced composite materials comprising a reinforcing fiber and a thermoplastic resin are also referred to as FRTP (fiber reinforced thermoplastics). For example, fiber reinforced composite materials comprising carbon fiber and a thermoplastic resin are referred to as CFRTP (carbon fiber reinforced thermoplastics).

The difficult-to-machining metal material is not particularly limited as long as the difficult-to-machining metal material is a metal generally used as a structural material. Examples thereof include titanium alloy, aluminum alloy, magnesium alloy, low alloy steel, stainless steel, and heat resistant alloy. Among them, titanium alloy is preferred. The titanium alloy is particularly preferably Ti-6Al-4V which is composed of titanium, aluminum, and vanadium and has higher hardness. The titanium alloy is a material that has tensile strength two times stronger than that of aluminum alloy and is also excellent in corrosion resistance and heat resistance. This difficult-to-machining material having high hardness requires special machining process conditions or a machining tool having a special shape for conventional techniques. However, use of the lubricant material for assisting machining process of the present embodiment eliminates the need of special machining process conditions or a machining tool having a special shape and can further prolong the lifespan of the machining tool. In terms of an intended purpose, a metal material for use in, for example, materials for the bodywork structures of aircrafts is preferred. The effect of prolonging the lifespan of the machining tool by use of the lubricant material for assisting machining process of the present embodiment becomes more apparent for a metal having higher strength. One difficult-to-machining metal material may be used alone, or two or more thereof may be used as a multilayer body.

Examples of the composite material of the fiber reinforced composite material and the difficult-to-machining metal material include, but are not particularly limited to, a material prepared as a composite from the fiber reinforced composite material and the difficult-to-machining metal material described above by lamination or the like. Usually, the fiber reinforced composite material and the difficult-to-machining metal material differ largely in optimum machining conditions. Low speed feed at high speed rotation is suitable for the fiber reinforced composite material, whereas high speed feed at low speed rotation is suitable for the difficult-to-machining metal material. This is because, for example, for the drilling work of the difficult-to-machining metal material, a rise in the temperature of the drill is suppressed and the abrasion of the drill bit is suppressed. Particularly, a heat labile diamond coated drill requires such drilling conditions. In response to these conflicting drilling conditions, drilling conditions are changed between CFRP and titanium alloy, or drilling work is practiced under the same reasonable conditions, in actual processing sites. Alternatively, in the case of performing, for example, drilling work, a machining oil is injected during the drilling work of titanium alloy intended for aircrafts, or an approach of collecting dust with a dust collector while spraying cold air is performed, in order to prevent a rise in the temperature of the drill. However, use of the lubricant material for assisting machining process of the present embodiment is secondarily effective for greatly relaxing restrictions on drilling conditions for the difficult-to-machining metal material which easily generates heat due to the heat of friction.

The thickness of the workpiece material is preferably 3 mm or larger, more preferably 5 mm or larger, further preferably 6 mm or larger, still further preferably 9 mm or larger, still further preferably 10 mm or larger, particularly preferably 15 mm or larger. The upper limit of the thickness of the workpiece material is not particularly limited and is preferably, for example, 40 mm or smaller. This is because there is a tendency to further reduce the abrasion of the machining tool and further improve the quality of a machined portion (e.g., a hole of drilling work), even if the thickness of the workpiece material is 3 mm or larger.

EXAMPLES

Hereinafter, the present invention will be specifically described with reference to Examples and Comparative Examples. Examples described below are given merely for illustrating one example of the embodiment of the present invention. The present invention is not intended to be limited by these examples.

Examples A

Table 1 shows specifications such as a workpiece material (drilling work material) used in each of Examples A and Comparative Examples A, each component used in the production of a lubricant material for assisting machining process, an adhesive layer, a drill bit used in the drilling work, a drilling work instrument, and an apparatus used in evaluation. In Examples below, the lubricant material for assisting machining process of the present embodiment molded in a sheet form is referred to as a lubricant sheet for assisting machining process, and the lubricant material for assisting machining process of the present embodiment molded in a block form is referred to as a lubricant material for assisting machining process block.

TABLE 1

| Category | Notation in table | Name | Trade name/model | Manufacturer | Remarks |
|---|---|---|---|---|---|
| Workpiece material | Ti | Titanium alloy plate | Ti—6Al—4V | — | Thickness: 3 mmt, equivalent material intended for aircrafts |
| | CFRP | Carbon fiber reinforced plastic plate | — | — | Thickness: 5 mmt, quasi-isotropic laminated equivalent material intended for aircrafts (UD material) |
| | CFRP/Ti | Composite material of carbon fiber reinforced plastic plate and titanium alloy plate | — | — | Laminate of the Ti and the CFRP |
| High molecular weight compound (A) | A-1 | Polyethylene oxide | Alkox E-45 | Meisei Chemical Works, Ltd. | $Mw = 5.6 \times 10^5$ |
| | A-2 | Polyethylene oxide | Alkox R150 | Meisei Chemical Works, Ltd. | $Mw = 1.5 \times 10^5$ |
| Medium molecular weight compound (B) | B-1 | Polyoxyethylene monostearate | Nonion S-40 | Sanyo Chemical Industries, Ltd. | $Mw = 3.5 \times 10^3$ |
| Carbon (C) | C-1 | Carbon (graphite) | XD100 | Ito Graphite Co., Ltd. | Flake shape, average particle size = 250 μm |
| | C-2 | Carbon (graphite) | XD150 | Ito Graphite Co., Ltd. | Flake shape, average particle size = 150 μm |
| | C-3 | Carbon (graphite) | X-100 | Ito Graphite Co., Ltd. | Flake shape, average particle size = 60 μm |
| | C-4 | Carbon (graphite) | RP99-150 | Ito Graphite Co., Ltd. | Flake shape, average particle size = 33 μm |
| | C-5 | Carbon (graphite) | X-10 | Ito Graphite Co., Ltd. | Flake shape, average particle size = 10 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Drill | — | Cemented carbide drill | RG-GDN | OSG Corp. | Diameter: 6.0 mmϕ Point angle: 120° Angle of twist: 40° Solid drill, not diamond coated |
| Drilling work instrument | — | Machining center | M-V5B | Mitsubishi Electric Corp. | — |

* The Vickers hardness of Ti—6Al—4V was 320.

For the average particle size (median size) of the carbon (C), the carbon was dispersed in a solution consisting of a hexametaphosphoric acid solution and a few drops of triton, and the respective maximum lengths of projected carbon particles were measured using a laser diffraction particle size distribution analyzer. Then, the cumulative distribution curve (number based) of particle sizes was calculated. A particle diameter that became 50% height in the cumulative distribution curve (number based) was used as the average particle size.

The weight average molecular weights of the high molecular weight compound (A) and the medium molecular weight compound (B) were calculated as relative average molecular weights by dissolving or dispersing each of the high molecular weight compound (A) and the medium molecular weight compound (B) in a 0.05% salt solution, followed by measurement by liquid chromatography involving GPC (gel permeation chromatography) columns with polyethylene glycol as standards.

Example A1

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD-100 manufactured by Ito Graphite Co., Ltd.) as the carbon (C) were thoroughly mixed and extrusion molded at a temperature of 140° C. using a single screw extruder to produce a sheet having a thickness of 1.0 mm. Acrylic double faced tape having a thickness of 0.12 mm (No. 535A, manufactured by Nitto Denko Corp.) was affixed as an adhesive layer to one side of this sheet such that the strongly adhesive face side was in contact with the sheet side, to produce lubricant sheet for assisting machining process a.

The face with the adhesive layer formed thereon of the produced lubricant sheet for assisting machining process a was affixed to a portion to be the entry (entry portion) of the machining tool (cemented carbide drill), in the workpiece material. The lubricant sheet for assisting machining process a and the workpiece material were fixed to the drilling work instrument using a jig. The machining process (drilling work) with the cemented carbide drill was performed under the conditions shown in Table 3. Table 3 shows results of evaluating chippings, burrs, and splintering at the periphery of a machined portion (processed hole) on the entrance side and the exit side of the drill bit, and the abrasion of the point of the drill bit.

Examples A2 to A25

A sheet was produced using a single screw extruder according to the resin composition of the high molecular weight compound (A), the medium molecular weight compound (B), and the carbon (C) shown in Table 2 in the same way as in Example A1. The strongly adhesive face of double faced tape having a thickness of 0.12 mm (No. 535A, manufactured by Nitto Denko Corp.) was affixed to one side of the sheet to produce lubricant sheet for assisting machining process b to 1.

Each of the produced lubricant sheet for assisting machining process b to 1 was fixed to a portion to be the entry (entry portion) of the machining tool (cemented carbide drill), in the workpiece material using a jig in the same way as in Example A1. The drilling work with the cemented carbide drill was performed under the conditions shown in Table 3. Table 3 shows results of evaluating chippings, burrs, and splintering at the periphery of a machined portion on the entrance side and the exit side of the drill bit, and the abrasion of the point of the drill bit.

In Examples A1 to A12, CFRP was used as the workpiece material. In Examples A13 to A20, Ti was used as the workpiece material. In Examples A21 to A25, a composite of the CFRP and the Ti was used as the workpiece material. When the composite of the CFRP and the Ti was used, the lubricant sheet for assisting machining process and the composite were laminated in the order of lubricant sheet for assisting machining process/CFRP/Ti, and the drilling work was performed from the lubricant sheet for assisting machining process side.

Comparative Examples A1 to A6

Each sheet was produced using a single screw extruder according to the resin composition of the high molecular weight compound (A), the medium molecular weight compound (B), and the carbon (C) shown in Table 2 in the same way as in Example A1. The strongly adhesive face of double faced tape having a thickness of 0.12 mm (No. 535A, manufactured by Nitto Denko Corp.) was affixed to one side of the sheet to produce lubricant sheet for assisting machining process m to r.

Each of the produced lubricant sheet for assisting machining process m to r was fixed to a portion to be the entry (entry portion) of the machining tool (cemented carbide drill), in the workpiece material using a jig in the same way as in Example A1. The drilling work with the cemented carbide drill was performed under the conditions shown in Table 3. Table 3 shows results of evaluating chippings, burrs, and splintering at the periphery of a machined portion on the entrance side and the exit side of the drill bit, and the abrasion of the point of the drill bit. In Comparative Example A6, the lubricant sheet for assisting machining process and the composite were laminated in the order of lubricant sheet for assisting machining process/CFRP/Ti, and the drilling work was performed from the lubricant sheet for assisting machining process side.

[Evaluation: Chippings, Burrs, and Splintering]

In Examples A and Comparative Examples A, the number of holes where burrs, chippings, and splintering occurred at the periphery of a machined portion on the drill bit entrance side and the drill bit exit side was visually counted using a ×10 loupe. Criteria for the evaluation of burrs, chippings, and splintering were as described below.

(Evaluation Criteria)

Burrs: protrusions that occurred around the drill bit exit when the machining tool passed from the drill bit entrance toward the drill bit exit. The ambient temperature of a machined portion was elevated due to friction so that the metal at the periphery of the machined portion was softened to thereby facilitate the occurrence of large burrs.

Chippings: concave portions that occurred at the drill bit entrance and the drill bit exit.

Splintering: phenomenon in which a part of fiber constituting a fiber reinforced composite material remained as burrs around machined portions without being cut off.

Figure 7:
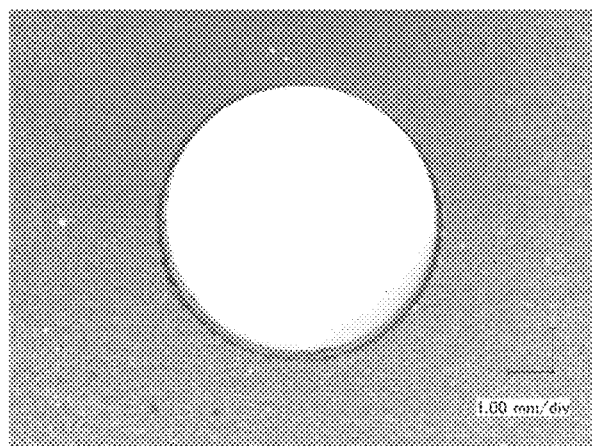
FIG. 7 shows a photograph of a machined portion (processed hole) at a drill bit entrance after processing of CFRP in Example A1.
Figure 8:
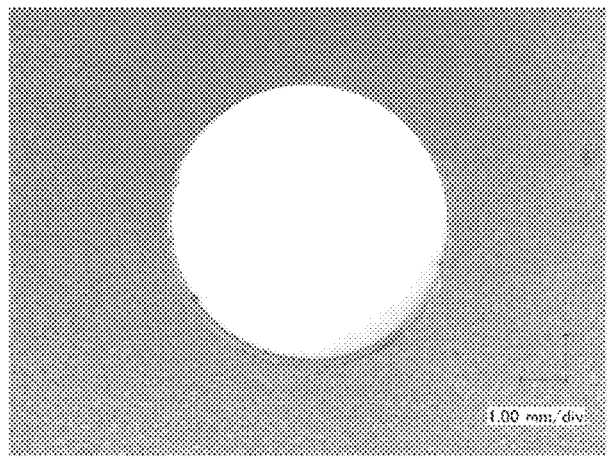
FIG. 8 shows a photograph of a machined portion (processed hole) at a drill bit exit after processing of CFRP in Example A1.

FIG. 7 shows a photograph of the drill bit entrance after the processing of CFRP in Example A1. FIG. 8 shows a photograph of the drill bit exit after the processing of CFRP in Example A1. As shown in FIGS. 7 and 8, it was evident that a favorable machined portion was formed at the drill bit entrance and exit in Example A1.

Figure 9:
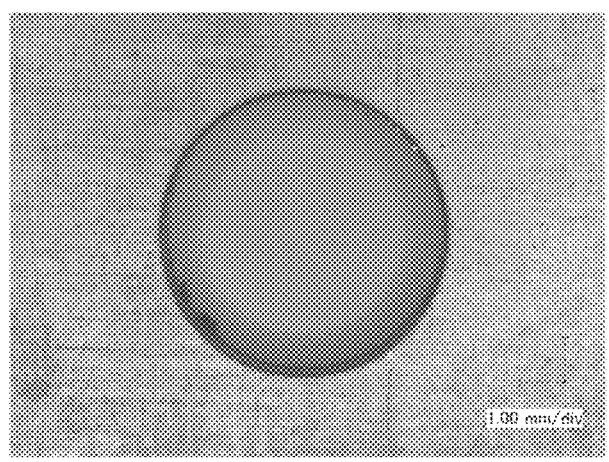
FIG. 9 shows a photograph of a machined portion (processed hole) at a drill bit exit after processing of a titanium plate in Example A13.

FIG. 9 shows a photograph of the drill bit exit after the processing of the titanium plate in Example A13. As shown in FIG. 9, it was evident that a favorable machined portion was formed at the drill bit exit in Example A13. Also, a favorable machined portion was similarly formed at the drill bit entrance.

Figure 10:
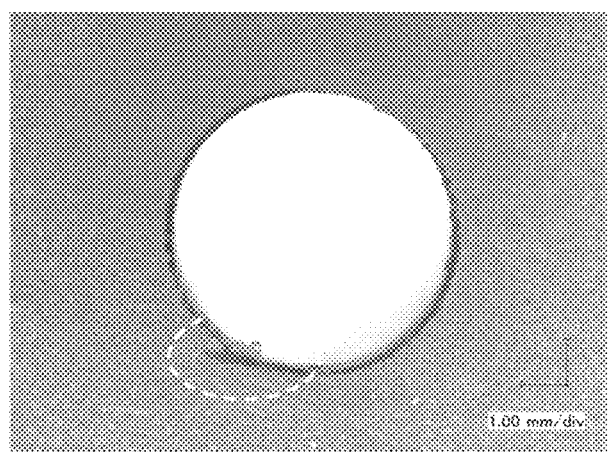
FIG. 10 shows a photograph of a machined portion (processed hole) at a drill bit entrance after processing of CFRP in Comparative Example A1.
Figure 12:
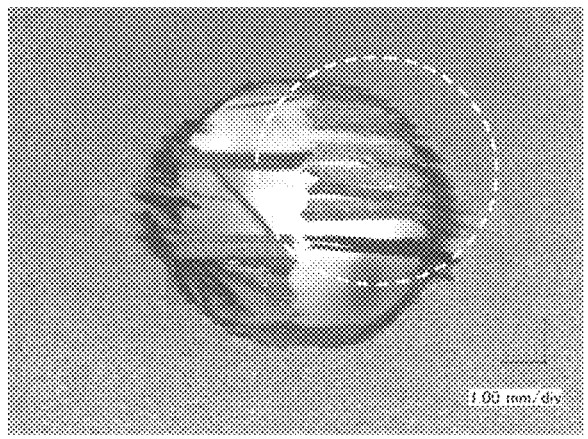
FIG. 12 shows a photograph of a machined portion (processed hole) at a drill bit exit after processing of CFRP in Comparative Example A1.

FIG. 10 shows a photograph of the drill bit entrance after the processing of CFRP in Comparative Example A1. FIG. 12 shows a photograph of the drill bit exit after the processing of CFRP in Comparative Example A1. As shown in FIG. 10, it was evident that chippings occurred on the edge of a machined portion at the drill bit entrance in Comparative Example A1. As shown in FIG. 12, it was evident that splintering occurred on the edge of a machined portion at the drill bit exit in Comparative Example A1.

Figure 11:
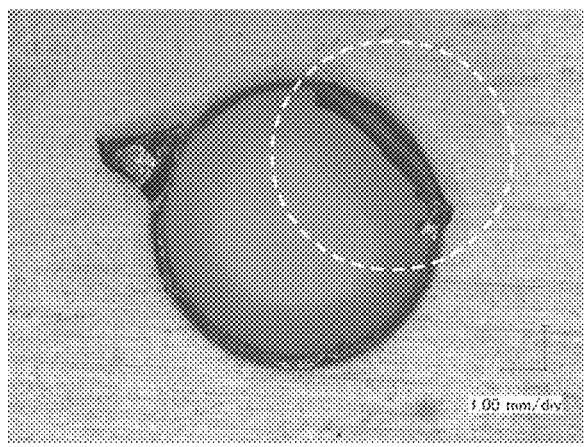
FIG. 11 shows a photograph of a machined portion (processed hole) at a drill bit exit after processing of a titanium plate in Comparative Example A5.

FIG. 11 shows a photograph of the drill bit exit after the processing of the titanium plate in Comparative Example A5. As shown in FIG. 11, it was evident that burrs occurred on the edge of a machined portion at the drill bit exit in Comparative Example A5.

[Evaluation: Abrasion of Point of Drill Bit]

Figure 6:
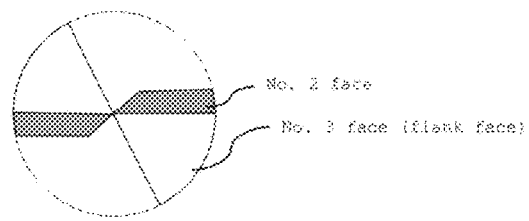
FIG. 6 shows a schematic diagram of a drill bit viewed from the drill bit point direction.

In Examples A and Comparative Examples A, the abrasion of the point of the drill bit after opening of holes according to the number of processed holes of Table 3 was visually evaluated using a ×10 loupe from the drill bit point direction. The ratio of the area of No. 2 face of a drill bit (cemented carbide drill, RG-GDN, OSG Corp.) after use (after abrasion) to the area (100%) of the No. 2 face of the drill bit in an unused fresh state was confirmed, and the abrasion of the point of the drill bit was evaluated according to evaluation criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.

[Evaluation: Amount of Components of Lubricant Material for Assisting Machining Process and Adhesive Layer Attached to Workpiece Material]

After the processing, the lubricant sheet for assisting machining process was peeled off from the workpiece material, and the amount of components of the lubricant material for assisting machining process and the adhesive layer attached to the workpiece material was confirmed by the solution extraction method. Specifically, the workpiece material after peeling off of the lubricant sheet for assisting machining process was dipped in ultrapure water. Then, only the solvent was concentrated, followed by decomposition with hydrobromic acid. Polyethylene oxide was quantitatively analyzed to confirm the amount of components of the lubricant material for assisting machining process and the adhesive layer. As a result, in Examples A, the amount of components attached was $3 \times 10^{-9}$ to $4 \times 10^{-9}$ g per mm$^2$ of a total the area of the contact portion between the workpiece material and the lubricant material for assisting machining process and the area of the machined portion.

TABLE 2

| Name of lubricant sheet for machining process | Composition | | | | | | | | | Thickness mm | Adhesive layer |
|---|---|---|---|---|---|---|---|---|---|---|---|
| | High molecular weight compound (A) | | Medium molecular weight compound (B) | Carbon (C) | | | | | Average particle size μm | | |
| | A-1 part by mass | A-2 part by mass | B-1 part by mass | C-1 part by mass | C-2 part by mass | C-3 part by mass | C-4 part by mass | C-5 part by mass | | | |
| a | 24 | 24 | 47 | 5 | | | | | 250 | 1 | Present |
| b | 20 | 20 | 40 | 20 | | | | | 250 | 1 | Present |
| c | 17 | 17 | 33 | 33 | | | | | 250 | 1 | Present |
| d | 15 | 15 | 35 | 35 | | | | | 250 | 1 | Present |
| e | 13 | 13 | 24 | 50 | | | | | 250 | 1 | Present |
| f | 10 | 10 | 20 | 60 | | | | | 250 | 1 | Present |
| g | 25 | 25 | 30 | 20 | | | | | 250 | 1 | Present |
| h | 30 | 30 | 20 | 20 | | | | | 250 | 1 | Present |
| i | 15 | 15 | 35 | | 35 | | | | 150 | 1 | Present |
| j | 5 | 15 | 35 | | 45 | | | | 150 | 1 | Present |
| k | 17 | 17 | 33 | | 33 | | | | 150 | 1 | Present |
| l | 3 | 17 | 35 | | 45 | | | | 150 | 1 | Present |
| m | 0 | 10 | 40 | | | 50 | | | 60 | 1 | Present |
| n | 17 | 17 | 33 | | | 33 | | | 60 | 1 | Present |
| o | 17 | 17 | 33 | | | | 33 | | 33 | 1 | Present |
| p | 17 | 17 | 33 | | | | | 33 | 10 | 1 | Present |
| q | 0 | 10 | 40 | | | 50 | | | 60 | 1 | Present |
| r | 0 | 10 | 40 | | | 50 | | | 60 | 5 | Present |
| s | 0 | 0 | 50 | 50 | | | | | 250 | *1 | — |
| t | 25 | 25 | 0 | 50 | | | | | 250 | *2 | — |
| u | 10 | 10 | 80 | | | | | | — | *3 | — |

*1: It was impossible to form a sheet due to too low a viscosity of the resin composition.
*2: It was impossible to form a sheet due to too high a viscosity of the resin composition.
*3: It was impossible to form a practical sheet because the sheet had no body and was fragile.

TABLE 3

| Category | Lubricant sheet for machining process | | Workpiece material | | Processing conditions | | | |
|---|---|---|---|---|---|---|---|---|
| | | | | | | Drill diameter mmφ | The number of rotations rpm | Moving speed mm/min | The number of processed holes holes |
| | Name | Placement | Material/ configuration | Thickness mm | | | | |
| Example A1 | a | Entry portion | CFRP | 5 | 6 | 5000 | 500 | 100 |
| Example A2 | b | Entry portion | CFRP | 5 | 6 | 5000 | 500 | 100 |
| Example A3 | c | Entry portion | CFRP | 5 | 6 | 5000 | 500 | 100 |
| Example A4 | d | Entry portion | CFRP | 5 | 6 | 5000 | 500 | 100 |
| Example A5 | e | Entry portion | CFRP | 5 | 6 | 5000 | 500 | 100 |
| Example A6 | f | Entry portion | CFRP | 5 | 6 | 5000 | 500 | 100 |
| Example A7 | g | Entry portion | CFRP | 5 | 6 | 5000 | 500 | 100 |
| Example A8 | h | Entry portion | CFRP | 5 | 6 | 5000 | 500 | 100 |
| Example A9 | i | Entry portion | CFRP | 5 | 6 | 5000 | 500 | 100 |
| Example A10 | j | Entry portion | CFRP | 5 | 6 | 5000 | 500 | 100 |
| Example A11 | k | Entry portion | CFRP | 5 | 6 | 5000 | 500 | 100 |

TABLE 3-continued

| Category | Notation | Portion | Material | | | | | |
|---|---|---|---|---|---|---|---|---|
| Example A12 | l | Entry portion | CFRP | 5 | 6 | 5000 | 500 | 100 |
| Example A13 | a | Entry portion | Ti | 3 | 6 | 500 | 25 | 100 |
| Example A14 | c | Entry portion | Ti | 3 | 6 | 500 | 25 | 100 |
| Example A15 | d | Entry portion | Ti | 3 | 6 | 500 | 25 | 100 |
| Example A16 | g | Entry portion | Ti | 3 | 6 | 500 | 25 | 100 |
| Example A17 | i | Entry portion | Ti | 3 | 6 | 500 | 25 | 100 |
| Example A18 | j | Entry portion | Ti | 3 | 6 | 500 | 25 | 100 |
| Example A19 | k | Entry portion | Ti | 3 | 6 | 500 | 25 | 100 |
| Example A20 | l | Entry portion | Ti | 3 | 6 | 500 | 25 | 100 |
| Example A21 | a | Entry portion | CFRP/Ti | 5/3 | 6 | 1000 | 50 | 100 |
| Example A22 | c | Entry portion | CFRP/Ti | 5/3 | 6 | 1000 | 50 | 100 |
| Example A23 | d | Entry portion | CFRP/Ti | 5/3 | 6 | 1000 | 50 | 100 |
| Example A24 | f | Entry portion | CFRP/Ti | 5/3 | 6 | 1000 | 50 | 100 |
| Example A25 | k | Entry portion | CFRP/Ti | 5/3 | 6 | 1000 | 50 | 100 |
| Comp. Ex. A1 | m | Entry portion | CFRP | 5 | 6 | 5000 | 500 | 100 |
| Comp. Ex. A2 | n | Entry portion | CFRP | 5 | 6 | 5000 | 500 | 100 |
| Comp. Ex. A3 | o | Entry portion | CFRP | 5 | 6 | 5000 | 500 | 100 |
| Comp. Ex. A4 | p | Entry portion | CFRP | 5 | 6 | 5000 | 500 | 100 |
| Comp. Ex. A5 | q | Entry portion | Ti | 3 | 6 | 500 | 25 | 100 |
| Comp. Ex. A6 | r | Entry portion | CFRP/Ti | 5/3 | 6 | 1000 | 50 | 100 |

| Category | Drill bit entrance | | | Drill bit exit | | | Abrasion of point of drill bit |
|---|---|---|---|---|---|---|---|
| | Chippings /100 holes | Burrs /100 holes | Splintering /100 holes | Chippings /100 holes | Burrs /100 holes | Splintering /100 holes | |
| Example A1 | 0 | 0 | 0 | 8 | 0 | 15 | Small |
| Example A2 | 0 | 0 | 0 | 9 | 0 | 13 | Small |
| Example A3 | 0 | 0 | 0 | 2 | 0 | 2 | Small |
| Example A4 | 0 | 0 | 0 | 2 | 0 | 1 | Small |
| Example A5 | 0 | 0 | 0 | 0 | 0 | 1 | Small |
| Example A6 | 0 | 0 | 0 | 1 | 0 | 0 | Small |
| Example A7 | 0 | 0 | 0 | 2 | 0 | 3 | Small |
| Example A8 | 0 | 0 | 0 | 4 | 0 | 4 | Small |
| Example A9 | 0 | 0 | 0 | 3 | 0 | 3 | Small |
| Example A10 | 0 | 0 | 0 | 5 | 0 | 6 | Small |
| Example A11 | 0 | 0 | 0 | 7 | 0 | 11 | Small |
| Example A12 | 0 | 0 | 0 | 7 | 0 | 9 | Small |
| Example A13 | 0 | 0 | — | 0 | 9 | — | Small |
| Example A14 | 0 | 0 | — | 0 | 6 | — | Small |
| Example A15 | 0 | 0 | — | 0 | 6 | — | Small |
| Example A16 | 0 | 0 | — | 0 | 4 | — | Small |
| Example A17 | 0 | 0 | — | 0 | 6 | — | Small |
| Example A18 | 0 | 0 | — | 0 | 10 | — | Small |
| Example A19 | 0 | 0 | — | 0 | 10 | — | Small |
| Example A20 | 0 | 0 | — | 0 | 11 | — | Small |
| Example A21 | 0 | 0 | 0 | 18 | 12 | — | Small |
| Example A22 | 0 | 0 | 0 | 8 | 9 | — | Small |
| Example A23 | 0 | 0 | 0 | 6 | 9 | — | Small |
| Example A24 | 0 | 0 | 0 | 0 | 9 | — | Small |
| Example A25 | 0 | 0 | 0 | 0 | 18 | — | Small |
| Comp. Ex. A1 | 42 | 0 | 30 | 18 | 0 | 32 | Small |
| Comp. Ex. A2 | 54 | 0 | 51 | 19 | 0 | 34 | Small |
| Comp. Ex. A3 | 69 | 0 | 58 | 25 | 0 | 39 | Small |
| Comp. Ex. A4 | 79 | 0 | 63 | 33 | 0 | 42 | Small |
| Comp. Ex. A5 | 10 | 0 | — | 9 | 80 | — | Medium |
| Comp. Ex. A6 | 62 | 0 | 59 | 49 | 87 | 89 | Large |

Examples B

Table 4 shows specifications such as a workpiece material (drilling work material) used in each of Examples B and Comparative Examples B, each component used in the production of a lubricant material for assisting machining process, an adhesive layer, a drill bit used in the drilling work, a drilling work instrument, and an apparatus used in evaluation.

TABLE 4

| Category | Notation in table | Name | Trade name/model | Manufacturer | Remarks |
|---|---|---|---|---|---|
| Workpiece material | CFRP-1 | Carbon fiber reinforced plastic plate | CFRP Laminate | Ibaraki Industry Corp. | Thickness: 5 mmt, quasi-isotropic laminated equivalent material intended for aircrafts (UD material) |

TABLE 4-continued

| Category | Notation in table | Name | Trade name/model | Manufacturer | Remarks |
|---|---|---|---|---|---|
| | CFRP-2 | Carbon fiber reinforced plastic plate | CFRP Laminate | Ibaraki Industry Corp. | Thickness: 10 mmt, quasi-isotropic laminated equivalent material intended for aircrafts (UD material) |
| | Ti | Titanium alloy plate | Ti—6Al—4V | — | Thickness: 3 mmt, equivalent material intended for aircrafts |
| | CFRP/Ti | Composite material of carbon fiber reinforced plastic plate and titanium alloy plate | — | — | Laminate of the Ti and the CFRP |
| | Ti/CFRP | Composite material of titanium alloy plate and carbon fiber reinforced plastic plate | — | — | Laminate of the Ti and the CFRP |
| High molecular weight compound (A) | A-1 | Polyethylene oxide | Alkox E-45 | Meisei Chemical Works, Ltd. | $Mw = 5.6 \times 10^5$ |
| | A-2 | Polyethylene oxide | Alkox R-150 | Meisei Chemical Works, Ltd. | $Mw = 1.5 \times 10^5$ |
| Medium molecular weight compound (B) | B-1 | Polyoxyethylene monostearate | Nonion S-40 | NOF Corp. | $Mw = 3.5 \times 10^3$ |
| Carbon (C) | C-1 | Carbon (graphite) | XD100 | Ito Graphite Co., Ltd. | Flake shape, average particle size = 250 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Drill bit | — | Cemented carbide drill | RG-GDN | OSG Corp. | Diameter: 6.0 mmφ Point angle: 120° Angle of twist: 40° Solid drill, not diamond coated |
| Drilling work instrument | — | Machining center | M-V5B | Mitsubishi Electric Corp. | — |

* The Vickers hardness of Ti—6Al—4V was 320.

The average particle size (median diameter) of the carbon (C) and the weight average molecular weights of the high molecular weight compound (A) and the medium molecular weight compound (B) were measured in the same way as in Examples A.

Example B1

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD-100 manufactured by Ito Graphite Co., Ltd.) as the carbon (C) were thoroughly mixed and extrusion molded at a temperature of 140° C. using a single screw extruder to produce a sheet having a thickness of 1.0 mm. Acrylic double faced tape having a thickness of 0.12 mm (No. 535A, manufactured by Nitto Denko Corp.) was affixed as an adhesive layer to one side of this sheet such that the strongly adhesive face side was in contact with the sheet side, to produce lubricant sheet for assisting machining process a.

The face with the adhesive layer formed thereon of the produced lubricant sheet for assisting machining process a was affixed to a portion to be the exit (exit portion) of the machining tool (cemented carbide drill), in the workpiece material. The lubricant sheet for assisting machining process a and the workpiece material were fixed to the drilling work instrument using a jig. The machining process (drilling work) with the cemented carbide drill was performed under the conditions shown in Table 6. Table 6 shows results of evaluating chippings, burrs, and splintering at the periphery of a processed hole on the entrance side and the exit side of the drill bit, and the abrasion of the point of the drill bit.

Examples B2 to B10

A sheet was produced using a single screw extruder according to the resin composition of the high molecular weight compound (A), the medium molecular weight compound (B), and the carbon (C) shown in Table 5 in the same way as in Example B1. The strongly adhesive face of double faced tape having a thickness of 0.12 mm (No. 535A, manufactured by Nitto Denko Corp.) was affixed to one side of the sheet to produce lubricant sheet for assisting machining process b.

In Examples B2 and B3, the produced lubricant sheet for assisting machining process a or b was affixed to a portion to be the exit (exit portion) of the machining tool (cemented carbide drill), in the workpiece material in the same way as in Example B1. The lubricant sheet for assisting machining process and the workpiece material were fixed to the drilling work instrument using a jig.

In Examples B4, B5, B7, and B8, the produced lubricant sheet for assisting machining process a or b were laminated in the order of lubricant sheet for assisting machining process/CFRP/lubricant sheet for assisting machining process. The lubricant sheet for assisting machining process were affixed to both sides (a portion to be the entry (entry portion) of the drill bit and a portion to be the exit (exit portion) of the drill bit). The lubricant sheet for assisting machining process and the workpiece material were fixed to the drilling work instrument using a jig.

In Examples B6 and B9, the produced lubricant sheet for assisting machining process b were laminated in the order of lubricant sheet for assisting machining process/CFRP/lubricant sheet for assisting machining process. The lubricant sheet for assisting machining process were affixed to both sides (a portion to be the entry (entry portion) of the drill bit and a portion to be the exit (exit portion) of the drill bit). The lubricant sheet for assisting machining process and the workpiece material were fixed to the drilling work instrument using a jig. As shown in FIG. 3, a lubricant material for assisting machining process block was further contacted as another lubricant material for assisting machining process with the machining tool. In this state, the machining process was performed. The lubricant material for assisting machining process block used in each of Examples B6 and B9 had the same composition as that of the lubricant sheet for assisting machining process b.

In Examples B10 to B12, a composite of CFRP and Ti (CFRP/Ti) was used as the workpiece material. In Examples B10 and B11, the lubricant sheet for assisting machining process and the composite were laminated in the order of lubricant sheet for assisting machining process/CFRP/Ti/lubricant sheet for assisting machining process, and the drilling work was performed from the CFRP side. In Example B12, the lubricant sheet for assisting machining process and the composite were laminated in the order of lubricant sheet for assisting machining process/Ti/CFRP/lubricant sheet for assisting machining process, and the drilling work was performed from the Ti side.

The drilling work with the cemented carbide drill was performed under the conditions shown in Table 6. Table 6 shows results of evaluating chippings, burrs, and splintering at the periphery of a processed hole on the entrance side and the exit side of the drill bit, and the abrasion of the point of the drill bit.

Comparative Examples B1 to B6

In Comparative Examples B1 to B3, the produced lubricant sheet for assisting machining process a or b was affixed to the entry portion of the machining tool (cemented carbide drill), in the workpiece material. The lubricant sheet for assisting machining process and the workpiece material were fixed to the drilling work instrument using a jig.

In Comparative Examples B4 to B6, a composite of CFRP and Ti was used as the workpiece material. In Comparative Examples B4 and B5, the lubricant sheet for assisting machining process and the composite were laminated in the order of lubricant sheet for assisting machining process/CFRP/Ti, and the drilling work was performed from the lubricant sheet for assisting machining process side. In Comparative Example B6, the lubricant sheet for assisting machining process and the composite were laminated in the order of lubricant sheet for assisting machining process/Ti/CFRP, and the drilling work was performed from the lubricant sheet for assisting machining process side.

The drilling work with the cemented carbide drill was performed under the conditions shown in Table 6. Table 6 shows results of evaluating chippings, burrs, and splintering at the periphery of a processed hole on the entrance side and the exit side of the drill bit, and the abrasion of the point of the drill bit.

[Evaluation: Chippings, Burrs, and Splintering]

In Examples B and Comparative Examples B, the number of holes where chippings, burrs, and splintering occurred at the periphery of a processed hole on the drill bit entrance side and the drill bit exit side was visually counted using a ×10 loupe. Criteria for the evaluation of chippings, burrs, and splintering were as described below.

(Evaluation Criteria)

Burrs: protrusions that occurred around the drill bit exit when the machining tool passed from the drill bit entrance toward the drill bit exit. The ambient temperature of a processed hole was elevated due to friction so that the metal at the periphery of the processed hole was softened to thereby facilitate the occurrence of large burrs.

Chippings: concave portions that occurred at the drill bit entrance and the drill bit exit.

Splintering: phenomenon in which a part of fiber constituting a fiber reinforced composite material remained as burrs around processed holes without being cut off.

Figure 13:
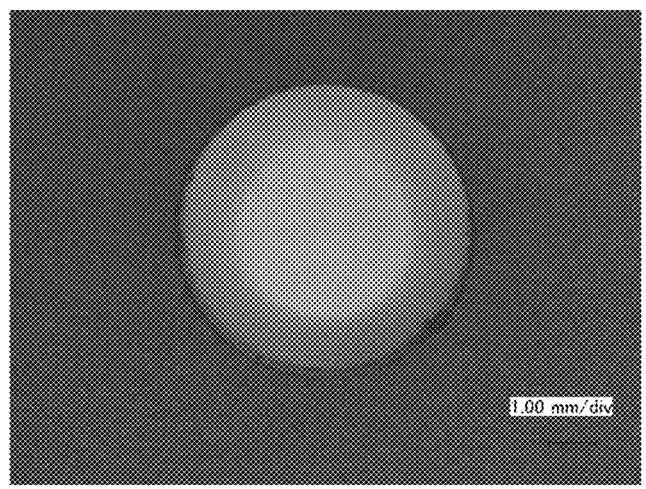
FIG. 13 shows a photograph of a machined portion (processed hole) at a drill bit exit after processing of CFRP in Example B8.
Figure 14:
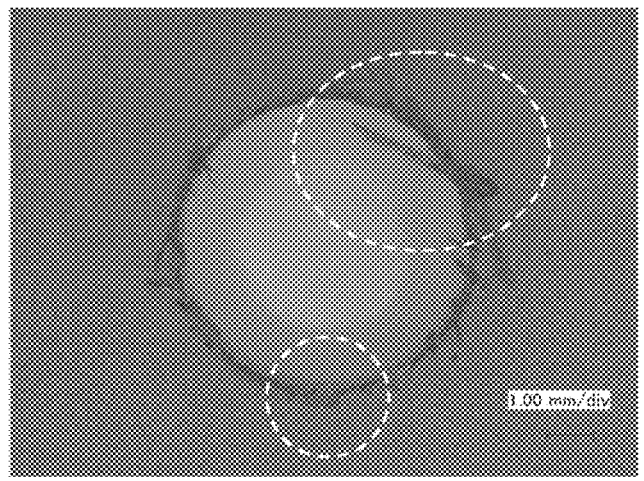
FIG. 14 shows a photograph of a machined portion (processed hole) at a drill bit exit after processing of CFRP in Comparative Example B3.

FIG. 13 shows a photograph showing the drill bit exit after the processing of CFRP in Example B8. As shown in FIG. 13, it was evident that a favorable processed hole was formed at the drill bit exit in Example B8. FIG. 14 shows a photograph showing the drill bit exit after the processing of CFRP in Comparative Example B3. As shown in FIG. 14, it was evident that chippings and splintering occurred on the edge of a processed hole at the drill bit entrance in Comparative Example B3.

[Evaluation: Abrasion of Point of Drill Bit]

In Examples B and Comparative Examples B, the abrasion of the point of the drill bit after opening of holes according to the number of processed holes of Table 6 was visually evaluated using a ×10 loupe from the drill bit point direction. The ratio of the area of No. 2 face of a drill bit (cemented carbide drill, RG-GDN, OSG Corp.) after use (after abrasion) to the area (100%) of the No. 2 face of the drill bit in an unused fresh state was confirmed, and the abrasion of the point of the drill bit was evaluated according to criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.

[Evaluation: Amount of Components of Lubricant Material for Assisting Machining Process and Adhesive Layer Attached to Workpiece Material]

After the processing, the lubricant sheet for assisting machining process was peeled off from the workpiece material, and the amount of components of the lubricant material for assisting machining process and the adhesive layer attached to the workpiece material was confirmed by the solution extraction method. Specifically, the workpiece material after peeling off of the lubricant sheet for assisting machining process was dipped in ultrapure water. Then, only the solvent was concentrated, followed by decomposition with hydrobromic acid. Polyethylene oxide was quantitatively analyzed to confirm the amount of components of the lubricant material for assisting machining process and the adhesive layer. As a result, in Examples B, the amount of components attached was $3\times10^{-9}$ to $4\times10^{-9}$ g per mm$^2$ of a total of the area of the contact portion between the workpiece material and the lubricant material for assisting machining process and the area of the machined portion.

TABLE 5

| Name of lubricant material for assisting machining process | Composition | | | | | Thickness mm | Adhesive layer |
|---|---|---|---|---|---|---|---|
| | High molecular weight compound (A) | | Medium molecular weight compound (B) | Carbon (C) | | | |
| | A-1 part by mass | A-2 part by mass | B-1 part by mass | C-1 part by mass | Median diameter μm | | |
| a | 24 | 24 | 47 | 5 | 250 | 1 | Present |
| b | 13 | 13 | 24 | 50 | 250 | 1 | Present |

TABLE 6

| Category | Lubricant sheet for assisting machining process | | Workpiece material | | Processing conditions | | |
|---|---|---|---|---|---|---|---|
| | Name | Placement | Material/configuration | Thickness mm | Drill bit diameter mmϕ | The number of rotations rpm | Moving speed mm/min |
| Example B1 | a | Exit portion | CFRP-1 | 5 | 6 | 5000 | 500 |
| Example B2 | a | Exit portion | CFRP-2 | 10 | 6 | 5000 | 500 |
| Example B3 | b | Exit portion | CFRP-2 | 10 | 6 | 5000 | 500 |
| Example B4 | a | Exit portion/entry portion | CFRP-1 | 5 | 6 | 5000 | 500 |
| Example B5 | b | Exit portion/entry portion | CFRP-1 | 5 | 6 | 5000 | 500 |
| Example B6 | b | Contact/exit portion/entry portion | CFRP-1 | 5 | 6 | 5000 | 500 |
| Example B7 | a | Exit portion/entry portion | CFRP-2 | 10 | 6 | 5000 | 500 |
| Example B8 | b | Exit portion/entry portion | CFRP-2 | 10 | 6 | 5000 | 500 |
| Example B9 | b | Contact/exit portion/entry portion | CFRP-2 | 10 | 6 | 5000 | 500 |
| Example B10 | a | Exit portion/entry portion | CFRP/Ti | 5/3 | 6 | 1000 | 50 |
| Example B11 | b | Exit portion/entry portion | CFRP/Ti | 5/3 | 6 | 1000 | 50 |
| Example B12 | b | Exit portion/entry portion | Ti/CFRP | 3/5 | 6 | 1000 | 50 |
| Comparative Example B1 | a | Entry portion | CFRP-1 | 5 | 6 | 5000 | 500 |
| Comparative Example B2 | a | Entry portion | CFRP-2 | 10 | 6 | 5000 | 500 |
| Comparative Example B3 | b | Entry portion | CFRP-2 | 10 | 6 | 5000 | 500 |
| Comparative Example B4 | a | Entry portion | CFRP/Ti | 5/3 | 6 | 1000 | 50 |
| Comparative Example B5 | b | Entry portion | CFRP/Ti | 5/3 | 6 | 1000 | 50 |
| Comparative Example B6 | b | Entry portion | Ti/CFRP | 3/5 | 6 | 1000 | 50 |

| Category | The number of processed holes holes | Drill bit entrance | | | Drill bit exit | | | Abrasion of point of drill bit |
|---|---|---|---|---|---|---|---|---|
| | | Chippings /100 holes | Burrs /100 holes | Splintering /100 holes | Chippings /100 holes | Burrs /100 holes | Splintering /100 holes | |
| Example B1 | 100 | 1 | 0 | 11 | 0 | 0 | 0 | Small |
| Example B2 | 100 | 5 | 0 | 9 | 1 | 0 | 0 | Small |
| Example B3 | 100 | 5 | 0 | 2 | 0 | 0 | 0 | Small |
| Example B4 | 100 | 0 | 0 | 0 | 0 | 0 | 0 | Small |
| Example B5 | 100 | 0 | 0 | 0 | 0 | 0 | 0 | Small |
| Example B6 | 100 | 0 | 0 | 0 | 0 | 0 | 1 | Small |
| Example B7 | 100 | 0 | 0 | 0 | 0 | 0 | 0 | Small |

TABLE 6-continued

| | | | | | | | | |
|---|---|---|---|---|---|---|---|---|
| Example B8 | 100 | 0 | 0 | 0 | 0 | 0 | 0 | Small |
| Example B9 | 100 | 3 | 0 | 1 | 0 | 0 | 0 | Small |
| Example B10 | 100 | 0 | 0 | 0 | 1 | 2 | — | Small |
| Example B11 | 100 | 0 | 0 | 0 | 0 | 1 | — | Small |
| Example B12 | 100 | 0 | 0 | — | 5 | 2 | 4 | Small |
| Comparative Example B1 | 100 | 0 | 0 | 0 | 8 | 0 | 15 | Small |
| Comparative Example B2 | 100 | 0 | 0 | 0 | 12 | 2 | 26 | Small |
| Comparative Example B3 | 100 | 0 | 0 | 0 | 11 | 0 | 17 | Small |
| Comparative Example B4 | 100 | 0 | 0 | 0 | 18 | 12 | — | Small |
| Comparative Example B5 | 100 | 0 | 0 | 0 | 8 | 8 | — | Small |
| Comparative Example B6 | 100 | 0 | 0 | — | 24 | 14 | 35 | Small |

Examples C

Table 7 shows specifications such as a workpiece material (drilling work material) used in each of Examples C and Comparative Examples C, each component used in the production of a lubricant material for assisting machining process, an adhesive layer, a drill bit used in the drilling work, a drilling work instrument, and an apparatus used in evaluation.

TABLE 7

| Category | Notation in table | Name | Trade name/model | Manufacturer | Remarks |
|---|---|---|---|---|---|
| Workpiece material | Ti | Titanium alloy plate | Ti—6Al—4V | — | Thickness: 3 mmt, equivalent material intended for aircrafts |
| | CFRP | Carbon fiber reinforced plastic plate | CFRP Laminate | Ibaraki Industry Corp. | Thickness: 5 mmt, quasi-isotropic laminated equivalent material intended for aircrafts (UD material) |
| | CFRP/Ti | Composite material of carbon fiber reinforced plastic plate and titanium alloy plate | — | — | Laminate of the Ti and the CFRP |
| | Ti/CFRP | Composite material of titanium alloy plate and carbon fiber reinforced plastic plate | — | — | Laminate of the Ti and the CFRP |
| High molecular weight compound (A) | A-1 | Polyethylene oxide | Alkox E-45 | Meisei Chemical Works, Ltd. | Mw = $5.6 \times 10^5$ |
| | A-2 | Polyethylene oxide | Alkox R-150 | Meisei Chemical Works, Ltd. | Mw = $1.5 \times 10^5$ |
| Medium molecular weight compound (B) | B-1 | Polyoxyethylene monostearate | Nonion S-40 | NOF Corp. | Mw = $3.5 \times 10^3$ |
| Carbon (C) | C-1 | Carbon (graphite) | XD100 | Ito Graphite Co., Ltd. | Flake shape, average particle size = 250 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Drill bit | — | Cemented carbide drill | RG-GDN | OSG Corp. | Diameter: 6.0 mmφ Point angle: 120° Angle of twist: 40° Solid drill, not diamond coated |

TABLE 7-continued

| Category | Notation in table | Name | Trade name/model | Manufacturer | Remarks |
|---|---|---|---|---|---|
| Drilling work instrument | — | Machining center | M-V5B | Mitsubishi Electric Corp. | — |

\* The Vickers hardness of Ti—6Al—4V was 320.

The average particle size (median diameter) of the carbon (C) and the weight average molecular weights of the high molecular weight compound (A) and the medium molecular weight compound (B) were measured in the same way as in Examples A.

Example C1

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD-100 manufactured by Ito Graphite Co., Ltd.) as the carbon (C) were thoroughly mixed and extrusion molded at a temperature of 140° C. using a single screw extruder to produce a sheet having a thickness of 1.0 mm. Acrylic double faced tape having a thickness of 0.12 mm (No. 535A, manufactured by Nitto Denko Corp.) was affixed as an adhesive layer to one side of this sheet such that the strongly adhesive face side was in contact with the sheet side, to produce lubricant sheet for assisting machining process a.

The face with the adhesive layer formed thereon of the produced lubricant sheet for assisting machining process a was affixed to a portion to be the exit (exit portion) of the machining tool (cemented carbide drill), in the workpiece material. The lubricant sheet for assisting machining process a and the workpiece material were fixed to the drilling work instrument using a jig. The machining process (drilling work) with the cemented carbide drill was performed under the conditions shown in Table 9. Table 9 shows results of evaluating chippings, burrs, and splintering at the periphery of a processed hole on the entrance side and the exit side of the drill bit, and the abrasion of the point of the drill bit.

Examples C2 to C8

A sheet was produced using a single screw extruder according to the resin composition of the high molecular weight compound (A), the medium molecular weight compound (B), and the carbon (C) shown in Table 8 in the same way as in Example C1. The strongly adhesive face of double faced tape having a thickness of 0.12 mm (No. 535A, manufactured by Nitto Denko Corp.) was affixed to one side of the sheet to produce lubricant sheet for assisting machining process b.

In Example C2, the produced lubricant sheet for assisting machining process b was affixed to a portion to be the exit (exit portion) of the machining tool (cemented carbide drill), in the workpiece material in the same way as in Example C1. The lubricant sheet for assisting machining process and the workpiece material were fixed to the drilling work instrument using a jig.

In Examples C3 and C4, the produced lubricant sheet for assisting machining process a or b were laminated in the order of lubricant sheet for assisting machining process/Ti/ lubricant sheet for assisting machining process. The lubricant sheet for assisting machining process were affixed to both sides (a portion to be the entry (entry portion) of the drill bit and a portion to be the exit (exit portion)). The lubricant sheet for assisting machining process and the workpiece material were fixed using a jig.

In Example C5, the produced lubricant sheet for assisting machining process b was affixed to a portion to be the exit (exit portion) of the machining tool (cemented carbide drill), in the workpiece material in the same way as in Example C1. The lubricant sheet for assisting machining process and the workpiece material were fixed to the drilling work instrument using a jig. As shown in FIG. 3, a lubricant material for assisting machining process block was further contacted as another lubricant material for assisting machining process with the machining tool. In this state, the machining process was performed. The lubricant material for assisting machining process block used in Example C5 had the same composition as that of the lubricant sheet for assisting machining process b.

In Examples C6 to C8, a composite of CFRP and Ti (CFRP/Ti) was used as the workpiece material. In Examples C6 and C7, the lubricant sheet for assisting machining process and the composite were laminated in the order of lubricant sheet for assisting machining process/CFRP/Ti/ lubricant sheet for assisting machining process, and the drilling work was performed from the CFRP side. In Example C8, the lubricant sheet for assisting machining process and the composite were laminated in the order of lubricant sheet for assisting machining process/Ti/CFRP/ lubricant sheet for assisting machining process, and the drilling work was performed from the Ti side.

The drilling work with the cemented carbide drill was performed under the conditions shown in Table 9. Table 9 shows results of evaluating chippings, burrs, and splintering at the periphery of a processed hole on the entrance side and the exit side of the drill bit, and the abrasion of the point of the drill bit.

Comparative Examples C1 to C5

In Comparative Examples C1 and C2, the produced lubricant sheet for assisting machining process a or b was affixed to the entry portion of the machining tool (cemented carbide drill), in the workpiece material. The lubricant sheet for assisting machining process and the workpiece material were fixed to the drilling work instrument using a jig.

In Comparative Examples C3 to C5, a composite of CFRP and Ti was used as the workpiece material. In Comparative Examples C3 and C4, the lubricant sheet for assisting machining process and the composite were laminated in the order of lubricant sheet for assisting machining process/ CFRP/Ti, and the drilling work was performed from the lubricant sheet for assisting machining process side. In Comparative Example C5, the lubricant sheet for assisting machining process and the composite were laminated in the order of lubricant sheet for assisting machining process/Ti/

CFRP, and the drilling work was performed from the lubricant sheet for assisting machining process side.

The drilling work with the cemented carbide drill was performed under the conditions shown in Table 9. Table 9 shows results of evaluating chippings, burrs, and splintering at the periphery of a processed hole on the entrance side and the exit side of the drill bit, and the abrasion of the point of the drill bit.

[Evaluation: Chippings, Burrs, and Splintering]

In Examples C and Comparative Examples C, the number of holes where chippings, burrs, and splintering occurred at the periphery of a processed hole on the drill bit entrance side and the drill bit exit side was visually counted using a ×10 loupe. Criteria for the evaluation of chippings, burrs, and splintering were as described below.

(Evaluation Criteria)

Burrs: protrusions that occurred around the drill bit exit when the machining tool passed from the drill bit entrance toward the drill bit exit. The ambient temperature of a processed hole was elevated due to friction so that the metal at the periphery of the processed hole was softened to thereby facilitate the occurrence of large burrs.

Chippings: concave portions that occurred at the drill bit entrance and the drill bit exit.

Splintering: phenomenon in which a part of fiber constituting a fiber reinforced composite material remained as burrs around processed holes without being cut off.

Figure 15:
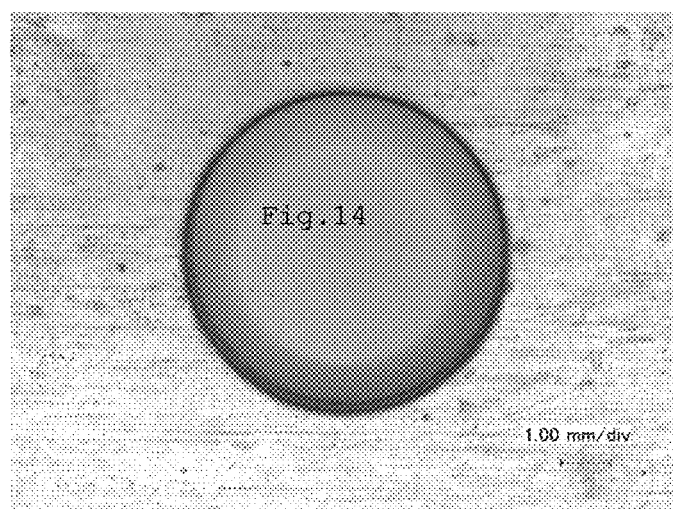
FIG. 15 shows a photograph of a machined portion (processed hole) at a drill bit exit after processing of a titanium alloy plate in Example C1.

FIG. 15 shows a photograph showing the drill bit exit after processing of a titanium alloy plate in Example C1. As shown in FIG. 15, it was evident that a favorable processed hole was formed at the drill bit exit in Example C1.

Figure 16:
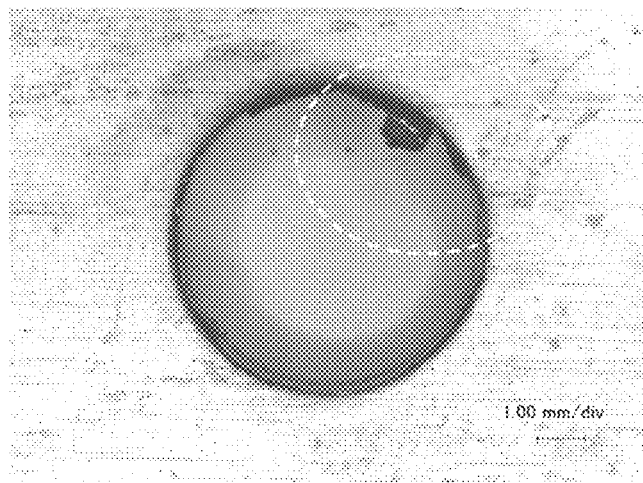
FIG. 16 shows a photograph of a machined portion (processed hole) at a drill bit exit after processing of a titanium alloy plate in Comparative Example C1.

FIG. 16 shows a photograph showing the drill bit exit after processing of a titanium alloy plate in Comparative Example C1. As shown in FIG. 16, it was evident that chippings and burrs occurred on the edge of a processed hole at the drill bit entrance in Comparative Example C1.

[Evaluation: Abrasion of Point of Drill Bit]

In Examples C and Comparative Examples C, the abrasion of the point of the drill bit after opening of holes according to the number of processed holes of Table 9 was visually evaluated using a ×10 loupe from the drill bit point direction. The ratio of the area of No. 2 face of a drill bit (cemented carbide drill, RG-GDN, OSG Corp.) after use (after abrasion) to the area (100%) of the No. 2 face of the drill bit in an unused fresh state was confirmed, and the abrasion of the point of the drill bit was evaluated according to evaluation criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.

[Evaluation: Amount of Components of Lubricant Material for Assisting Machining Process and Adhesive Layer Attached to Workpiece Material]

After the processing, the lubricant sheet for assisting machining process was peeled off from the workpiece material, and the amount of components of the lubricant material for assisting machining process and the adhesive layer attached to the workpiece material was confirmed by the solution extraction method. Specifically, the workpiece material after peeling off of the lubricant sheet for assisting machining process was dipped in ultrapure water. Then, only the solvent was concentrated, followed by decomposition with hydrobromic acid. Polyethylene oxide was quantitatively analyzed to confirm the amount of components of the lubricant material for assisting machining process and the adhesive layer. As a result, in Examples C, the amount of components attached was $3 \times 10^{-9}$ to $4 \times 10^{-9}$ g per mm$^2$ of a total of the area of the contact portion between the workpiece material and the lubricant material for assisting machining process and the area of the machined portion.

TABLE 8

| | Composition | | | | | | |
|---|---|---|---|---|---|---|---|
| Name of lubricant sheet for assisting machining process | High molecular weight compound (A) | | Medium molecular weight compound (B) | Carbon (C) | | Thickness mm | Adhesive layer |
| | A-1 part by mass | A-2 part by mass | B-1 part by mass | C-1 part by mass | Average particle size μm | | |
| a | 24 | 24 | 47 | 5 | 250 | 1 | Present |
| b | 13 | 13 | 24 | 50 | 250 | 1 | Present |

TABLE 9

| | Lubricant sheet for assisting machining process | | Workpiece material | | Processing conditions | | | |
|---|---|---|---|---|---|---|---|---|
| | | | | | | | | The number of processed holes /100 holes |
| Category | Name | Placement | Material/ configuration | Thickness mm | Drill bit diameter mmφ | The number of rotations rpm | Moving speed mm/min | |
| Example C1 | a | Exit portion | Ti | 3 | 6 | 500 | 25 | 100 |
| Example C2 | b | Exit portion | Ti | 3 | 6 | 500 | 25 | 100 |

TABLE 9-continued

| | | | | | | | | |
|---|---|---|---|---|---|---|---|---|
| Example C3 | a | Exit portion/entry portion | Ti | 3 | 6 | 500 | 25 | 100 |
| Example C4 | b | Exit portion/entry portion | Ti | 3 | 6 | 500 | 25 | 100 |
| Example C5 | b | Contact/exit portion | Ti | 3 | 6 | 500 | 25 | 100 |
| Example C6 | a | Exit portion/entry portion | CFRP/Ti | 5/3 | 6 | 1000 | 50 | 100 |
| Example C7 | b | Exit portion/entry portion | CFRP/Ti | 5/3 | 6 | 1000 | 50 | 100 |
| Example C8 | b | Exit portion/entry portion | Ti/CFRP | 3/5 | 6 | 1000 | 50 | 100 |
| Comparative Example C1 | a | Entry portion | Ti | 3 | 6 | 500 | 25 | 100 |
| Comparative Example C2 | b | Entry portion | Ti | 3 | 6 | 500 | 25 | 100 |
| Comparative Example C3 | a | Entry portion | CFRP/Ti | 5/3 | 6 | 1000 | 50 | 100 |
| Comparative Example C4 | b | Entry portion | CFRP/Ti | 5/3 | 6 | 1000 | 50 | 100 |
| Comparative Example C5 | b | Entry portion | Ti/CFRP | 3/5 | 6 | 1000 | 50 | 100 |

| Category | Drill bit entrance | | | Drill bit exit | | | Abrasion of point of drill bit |
|---|---|---|---|---|---|---|---|
| | Chippings /100 holes | Burrs /100 holes | Splintering /100 holes | Chippings /100 holes | Burrs /100 holes | Splintering /100 holes | |
| Example C1 | 0 | 0 | — | 0 | 1 | — | Small |
| Example C2 | 0 | 0 | — | 0 | 0 | — | Small |
| Example C3 | 0 | 0 | — | 0 | 0 | — | Small |
| Example C4 | 0 | 0 | — | 0 | 0 | — | Small |
| Example C5 | 0 | 0 | — | 0 | 0 | — | Small |
| Example C6 | 0 | 0 | 0 | 1 | 2 | — | Small |
| Example C7 | 0 | 0 | 0 | 0 | 1 | — | Small |
| Example C8 | 0 | 0 | — | 5 | 2 | 4 | Small |
| Comparative Example C1 | 0 | 0 | — | 0 | 9 | — | Small |
| Comparative Example C2 | 0 | 0 | — | 0 | 5 | — | Small |
| Comparative Example C3 | 0 | 0 | 0 | 18 | 12 | — | Small |
| Comparative Example C4 | 0 | 0 | 0 | 8 | 8 | — | Small |
| Comparative Example C5 | 0 | 0 | — | 24 | 14 | 35 | Small |

Examples D

Table 10 shows specifications such as a workpiece material (drilling work material) used in each of Examples D and Comparative Example D, each component used in the production of a lubricant material for assisting machining process, an adhesive layer, a drill bit used in the drilling work, a drilling work instrument, and an apparatus used in evaluation.

TABLE 10

| Category | Notation in table | Name | Trade name/model | Manufacturer | Remarks |
|---|---|---|---|---|---|
| Workpiece material | CFRP | Carbon fiber reinforced plastic plate | — | Ibaraki Industry Corp. | Thickness: 20 mmt, quasi-isotropic laminated equivalent material intended for aircrafts (UD material) |
| High molecular weight compound (A) | A-1 | Polyethylene oxide | Alkox E-45 | Meisei Chemical Works, Ltd. | $Mw = 5.6 \times 10^5$ |
| | A-2 | Polyethylene oxide | Alkox R-150 | Meisei Chemical Works, Ltd. | $Mw = 1.5 \times 10^5$ |
| Medium molecular weight compound (B) | B-1 | Polyoxyethylene monostearate | Nonion S-40 | NOF Corp. | $Mw = 3.5 \times 10^3$ |

TABLE 10-continued

| Category | Notation in table | Name | Trade name/model | Manufacturer | Remarks |
|---|---|---|---|---|---|
| Carbon (C) | C-1 | Carbon (graphite) | XD100 | Ito Graphite Co., Ltd. | Flake shape, average particle size = 250 μm |
| | C-2 | Carbon (graphite) | X-100 | Ito Graphite Co., Ltd. | Flake shape, average particle size = 60 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Drill bit | — | Cemented carbide drill | RG-GDN | OSG Corp. | Diameter: 17.78 mmφ Point angle: 120° Angle of twist: 40° Solid drill, not diamond coated |
| Drilling work instrument | — | Machining center | M-V5B | Mitsubishi Electric Corp. | — |

The average particle size (median diameter) of the carbon (C) and the weight average molecular weights of the high molecular weight compound (A) and the medium molecular weight compound (B) were measured in the same way as in Examples A.

Example D1

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD100 manufactured by Ito Graphite Co., Ltd.) as the carbon (C) were molded at a temperature of 140° C. using a single screw extruder to produce a sheet having a thickness of 1.0 mm. The strongly adhesive face of double faced tape having a thickness of 0.12 mm (No. 535A, manufactured by Nitto Denko Corp.) was affixed to one side of the sheet to produce lubricant sheet for assisting machining process a.

The produced lubricant sheet for assisting machining process a was affixed to a portion to be the entry (entry portion) of the cemented carbide drill, in the workpiece material. The lubricant sheet for assisting machining process and the workpiece material were fixed to the drilling work instrument using a jig. The drilling work with the cemented carbide drill was performed under the conditions shown in Table 12. Table 12 shows results of evaluating chippings, burrs, and splintering at the periphery of a processed hole on the entrance side and the exit side of the drill bit, and the abrasion of the point of the drill bit.

Examples D2 to D7

Each sheet was produced using a single screw extruder according to the resin composition of the high molecular weight compound (A), the medium molecular weight compound (B), and the carbon (C), and the thickness shown in Table 11 in the same way as in Example D1. The strongly adhesive face of double faced tape having a thickness of 0.12 mm (No. 535A, manufactured by Nitto Denko Corp.) was affixed to one side of the sheet to produce lubricant sheet for assisting machining process b to e.

In Examples D2 to D5, each of the produced lubricant sheet for assisting machining process b to e was affixed to the entry portion of the cemented carbide drill, in the workpiece material in the same way as in Example D1. The lubricant sheet for assisting machining process and the workpiece material were fixed to the drilling work instrument using a jig.

In Examples D6 and D7, the produced lubricant sheet for assisting machining process b or b and d were affixed to the entry portion and the exit portion of the cemented carbide drill, in the workpiece material. The lubricant sheet for assisting machining process and the workpiece material were fixed to the drilling work instrument using a jig.

The drilling work with the cemented carbide drill was performed under the conditions shown in Table 12. Table 12 shows results of evaluating chippings, burrs, and splintering at the periphery of a processed hole on the entrance side and the exit side of the drill bit, and the abrasion of the point of the drill bit.

Comparative Example D1

The drilling work with the cemented carbide drill was performed under the conditions shown in Table 12 in the same way as in Example D1 except that no lubricant sheet for assisting machining process was used. Table 12 shows results of evaluating chippings, burrs, and splintering at the periphery of a processed hole on the entrance side and the exit side of the drill bit, and the abrasion of the point of the drill bit.

[Evaluation: Chippings, Burrs, and Splintering]

In Examples D and Comparative Example D, the number of holes where burrs, chippings, and splintering occurred at the periphery of a processed hole at the drill bit entrance and exit was visually counted using a ×10 loupe. Criteria for the evaluation of burrs, chippings, and splintering were as described below.

(Evaluation Criteria)

Burrs: protrusions that occurred around the drill bit exit when the drill passed from the drill bit entrance toward the drill bit exit. The drill bit becomes dull due to its abrasion to thereby facilitate the occurrence of large burrs.

Chippings: concave portions that occurred at the drill bit entrance and the drill bit exit.

Splintering: phenomenon in which a part of fiber constituting a fiber reinforced composite material remained as burrs around processed holes without being cut off.

Figure 17:
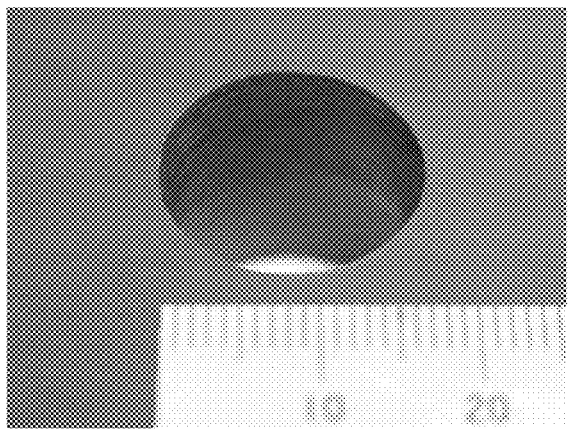
FIG. 17 shows a photograph of a machined portion (processed hole) at a drill bit entrance after processing of CFRP in Example D6.
Figure 18:
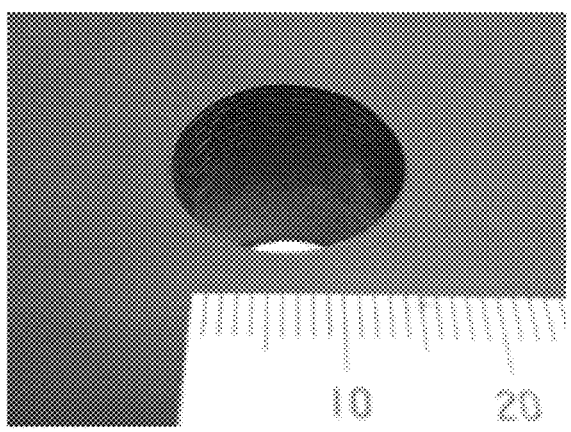
FIG. 18 shows a photograph of a machined portion (processed hole) at a drill bit exit after processing of CFRP in Example D6.

FIG. 17 shows a photograph of the drill bit entrance after the processing of CFRP in Example D6. FIG. 18 shows a photograph of the drill bit exit after the processing of CFRP in Example D6. As shown in FIGS. 17 and 18, it was evident that a favorable processed hole was formed at the drill bit entrance and exit in Example D6.

Figure 19:
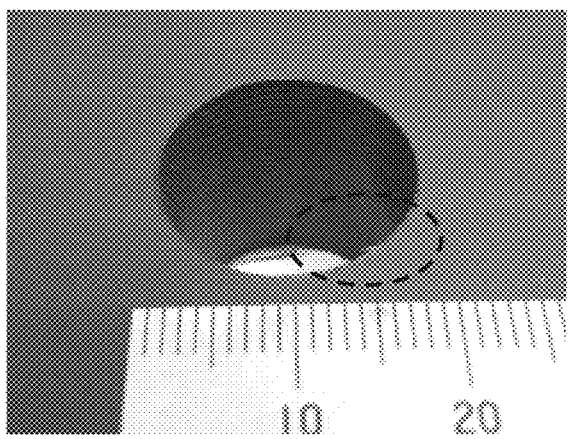
FIG. 19 shows a photograph of a machined portion (processed hole) at a drill bit entrance after processing of CFRP in Comparative Example D1.
Figure 20:
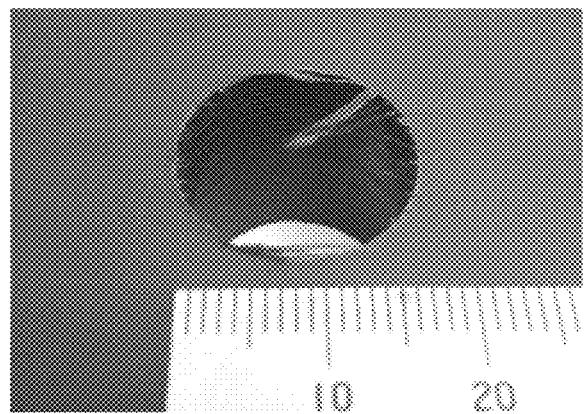
FIG. 20 shows a photograph of a machined portion (processed hole) at a drill bit exit after processing of CFRP in Comparative Example D1.

FIG. 19 shows a photograph of the drill bit entrance after the processing of CFRP in Comparative Example D1. FIG. 20 shows a photograph of the drill bit exit after the processing of CFRP in Comparative Example D1. As shown in FIGS. 19 and 20, it was evident that chippings occurred on the edge of a processed hole at the drill bit entrance, and splintering occurred on the edge of a processed hole at the drill bit exit, in Comparative Example D1.

[Evaluation: Abrasion of Point of Drill Bit]

In Examples D and Comparative Examples D, the abrasion of the point of the drill bit after opening of holes according to the number of processed holes of Table 12 was visually evaluated using a ×10 loupe from the drill bit point direction. The ratio of the area of No. 2 face of a drill bit (cemented carbide drill, RG-GDN, manufactured by OSG Corp.) after use (after abrasion) to the area (100%) of the No. 2 face of the drill bit in an unused fresh state was confirmed, and the abrasion of the point of the drill bit was evaluated according to evaluation criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.

[Evaluation: Amount of Components of Lubricant for Machining Process and Adhesive Layer Attached to Workpiece Material]

After the processing, the lubricant sheet for machining process was peeled off from the workpiece material, and the amount of components of the lubricant for machining process and the adhesive layer attached to the workpiece material was confirmed by the solution extraction method. Specifically, the workpiece material after peeling off of the lubricant sheet for machining process was dipped in ultrapure water. Then, only the solvent was concentrated, followed by decomposition with hydrobromic acid. Polyethylene oxide was quantitatively analyzed to confirm the amount of components of the lubricant for machining process and the adhesive layer. As a result, in Examples D, the amount of components attached was $3 \times 10^{-9}$ to $4 \times 10^{-9}$ g per mm² of a total of the area of the contact portion between the workpiece material and the lubricant material for assisting machining process and the area of the machined portion.

TABLE 11

| Name of lubricant sheet for assisting machining process | Composition | | | | | | | |
|---|---|---|---|---|---|---|---|---|
| | High molecular weight compound (A) | | Medium molecular weight compound (B) | Carbon (C) | | | | |
| | A-1 part by mass | A-2 part by mass | B-1 part by mass | C-1 part by mass | C-2 part by mass | Average particle size μm | Thickness mm | Adhesive layer |
| a | 24 | 24 | 47 | 5 | | 250 | 1 | Present |
| b | 15 | 15 | 35 | 35 | | 250 | 1 | Present |
| c | 15 | 15 | 35 | 35 | | 250 | 2 | Present |
| d | 15 | 15 | 35 | 35 | | 250 | 5 | Present |
| e | 0 | 10 | 40 | | 50 | 60 | 1 | Present |

TABLE 12

| Category | Name and placement of lubricant sheet for assisting machining process | | Workpiece material | | Processing conditions | | | |
|---|---|---|---|---|---|---|---|---|
| | Entry portion | Exit portion | Material/ configuration | Thickness mm | Drill bit diameter mmφ | The number of rotations rpm | Moving speed mm/min | The number of processed holes holes |
| Example D1 | a | None | CFRP | 20 | 17.78 | 1500 | 150 | 40 |
| Example D2 | b | None | CFRP | 20 | 17.78 | 1500 | 150 | 40 |
| Example D3 | c | None | CFRP | 20 | 17.78 | 1500 | 150 | 40 |
| Example D4 | d | None | CFRP | 20 | 17.78 | 1500 | 150 | 40 |
| Example D5 | e | None | CFRP | 20 | 17.78 | 1500 | 150 | 40 |

TABLE 12-continued

| | | | | | | | | |
|---|---|---|---|---|---|---|---|---|
| Example D6 | b | b | CFRP | 20 | 17.78 | 1500 | 150 | 40 |
| Example D7 | d | b | CFRP | 20 | 17.78 | 1500 | 150 | 40 |
| Comparative Example D1 | None | None | CFRP | 20 | 17.78 | 1500 | 150 | 40 |

| | Drill bit entrance | | | Chippings Drill bit exit | | | Abrasion of point |
|---|---|---|---|---|---|---|---|
| Category | Chippings /40 holes | Burrs /40 holes | Splintering /40 holes | Chippings /40 holes | Burrs /40 holes | Splintering /40 holes | of drill bit |
| Example D1 | 1 | 0 | 2 | 7 | 1 | 9 | Small |
| Example D2 | 1 | 0 | 1 | 7 | 1 | 7 | Small |
| Example D3 | 1 | 0 | 1 | 7 | 2 | 6 | Small |
| Example D4 | 1 | 0 | 1 | 3 | 1 | 4 | Small |
| Example D5 | 1 | 0 | 1 | 13 | 2 | 19 | Small |
| Example D6 | 0 | 0 | 1 | 2 | 0 | 2 | Small |
| Example D7 | 0 | 0 | 1 | 2 | 0 | 1 | Small |
| Comparative Example D1 | 9 | 2 | 19 | 19 | 3 | 28 | Medium |

Examples E

Table 13 shows specifications such as a workpiece material (drilling work material) used in each of Examples E and Comparative Example E, each component used in the production of a lubricant material for assisting machining process, an adhesive layer, a drill bit used in the drilling work, a drilling work instrument, and an apparatus used in evaluation.

TABLE 13

| Category | Notation in table | Name | Trade name/model | Manufacturer | Remarks |
|---|---|---|---|---|---|
| Workpiece material | Ti | Titanium alloy plate | Ti—6Al—4V | — | Thickness: 20 mmt, equivalent material intended for aircrafts |
| | CFRP | Carbon fiber reinforced plastic plate | — | Ibaraki Industry Corp. | Thickness: 20 mmt, quasi-isotropic laminated equivalent material intended for aircrafts (UD material) |
| High molecular weight compound (A) | A-1 | Polyethylene oxide | Alkox E-45 | Meisei Chemical Works, Ltd. | Mw = $5.6 \times 10^5$ |
| | A-2 | Polyethylene oxide | Alkox R-150 | Meisei Chemical Works, Ltd. | Mw = $1.5 \times 10^5$ |
| Medium molecular weight compound (B) | B-1 | Polyoxyethylene monostearate | Nonion S-40 | NOF Corp. | Mw = $3.5 \times 10^3$ |
| Carbon (C) | C-1 | Carbon (graphite) | XD100 | Ito Graphite Co., Ltd. | Flake shape, average particle size = 250 μm |
| | C-2 | Carbon (graphite) | X-100 | Ito Graphite Co., Ltd. | Flake shape, average particle size = 60 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Drill bit | — | Cemented carbide drill | RG-GDN | OSG Corp. | Diameter: 17.78 mmϕ Point angle: 120° Angle of twist: 40° Solid drill, not diamond coated |

TABLE 13-continued

| Category | Notation in table | Name | Trade name/model | Manufacturer | Remarks |
|---|---|---|---|---|---|
| Drilling work instrument | — | Machining center | M-V5B | Mitsubishi Electric Corp. | — |

\* The Vickers hardness of Ti—6Al—4V was 320.

The average particle size (median diameter) of the carbon (C) and the weight average molecular weights of the high molecular weight compound (A) and the medium molecular weight compound (B) were measured in the same way as in Examples A.

Example E1

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD100 manufactured by Ito Graphite Co., Ltd.) as the carbon (C) were molded at a temperature of 140° C. using a single screw extruder to produce a sheet having a thickness of 1.0 mm. The strongly adhesive face of double faced tape having a thickness of 0.12 mm (No. 535A, manufactured by Nitto Denko Corp.) was affixed to one side of the sheet to produce lubricant sheet for assisting machining process a.

The face with the adhesive layer formed thereon of the produced lubricant sheet for assisting machining process a was affixed to a portion to be the entry (entry portion) of the machining tool (cemented carbide drill), in the workpiece material. The lubricant sheet for assisting machining process and the workpiece material were fixed to the drilling work instrument using a jig. The drilling work with the cemented carbide drill was performed under the conditions shown in Table 15. Table 15 shows results of evaluating chippings and burrs at the periphery of a processed hole on the entrance side and the exit side of the drill bit, and the abrasion of the point of the drill bit.

Examples E2 to E9

Each sheet was produced using a single screw extruder according to the resin composition of the high molecular weight compound (A), the medium molecular weight compound (B), and the carbon (C), and the thickness shown in Table 14 in the same way as in Example E1. The strongly adhesive face of double faced tape having a thickness of 0.12 mm (No. 535A, manufactured by Nitto Denko Corp.) was affixed to one side of the sheet to produce lubricant sheet for assisting machining process b to e.

In Examples E2 to E5, each of the produced lubricant sheet for assisting machining process b to e was affixed to the entry portion of the machining tool (cemented carbide drill), in the workpiece material in the same way as in Example E1. The lubricant sheet for assisting machining process and the workpiece material were fixed to the drilling work instrument using a jig.

In Examples E6 and E7, the produced lubricant sheet for assisting machining process b and b or d and b were affixed to the entry portion and the exit portion, respectively, of the machining tool (cemented carbide drill), in the workpiece material. The lubricant sheet for assisting machining process and the workpiece material were fixed to the drilling work instrument using a jig.

In Examples E8 and E9, a composite of CFRP and Ti (CFRP/Ti) was used as the workpiece material, and the lubricant sheet for assisting machining process c or d was used. In Examples E8 and E9, the lubricant sheet for assisting machining process and the composite were laminated in the order of lubricant sheet for assisting machining process/CFRP/Ti/lubricant sheet for assisting machining process, and the drilling work was performed from the CFRP side.

The drilling work with the cemented carbide drill was performed under the conditions shown in Table 15. Table 15 shows results of evaluating the number of holes that were processable by the machining process (the number of processed holes), chippings and burrs at the periphery of a processed hole on the entrance side and the exit side of the drill bit at the number of holes processed by the machining process, and the abrasion of the point of the drill bit.

Comparative Examples E1 and E2

In Comparative Example E1, the drilling work with the cemented carbide drill was performed under the conditions shown in Table 15 in the same way as in Example E1 except that no lubricant sheet for assisting machining process was used.

In Comparative Example E2, the drilling work with the cemented carbide drill was performed under the conditions shown in Table 15 in the same way as in Example E8 except that no lubricant sheet for assisting machining process was used.

Table 15 shows results of evaluating the number of holes that were processable by the machining process, chippings and burrs at the periphery of a processed hole on the entrance side and the exit side of the drill bit at the number of holes processed by the machining process, and the abrasion of the point of the drill bit.

[Evaluation: The Number of Processable Holes, Chippings, and Burrs]

In Examples E and Comparative Examples E, the number of holes where burrs and chippings occurred at the periphery of a processed hole at the drill bit entrance and exit was visually counted using a ×10 loupe. Criteria for the evaluation of the number of processable holes, burrs, and chippings were as described below.

(Evaluation Criteria)

The number of processable holes: the machining process was terminated when the breakage, abnormal noise, or ignition of the drill bit arose during the machining process. The number of holes processed before the termination was used as the number of processable holes.

Chippings: concave portions that occurred at the drill bit entrance and the drill bit exit.

Burrs: protrusions that occurred around the drill bit exit when the machining tool passes from the drill bit entrance toward the drill bit exit. The ambient temperature of a processed hole was elevated due to friction so that the metal at the periphery of the processed hole was softened to thereby facilitate the occurrence of large burrs.

Splintering: phenomenon in which a part of fiber constituting a fiber reinforced composite material remained as burrs around processed holes without being cut off.

Figure 21:
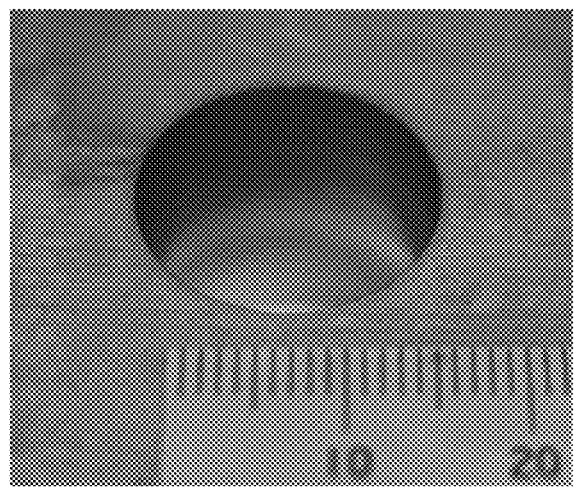
FIG. 21 shows a photograph of a machined portion (processed hole) at a drill bit entrance after processing of titanium alloy in Example E2.
Figure 22:
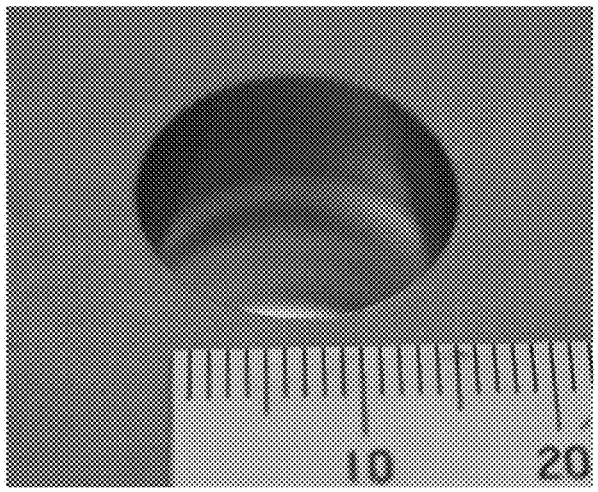
FIG. 22 shows a photograph of a machined portion (processed hole) at a drill bit exit after processing of titanium alloy in Example E2.

FIG. 21 shows a photograph of the drill bit entrance after the processing of the titanium alloy in Example E2. FIG. 22 shows a photograph of the drill bit exit after the processing of the titanium alloy in Example E2. As shown in FIGS. 21 and 22, it was evident that a favorable processed hole was formed at the drill bit entrance and exit in Example E2.

Figure 23:
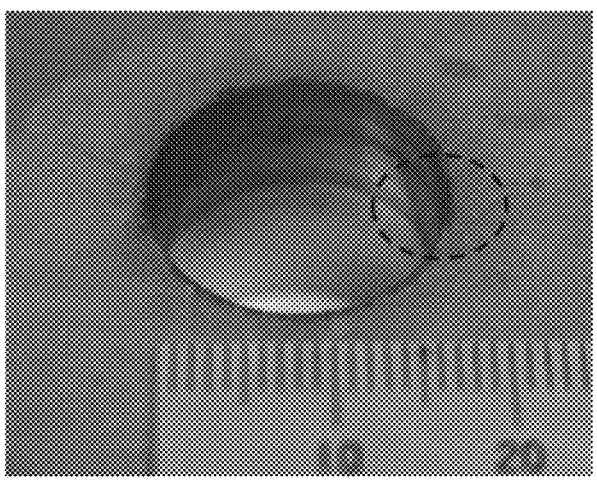
FIG. 23 shows a photograph of a machined portion (processed hole) at a drill bit entrance after processing of titanium alloy in Comparative Example E1.
Figure 24:
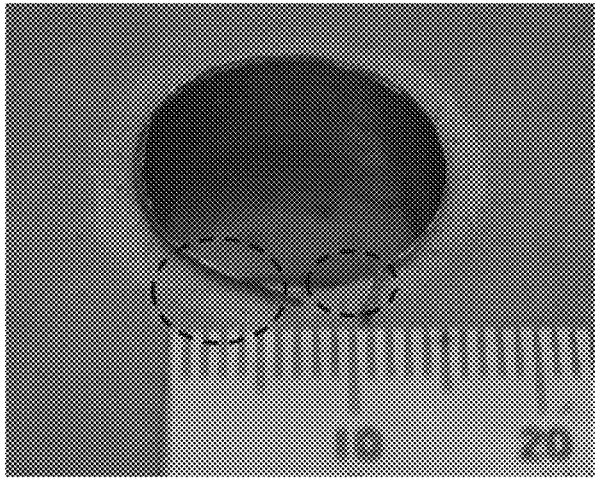
FIG. 24 shows a photograph of a machined portion (processed hole) at a drill bit exit after processing of titanium alloy in Comparative Example E1.

FIG. 23 shows a photograph of the drill bit entrance after the processing of the titanium alloy in Comparative Example E1. FIG. 24 shows a photograph of the drill bit exit after the processing of the titanium alloy in Comparative Example E1. As shown in FIGS. 23 and 24, it was evident that burrs and chippings occurred on the edge of a processed hole at the drill bit entrance, and chippings occurred on the edge of a processed hole at the drill bit exit, in Comparative Example E1.

[Evaluation: Abrasion of Point of Drill Bit]

In Examples E and Comparative Examples E, the abrasion of the point of the drill bit after opening of holes according to the number of processed holes of Table 15 was visually evaluated using a ×10 loupe from the drill bit point direction. The ratio of the area of No. 2 face of a drill bit (cemented carbide drill, RG-GDN, manufactured by OSG Corp.) after use (after abrasion) to the area (100%) of the No. 2 face of the drill bit in an unused fresh state was confirmed, and the abrasion of the point of the drill bit was evaluated according to evaluation criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.

[Evaluation: Amount of Components of Lubricant for Machining Process and Adhesive Layer Attached to Workpiece Material]

After the processing, the lubricant sheet for machining process was peeled off from the workpiece material, and the amount of components of the lubricant for machining process and the adhesive layer attached to the workpiece material was confirmed by the solution extraction method. Specifically, the workpiece material after peeling off of the lubricant sheet for machining process was dipped in ultrapure water. Then, only the solvent was concentrated, followed by decomposition with hydrobromic acid. Polyethylene oxide was quantitatively analyzed to confirm the amount of components of the lubricant for machining process and the adhesive layer. As a result, in Examples E, the amount of components attached was $3 \times 10^{-9}$ to $4 \times 10^{-9}$ g per mm$^2$ of a total of the area of the contact portion between the workpiece material and the lubricant material for assisting machining process and the area of the machined portion.

TABLE 14

| Name of lubricant sheet for assisting machining process | Composition | | | | | Average particle size μm | Thickness mm | Adhesive layer |
|---|---|---|---|---|---|---|---|---|
| | High molecular weight compound (A) | | Medium molecular weight compound (B) | Carbon (C) | | | | |
| | A-1 part by mass | A-2 part by mass | B-1 part by mass | C-1 part by mass | C-2 part by mass | | | |
| a | 24 | 24 | 47 | 5 | | 250 | 1 | Present |
| b | 15 | 15 | 35 | 35 | | 250 | 1 | Present |
| c | 15 | 15 | 35 | 35 | | 250 | 2 | Present |
| d | 15 | 15 | 35 | 35 | | 250 | 5 | Present |
| e | 0 | 10 | 40 | | 50 | 60 | 1 | Present |

TABLE 15

| Category | Name and placement of lubricant sheet for assisting machining process | | Workpiece material | | Processing conditions | | | The number of processed holes |
|---|---|---|---|---|---|---|---|---|
| | Entry portion | Exit portion | Material/configuration | Thickness mm | Drill bit diameter mmϕ | The number of rotations rpm | Moving speed mm/min | holes |
| Example E1 | a | None | Ti | 20 | 17.78 | 200 | 25 | 3 |
| Example E2 | b | None | Ti | 20 | 17.78 | 200 | 25 | 3 |
| Example E3 | c | None | Ti | 20 | 17.78 | 200 | 25 | 6 |
| Example E4 | d | None | Ti | 20 | 17.78 | 200 | 25 | 10 |
| Example E5 | e | None | Ti | 20 | 17.78 | 200 | 25 | 1 |
| Example E6 | b | b | Ti | 20 | 17.78 | 200 | 25 | 8 |
| Example E7 | d | b | Ti | 20 | 17.78 | 200 | 25 | 14 |

TABLE 15-continued

| | | | | | | | | |
|---|---|---|---|---|---|---|---|---|
| Example E8 | c | None | CFRP/Ti | 20/20 | 17.78 | 500 | 25 | 5 |
| Example E9 | d | None | CFRP/Ti | 20/20 | 17.78 | 500 | 25 | 9 |
| Comparative Example E1 | None | None | Ti | 20 | 17.78 | 200 | 25 | 1 |
| Comparative Example E2 | None | None | CFRP/Ti | 20/20 | 17.78 | 500 | 25 | 1 |

| Category | Drill bit entrance | | | Drill bit exit | | | Abrasion of point of drill bit |
|---|---|---|---|---|---|---|---|
| | Chippings holes | Burrs holes | Splintering holes | Chippings holes | Burrs holes | Splintering holes | |
| Example E1 | 0 | 0 | — | 1 | 0 | — | Small |
| Example E2 | 0 | 0 | — | 0 | 0 | — | Small |
| Example E3 | 0 | 0 | — | 0 | 1 | — | Small |
| Example E4 | 0 | 0 | — | 0 | 1 | — | Small |
| Example E5 | 0 | 0 | — | 0 | 1 | — | Medium |
| Example E6 | 0 | 0 | — | 0 | 1 | — | Small |
| Example E7 | 0 | 0 | — | 0 | 1 | — | Small |
| Example E8 | 0 | 0 | 0 | 1 | 1 | — | Small |
| Example E9 | 0 | 0 | 0 | 1 | 1 | — | Small |
| Comparative Example E1 | 1 | 0 | — | 1 | 1 | — | Large |
| Comparative Example E2 | 1 | 1 | 1 | 1 | 1 | — | Large |

Examples F

Table 16 shows specifications such as a workpiece material (machining process material) used in each of Examples F and Comparative Examples F, each component used in the production of a lubricant material for assisting machining process, an adhesive layer, a drill bit used in the drilling work, a machining process instrument, and an apparatus used in evaluation.

TABLE 16

| Category | Notation in table | Name | Trade name/ model | Manufacturer | Remarks |
|---|---|---|---|---|---|
| Workpiece material | CFRP-1 | Carbon fiber reinforced plastic plate | — | Ibaraki Industry Corp. | Thickness: 10 mmt, quasi-isotropic laminated equivalent material intended for aircrafts (UD material) |
| | CFRP-2 | Carbon fiber reinforced plastic plate | — | Ibaraki Industry Corp. | Thickness: 20 mmt, quasi-isotropic laminated equivalent material intended for aircrafts (UD material) |
| High molecular weight compound (A) | A-1 | Polyethylene oxide | Alkox E-45 | Meisei Chemical Works, Ltd. | $Mw = 5.6 \times 10^5$ |
| | A-2 | Polyethylene oxide | Alkox R-150 | Meisei Chemical Works, Ltd. | $Mw = 1.5 \times 10^5$ |
| Medium molecular weight compound (B) | B-1 | Polyoxyethylene monostearate | Nonion S-40 | NOF Corp. | $Mw = 3.5 \times 10^3$ |
| Carbon (C) | C-1 | Carbon (graphite) | XD100 | Ito Graphite Co., Ltd. | Flake shape, average particle size = 250 μm |
| | C-2 | Carbon (graphite) | X-100 | Ito Graphite Co., Ltd. | Flake shape, average particle size = 60 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Drill bit | D-1 | Cemented carbide drill | RG-GDN | OSG Corp. | Diameter: 6.0 mmϕ Point angle: 120° Angle of twist: 40° |

TABLE 16-continued

| Category | Notation in table | Name | Trade name/model | Manufacturer | Remarks |
|---|---|---|---|---|---|
| | D-2 | Cemented carbide drill | RG-GDN | OSG Corp. | Solid drill, not diamond coated Diameter: 17.78 mm$\phi$ Point angle: 120° Angle of twist: 40° Solid drill, not diamond coated |
| Drilling work instrument | — | Machining center | M-V5B | Mitsubishi Electric Corp. | — |

The average particle size (median diameter) of the carbon (C) and the weight average molecular weights of the high molecular weight compound (A) and the medium molecular weight compound (B) were measured in the same way as in Examples A.

[Procedure of Producing Lubricant Sheet for Assisting Machining Process]

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD-100 manufactured by Ito Graphite Co., Ltd.) as the carbon (C) were molded at a temperature of 140° C. using a single screw extruder to produce a sheet having a thickness of 1.0 mm. The strongly adhesive face of double faced tape having a thickness of 0.12 mm (No. 535A, manufactured by Nitto Denko Corp.) was affixed to one side of the sheet to produce lubricant sheet for assisting machining process a. Each sheet was produced using a single screw extruder according to the resin composition of the high molecular weight compound (A), the medium molecular weight compound (B), and the carbon (C), and the thickness shown in Table 17. The strongly adhesive face of double faced tape having a thickness of 0.12 mm (No. 535A, manufactured by Nitto Denko Corp.) was affixed to one side of the sheet to produce lubricant sheet for assisting machining process b to e.

Examples F1 to F3

In Example F1, the produced lubricant sheet for assisting machining process a was affixed to a portion to be the entry (entry portion) of the machining tool (cemented carbide drill), in the workpiece material. The lubricant sheet for assisting machining process and the workpiece material were fixed to the drilling work instrument using a jig. The drilling work with the cemented carbide drill was performed under the conditions shown in Table 18. CFRP having a thickness of 10 mm was used as the workpiece material, and the drilling work was performed under conditions where the diameter of the drill bit was 6 mm and the number of processed holes per drill bit was 100 holes.

In Examples F2 and F3, the drilling work was performed in the same way as in Example F1 except that the lubricant sheet for assisting machining process b or e was used instead of the lubricant sheet for assisting machining process a. Table 18 shows results of evaluating chippings, burrs, and splintering at the periphery of a processed hole on the entrance side and the exit side of the drill bit, and the abrasion of the point of the drill bit.

Comparative Example F1

The drilling work was performed in the same way as in Example 1 except that only the workpiece material was fixed to the drilling work instrument using a jig without the use of the lubricant sheet for assisting machining process. Table 18 shows results of evaluating chippings, burrs, and splintering at the periphery of a processed hole on the entrance side and the exit side of the drill bit, and the abrasion of the point of the drill bit.

Examples F4 to F10

In Examples F4 to F8, each of the produced lubricant sheet for assisting machining process a to e was affixed to the entry portion of the machining tool (cemented carbide drill), in the workpiece material. The lubricant sheet for assisting machining process and the workpiece material were fixed to the drilling work instrument using a jig. The drilling work with the cemented carbide drill was performed under the conditions shown in Table 19. CFRP having a thickness of 20 mm was used as the workpiece material, and the drilling work was performed under conditions where the diameter of the drill bit was 17.78 mm and the number of processed holes per drill bit was 40 holes.

In Examples F9 and F10, the drilling work was performed in the same way as in Examples F4 to F8 except that the lubricant sheet for assisting machining process b or d was affixed, instead of the lubricant sheet for assisting machining process a to e, to the entry portion of the machining tool (cemented carbide drill), in the workpiece material, the lubricant sheet for assisting machining process b was affixed to the exit portion of the machining tool (cemented carbide drill), in the workpiece material, and the lubricant sheet for assisting machining process and the workpiece material were fixed to the drilling work instrument using a jig. Table 19 shows results of evaluating chippings, burrs, and splintering at the periphery of a processed hole on the entrance side and the exit side of the drill bit, and the abrasion of the point of the drill bit.

Comparative Example F2

The drilling work was performed in the same way as in Example F4 except that only the workpiece material was fixed to the drilling work instrument using a jig without the use of the lubricant sheet for assisting machining process. Table 19 shows results of evaluating chippings, burrs, and splintering at the periphery of a processed hole on the entrance side and the exit side of the drill bit, and the abrasion of the point of the drill bit.

[Evaluation: Chippings, Burrs, and Splintering]

In Examples F and Comparative Examples F, the number of holes where burrs, chippings, and splintering occurred at the periphery of a processed hole at the drill bit entrance and exit was visually counted using a ×10 loupe. Criteria for the evaluation of burrs, chippings, and splintering were as described below.

(Evaluation Criteria)

Burrs: protrusions that occurred around the drill bit exit when the machining tool passed from the drill bit entrance toward the drill bit exit. The drill bit becomes dull due to its abrasion to thereby facilitate the occurrence of large burrs.

Chippings: concave portions that occurred at the drill bit entrance and the drill bit exit.

Splintering: phenomenon in which a part of fiber constituting a fiber reinforced composite material remains as burrs around processed holes without being cut off.

Figure 25:
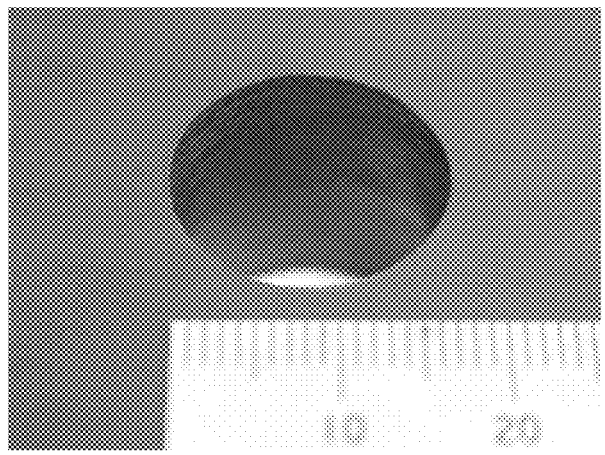
FIG. 25 shows a photograph of a machined portion (processed hole) at a drill bit entrance after processing of CFRP in Example F9.
Figure 26:
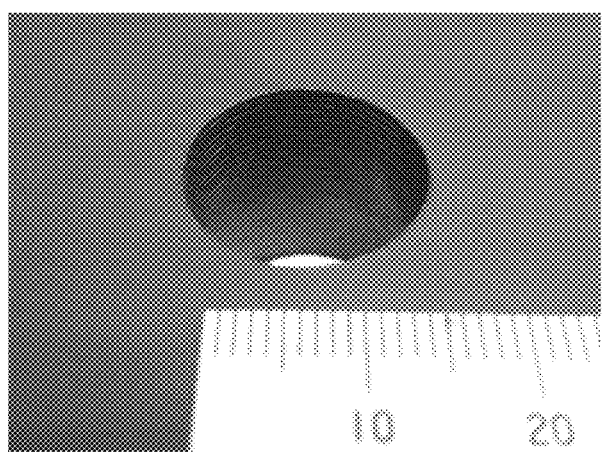
FIG. 26 shows a photograph of a machined portion (processed hole) at a drill bit exit after processing of CFRP in Example F9.
Figure 27:
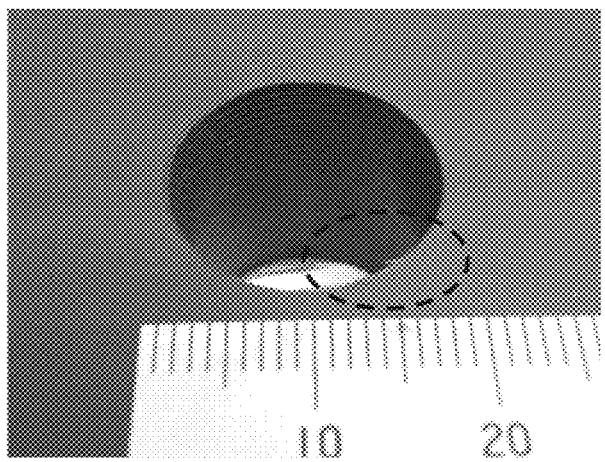
FIG. 27 shows a photograph of a machined portion (processed hole) at a drill bit entrance after processing of CFRP in Comparative Example F2.
Figure 28:
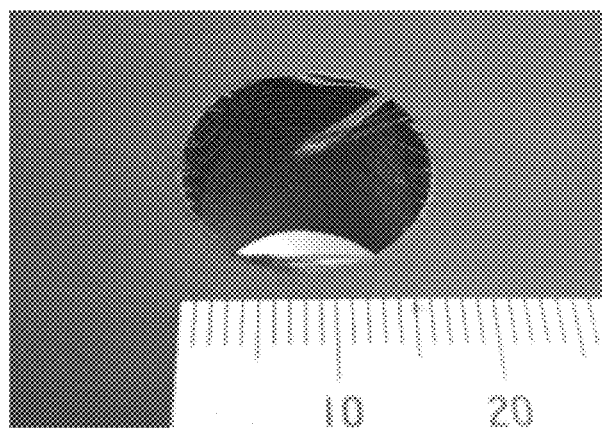
FIG. 28 shows a photograph of a machined portion (processed hole) at a drill bit exit after processing of CFRP in Comparative Example F2.

FIG. 25 shows a photograph of the drill bit entrance after the processing of CFRP in Example F9. FIG. 26 shows a photograph of the drill bit exit after the processing of CFRP in Example F9. As shown in FIGS. 25 and 26, it was evident that a favorable processed hole was formed at the drill bit entrance and exit in Example F9. FIG. 27 shows a photograph of the drill bit entrance after the processing of CFRP in Comparative Example F2. FIG. 28 shows a photograph of the drill bit exit after the processing of CFRP in Comparative Example F2. As shown in FIGS. 27 and 28, it was evident that chippings occurred on the edge of a processed hole at the drill bit entrance, and splintering occurred on the edge of a processed hole at the drill bit exit, in Comparative Example F2.

[Evaluation: Abrasion of Point of Drill Bit]

In Examples F and Comparative Examples F, the abrasion of the point of the drill bit after opening of holes according to the number of processed holes of Tables 18 and 19 was visually evaluated using a ×10 loupe from the drill bit point direction. The ratio of the area of No. 2 face of a drill bit (cemented carbide drill, RG-GDN, manufactured by OSG Corp.) after use (after abrasion) to the area (100%) of the No. 2 face of the drill bit in an unused fresh state was confirmed, and the abrasion of the point of the drill bit was evaluated according to criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.

[Evaluation: Amount of Components of Lubricant for Machining Process and Adhesive Layer Attached to Workpiece Material]

After the processing, the lubricant sheet for machining process was peeled off from the workpiece material, and the amount of components of the lubricant for machining process and the adhesive layer attached to the workpiece material was confirmed by the solution extraction method. Specifically, the workpiece material after peeling off of the lubricant sheet for machining process was dipped in ultra-pure water. Then, only the solvent was concentrated, followed by decomposition with hydrobromic acid. Polyethylene oxide was quantitatively analyzed to confirm the amount of components of the lubricant for machining process and the adhesive layer. As a result, in Examples F, the amount of components attached was $3 \times 10^{-9}$ to $4 \times 10^{-9}$ g per mm² of a total of the area of the contact portion between the workpiece material and the lubricant material for assisting machining process and the area of the machined portion.

TABLE 17

| | Composition | | | | | | | |
|---|---|---|---|---|---|---|---|---|
| | High molecular weight compound (A) | | Medium molecular weight compound | Carbon (C) | | | | |
| Name of lubricant sheet for assisting machining process | A-1 part by mass | A-2 part by mass | (B) B-1 part by mass | C-1 part by mass | C-2 part by mass | Average particle size μm | Thickness mm | Adhesive layer |
| a | 24 | 24 | 47 | 5 | | 250 | 1 | Present |
| b | 15 | 15 | 35 | 35 | | 250 | 1 | Present |
| c | 15 | 15 | 35 | 35 | | 250 | 2 | Present |
| d | 15 | 15 | 35 | 35 | | 250 | 5 | Present |
| e | 0 | 10 | 40 | | 50 | 60 | 1 | Present |

TABLE 18

| | Lubricant sheet for assisting machining process Name/Placement | | Workpiece material | | Processing conditions | | | | |
|---|---|---|---|---|---|---|---|---|---|
| Category | Entry portion | Exit portion | Material/ configuration | Thickness mm | Drill bit name | Drill bit diameter mmφ | The number of rotations rpm | Moving speed mm/min | The number of processed holes holes |
| Example F1 | a | None | CFRP-1 | 10 | D-1 | 6 | 5000 | 500 | 100 |
| Example F2 | b | None | CFRP-1 | 10 | D-1 | 6 | 5000 | 500 | 100 |
| Example F3 | e | None | CFRP-1 | 10 | D-1 | 6 | 5000 | 500 | 100 |

TABLE 18-continued

| Category | | | | | | | | |
|---|---|---|---|---|---|---|---|---|
| Comparative Example F1 | None | None | CFRP-1 | 10 | D-1 | 6 | 5000 | 500 | 100 |

| Category | Drill bit entrance | | | Drill bit exit | | | Abrasion of point of drill bit |
|---|---|---|---|---|---|---|---|
| | Chippings /100 holes | Burrs /100 holes | Splintering /100 holes | Chippings /100 holes | Burrs /100 holes | Splintering /100 holes | |
| Example F1 | 0 | 0 | 0 | 12 | 2 | 26 | Small |
| Example F2 | 0 | 0 | 0 | 10 | 1 | 18 | Small |
| Example F3 | 1 | 0 | 1 | 23 | 3 | 32 | Small |
| Comparative Example F1 | 18 | 4 | 22 | 56 | 15 | 95 | Medium |

TABLE 19

| Category | Lubricant sheet for assisting machining process Name/Placement | | Workpiece material | | Processing conditions | | | |
|---|---|---|---|---|---|---|---|---|
| | Entry portion | Exit portion | Material/ configuration | Thickness mm | Drill bit name | Drill bit diameter mmφ | The number of rotations rpm | Moving speed mm/min | The number of processed holes |
| Example F4 | a | None | CFRP-2 | 20 | D-2 | 17.78 | 1500 | 150 | 40 |
| Example F5 | b | None | CFRP-2 | 20 | D-2 | 17.78 | 1500 | 150 | 40 |
| Example F6 | c | None | CFRP-2 | 20 | D-2 | 17.78 | 1500 | 150 | 40 |
| Example F7 | d | None | CFRP-2 | 20 | D-2 | 17.78 | 1500 | 150 | 40 |
| Example F8 | e | None | CFRP-2 | 20 | D-2 | 17.78 | 1500 | 150 | 40 |
| Example F9 | b | b | CFRP-2 | 20 | D-2 | 17.78 | 1500 | 150 | 40 |
| Example F10 | d | b | CFRP-2 | 20 | D-2 | 17.78 | 1500 | 150 | 40 |
| Comparative Example F2 | None | None | CFRP-2 | 20 | D-2 | 17.78 | 1500 | 150 | 40 |

| Category | Drill bit entrance | | | Drill bit exit | | | Abrasion of point of drill bit |
|---|---|---|---|---|---|---|---|
| | Chippings /40 holes | Burrs /40 holes | Splintering /40 holes | Chippings /40 holes | Burrs /40 holes | Splintering /40 holes | |
| Example F4 | 1 | 0 | 2 | 7 | 1 | 9 | Small |
| Example F5 | 1 | 0 | 1 | 7 | 1 | 7 | Small |
| Example F6 | 1 | 0 | 1 | 7 | 2 | 6 | Small |
| Example F7 | 1 | 0 | 1 | 3 | 1 | 4 | Small |
| Example F8 | 1 | 0 | 1 | 13 | 2 | 19 | Small |
| Example F9 | 0 | 0 | 1 | 2 | 0 | 2 | Small |
| Example F10 | 0 | 0 | 1 | 2 | 0 | 1 | Small |
| Comparative Example F2 | 9 | 2 | 19 | 19 | 3 | 28 | Medium |

Examples G

Table 20 shows specifications such as a workpiece material (machining process material) used in each of Examples G and Comparative Examples G, each component used in the production of a lubricant sheet for assisting machining process, an adhesive layer, a drill bit used in the drilling work, a drilling work instrument, and an apparatus used in evaluation.

TABLE 20

| Category | Notation in table | Name | Trade name/ model | Manufacturer | Remarks |
|---|---|---|---|---|---|
| Workpiece material | Ti | Titanium alloy plate | Ti—6Al—4V | — | Thickness: 20 mmt, equivalent material intended for aircrafts |
| | CFRP | Carbon fiber reinforced plastic plate | — | Ibaraki Industry Corp. | Thickness: 20 mmt, quasi-isotropic laminated equivalent material intended for aircrafts (UD material) |

TABLE 20-continued

| Category | Notation in table | Name | Trade name/ model | Manufacturer | Remarks |
|---|---|---|---|---|---|
| High molecular weight compound (A) | A-1 | Polyethylene oxide | Alkox E-45 | Meisei Chemical Works, Ltd. | Mw = 5.6 × 10$^5$ |
| | A-2 | Polyethylene oxide | Alkox R-150 | Meisei Chemical Works, Ltd. | Mw = 1.5 × 10$^5$ |
| Medium molecular weight compound (B) | B-1 | Polyoxyethylene monostearate | Nonion S-40 | NOF Corp. | Mw = 3.5 × 10$^3$ |
| Carbon (C) | C-1 | Carbon (graphite) | XD100 | Ito Graphite Co., Ltd. | Flake shape, average particle size = 250 μm |
| | C-2 | Carbon (graphite) | X-100 | Ito Graphite Co., Ltd. | Flake shape, average particle size = 60 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Drill bit | — | Cemented carbide drill | RG-GDN | OSG Corp. | Diameter: 17.78 mmϕ Point angle: 120° Angle of twist: 40° Solid drill, not diamond coated |
| Drilling work instrument | — | Machining center | M-V5B | Mitsubishi Electric Corp. | — |

\* The Vickers hardness of Ti—6Al—4V was 320.

The average particle size (median diameter) of the carbon (C) and the weight average molecular weights of the high molecular weight compound (A) and the medium molecular weight compound (B) were measured in the same way as in Examples A.

Example G1

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD-100 manufactured by Ito Graphite Co., Ltd.) as the carbon (C) were molded at a temperature of 140° C. using a single screw extruder to produce a sheet having a thickness of 1.0 mm. The strongly adhesive face of double faced tape having a thickness of 0.12 mm (No. 535A, manufactured by Nitto Denko Corp.) was affixed to one side of the sheet to produce lubricant sheet for assisting machining process a.

The face with the adhesive layer formed thereon of the produced lubricant sheet for assisting machining process a was affixed to a portion to be the entry (entry portion) of the machining tool (cemented carbide drill), in the workpiece material. The lubricant sheet for assisting machining process and the workpiece material were fixed to the drilling work instrument using a jig. The machining process with the cemented carbide drill was performed under the conditions shown in Table 22. Table 22 shows results of evaluating chippings and burrs at the periphery of a processed hole on the entrance side and the exit side of the drill bit, and the abrasion of the point of the drill bit.

Examples G2 to G7

Each sheet was produced using a single screw extruder according to the resin composition of the high molecular weight compound (A), the medium molecular weight compound (B), and the carbon (C), and the thickness shown in Table 21 in the same way as in Example G1. The strongly adhesive face of double faced tape having a thickness of 0.12 mm (No. 535A, manufactured by Nitto Denko Corp.) was affixed to one side of the sheet to produce lubricant sheet for assisting machining process b to e.

In Examples G2 to G5, each of the produced lubricant sheet for assisting machining process b to e was affixed to a portion to be the entry (entry portion) of the machining tool (cemented carbide drill), in the workpiece material in the same way as in Example G1. The lubricant sheet for assisting machining process and the workpiece material were fixed to the drilling work instrument using a jig.

In Examples G6 and G7, the produced lubricant sheet for assisting machining process b and b or d and b were affixed to a portion to be the entry (entry portion) and a portion to be the exit (exit portion), respectively, of the machining tool (cemented carbide drill), in the workpiece material. The lubricant sheet for assisting machining process and the workpiece material were fixed using a jig.

In Examples G8 and G9, a composite of CFRP and Ti (CFRP/Ti) was used as the workpiece material, and the lubricant sheet for assisting machining process c or d was used. In Examples G8 and G9, the lubricant sheet for assisting machining process and the composite were laminated in the order of lubricant sheet for assisting machining process/CFRP/Ti/lubricant sheet for assisting machining process, and the drilling work was performed from the CFRP side.

The drilling work with the cemented carbide drill was performed under the conditions shown in Table 22. Table 22 shows results of evaluating the number of holes that were processable by the machining process (the number of processable holes), chippings and burrs at the periphery of a processed hole on the entrance side and the exit side of the drill bit at the number of holes processed by the machining process, and the abrasion of the point of the drill bit.

Comparative Example G1

In Comparative Example G1, the drilling work with the cemented carbide drill was performed under the conditions shown in Table 22 in the same way as in Example G1 except that no lubricant sheet for assisting machining process was used.

In Comparative Example G2, the drilling work with the cemented carbide drill was performed under the conditions shown in Table 22 in the same way as in Example G8 except that no lubricant sheet for assisting machining process was used.

Table 22 shows results of evaluating the number of holes that were processable by the machining process (the number of processable holes), chippings and burrs at the periphery of a processed hole on the entrance side and the exit side of the drill bit at the number of holes processed by the machining process, and the abrasion of the point of the drill bit.

[Evaluation: The Number of Processable Holes, Chippings, and Burrs]

In Examples G and Comparative Examples G, the number of holes where burrs and chippings occurred at the periphery of a processed hole at the drill bit entrance and exit was visually counted using a ×10 loupe. Criteria for the evaluation of the number of processable holes, burrs, and chippings were as described below.
(Evaluation Criteria)

The number of processable holes: the machining process was terminated when the breakage, abnormal noise, or ignition of the drill bit arose during the machining process. The number of holes processed before the termination was used as the number of processable holes.

Chippings: concave portions that occurred at the drill bit entrance and the drill bit exit.

Burrs: protrusions that occurred around the drill bit exit when the machining tool passed from the drill bit entrance toward the drill bit exit. The ambient temperature of a processed hole was elevated due to friction so that the metal at the periphery of the processed hole was softened to thereby facilitate the occurrence of large burrs.

Splintering: phenomenon in which a part of fiber constituting a fiber reinforced composite material remained as burrs around processed holes without being cut off.

Figure 29:
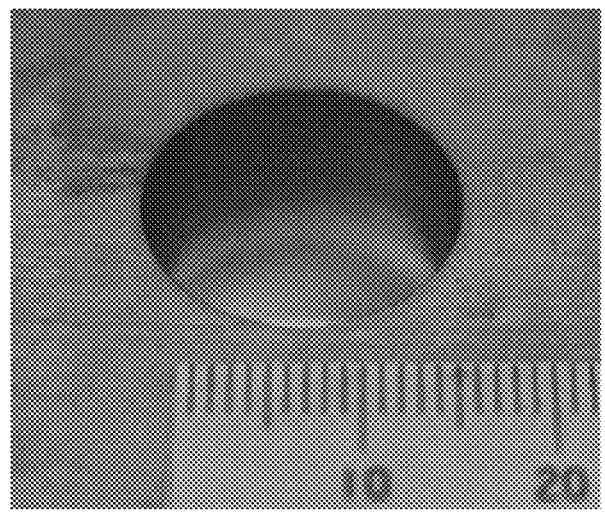
FIG. 29 shows a photograph of a machined portion (processed hole) at a drill bit entrance after processing of titanium alloy in Example G2.
Figure 30:
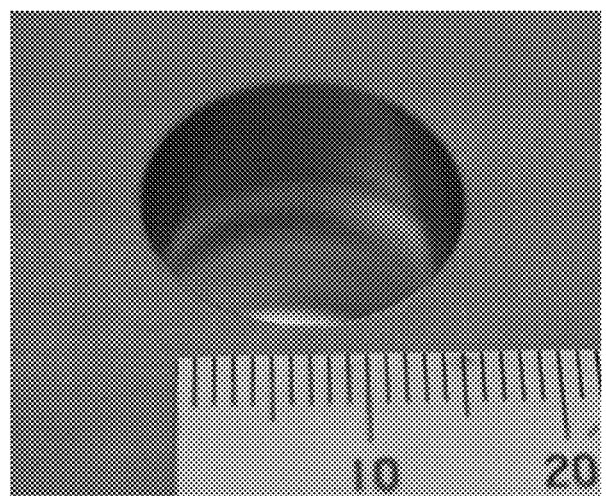
FIG. 30 shows a photograph of a machined portion (processed hole) at a drill bit exit after processing of titanium alloy in Example G2.

FIG. 29 shows a photograph of the drill bit entrance after the processing of the titanium alloy in Example G2. FIG. 30 shows a photograph of the drill bit exit after the processing of the titanium alloy in Example G2. As shown in FIGS. 29 and 30, it was evident that a favorable processed hole was formed at the drill bit entrance and exit in Example G2.

Figure 31:
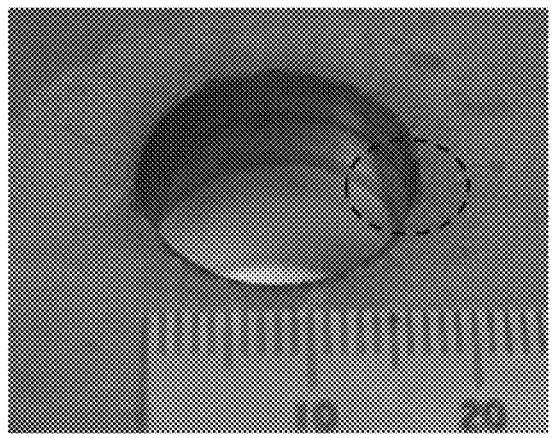
FIG. 31 shows a photograph of a machined portion (processed hole) at a drill bit entrance after processing of titanium alloy in Comparative Example G1.
Figure 32:
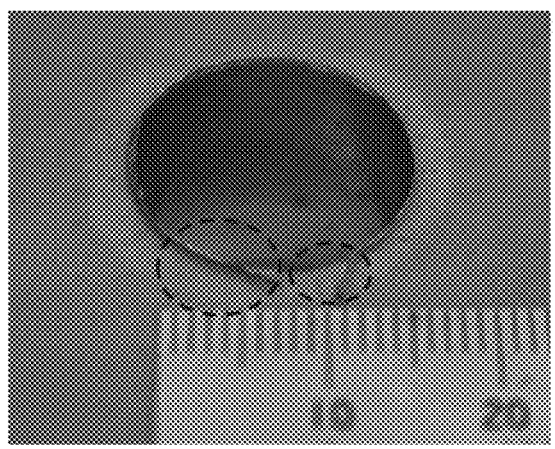
FIG. 32 shows a photograph of a machined portion (processed hole) at a drill bit exit after processing of titanium alloy in Comparative Example G1.

FIG. 31 shows a photograph of the drill bit entrance after the processing of the titanium alloy in Comparative Example G1. FIG. 32 shows a photograph of the drill bit exit after the processing of the titanium alloy in Comparative Example G1. As shown in FIGS. 31 and 32, it was evident that burrs and chippings occurred on the edge of a processed hole at the drill bit entrance, and chippings occurred on the edge of a processed hole at the drill bit exit, in Comparative Example G1.

[Evaluation: Abrasion of Point of Drill Bit]

In Examples G and Comparative Examples G, the abrasion of the point of the drill bit after opening of holes according to the number of processed holes of Table 22 was visually evaluated using a ×10 loupe from the drill bit point direction. The ratio of the area of No. 2 face of a drill bit (cemented carbide drill, RG-GDN, manufactured by OSG Corp.) after use (after abrasion) to the area (100%) of the No. 2 face of the drill bit in an unused fresh state was confirmed, and the abrasion of the point of the drill bit was evaluated according to evaluation criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.

[Evaluation: Amount of Components of Lubricant for Machining Process and Adhesive Layer Attached to Workpiece Material]

After the processing, the lubricant sheet for machining process was peeled off from the workpiece material, and the amount of components of the lubricant for machining process and the adhesive layer attached to the workpiece material was confirmed by the solution extraction method. Specifically, the workpiece material after peeling off of the lubricant sheet for machining process was dipped in ultrapure water. Then, only the solvent was concentrated, followed by decomposition with hydrobromic acid. Polyethylene oxide was quantitatively analyzed to confirm the amount of components of the lubricant for machining process and the adhesive layer. As a result, in Examples E, the amount of components attached was $3 \times 10^{-9}$ to $4 \times 10^{-9}$ g per mm$^2$ of a total of the area of the contact portion between the workpiece material and the lubricant material for assisting machining process and the area of the machined portion.

TABLE 21

| Name of lubricant sheet for assisting machining process | High molecular weight compound (A) A-1 part by mass | High molecular weight compound (A) A-2 part by mass | Medium molecular weight compound (B) B-1 part by mass | Carbon (C) C-1 part by mass | Carbon (C) C-2 part by mass | Average particle size μm | Thickness mm | Adhesive layer |
|---|---|---|---|---|---|---|---|---|
| a | 24 | 24 | 47 | 5 | | 250 | 1 | Present |
| b | 15 | 15 | 35 | 35 | | 250 | 1 | Present |
| c | 15 | 15 | 35 | 35 | | 250 | 2 | Present |
| d | 15 | 15 | 35 | 35 | | 250 | 5 | Present |
| e | 0 | 10 | 40 | | 50 | 60 | 1 | Present |

TABLE 22

| Category | Name and placement of lubricant sheet for assisting machining process — Entry portion | Name and placement of lubricant sheet for assisting machining process — Exit portion | Workpiece material Material/configuration | Workpiece material Thickness mm | Drill bit diameter mmφ | The number of rotations rpm | Moving speed mm/min | The number of processed holes |
|---|---|---|---|---|---|---|---|---|
| Example G1 | a | None | Ti | 20 | 17.78 | 200 | 25 | 3 |
| Example G2 | b | None | Ti | 20 | 17.78 | 200 | 25 | 3 |
| Example G3 | c | None | Ti | 20 | 17.78 | 200 | 25 | 6 |
| Example G4 | d | None | Ti | 20 | 17.78 | 200 | 25 | 10 |
| Example G5 | e | None | Ti | 20 | 17.78 | 200 | 25 | 1 |
| Example G6 | b | b | Ti | 20 | 17.78 | 200 | 25 | 8 |
| Example G7 | d | b | Ti | 20 | 17.78 | 200 | 25 | 14 |
| Example G8 | c | None | CFRP/Ti | 20/20 | 17.78 | 500 | 25 | 5 |
| Example G9 | d | None | CFRP/Ti | 20/20 | 17.78 | 500 | 25 | 9 |
| Comparative Example G1 | None | None | Ti | 20 | 17.78 | 200 | 25 | 1 |
| Comparative Example G2 | None | None | CFRP/Ti | 20/20 | 17.78 | 500 | 25 | 1 |

| Category | Drill bit entrance Chippings holes | Drill bit entrance Burrs holes | Drill bit entrance Splintering holes | Drill bit exit Chippings holes | Drill bit exit Burrs holes | Drill bit exit Splintering holes | Abrasion of point of drill bit |
|---|---|---|---|---|---|---|---|
| Example G1 | 0 | 0 | — | 1 | 0 | — | Small |
| Example G2 | 0 | 0 | — | 0 | 0 | — | Small |
| Example G3 | 0 | 0 | — | 0 | 1 | — | Small |
| Example G4 | 0 | 0 | — | 0 | 1 | — | Small |
| Example G5 | 0 | 0 | — | 0 | 1 | — | Medium |
| Example G6 | 0 | 0 | — | 0 | 1 | — | Small |
| Example G7 | 0 | 0 | — | 0 | 1 | — | Small |
| Example G8 | 0 | 0 | 0 | 1 | 1 | — | Small |
| Example G9 | 0 | 0 | 0 | 1 | 1 | — | Small |
| Comparative Example G1 | 1 | 0 | — | 1 | 1 | — | Large |
| Comparative Example G2 | 1 | 1 | 1 | 1 | 1 | — | Large |

Examples H

Table 23 shows specifications such as a workpiece material (machining process material) used in each of Examples H and Comparative Examples H, each component used in the production of a lubricant sheet for assisting machining process, an adhesive layer, a drill bit used in the drilling work, a machining process instrument, and an apparatus used in evaluation.

TABLE 23

| Category | Notation in table | Name | Trade name/ model | Manufacturer | Remarks |
|---|---|---|---|---|---|
| Workpiece material | CFRP | Carbon fiber reinforced plastic plate | — | Ibaraki Industry Corp. | Thickness: 5 mmt, quasi-isotropic laminated equivalent material intended for aircrafts (UD material) |
|  | Ti | Titanium alloy plate | Ti—6Al—4V | — | Thickness: 3 mmt, equivalent material intended for aircrafts |
|  | CFRP/Ti | Composite material of carbon fiber reinforced plastic plate and titanium alloy plate | — | — | Laminate of the Ti and the CFRP |
|  | CFRTP-1 | Carbon fiber reinforced plastic plate | TEPEX dynalite 202 (Carbon, PA6) | Bond Laminate Ltd. | Matrix resin: thermoplastic resin Thickness: 2 mmt CFRTP plate having a curved surface of R = 2 m |
|  | CFRTP-2 | Carbon fiber reinforced plastic plate | TEPEX dynalite 202 (Carbon, PA6) | Bond Laminate Ltd. | Matrix resin: thermoplastic resin Thickness: 2 mmt CFRTP plate having a curved surface of R = 1 m |
| High molecular weight compound (A) | A-1 | Polyethylene oxide | Alkox E-45 | Meisei Chemical Works, Ltd. | $Mw = 5.6 \times 10^5$ |
|  | A-2 | Polyethylene oxide | Alkox R150 | Meisei Chemical Works, Ltd. | $Mw = 1.5 \times 10^5$ |
| Medium molecular weight compound (B) | B-1 | Polyoxyethylene monostearate | Nonion S-40 | NOF Corp. | $Mw = 3.5 \times 10^3$ |
| Carbon (C) | C-1 | Carbon (graphite) | XD100 | Ito Graphite Co., Ltd. | Flake shape, average particle size = 250 μm |
|  | C-2 | Carbon (graphite) | XD150 | Ito Graphite Co., Ltd. | Flake shape, average particle size = 150 μm |
|  | C-3 | Carbon (graphite) | X-100 | Ito Graphite Co., Ltd. | Flake shape, average particle size = 60 μm |
|  | C-4 | Carbon (graphite) | RP99-150 | Ito Graphite Co., Ltd. | Flake shape, average particle size = 33 μm |
|  | C-5 | Carbon (graphite) | X-10 | Ito Graphite Co., Ltd. | Flake shape, average particle size = 10 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Aluminum foil with adhesive resin layer formed thereon | — | Aluminum foil | H18-1N30 | Mitsubishi Aluminum Co., Ltd. | Thickness: 0.15 mm |
|  | — | Adhesive polyester resin | VYLONAL MD-1200 | Toyobo Co. Ltd. | Polyester resin |
| Drill | — | Cemented carbide drill | RG-GDN | OSG Corp. | Diameter: 6.0 mmφ Point angle: 120° Angle of twist: 40° Solid drill, not diamond coated |
| Drilling work instrument | — | Machining center | M-V5B | Mitsubishi Electric Corp. | — |

The average particle size (median diameter) of the carbon (C) and the weight average molecular weights of the high molecular weight compound (A) and the medium molecular weight compound (B) were measured in the same way as in Examples A.

Example HA1

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD-100 manufactured by Ito Graphite Co., Ltd.) as the carbon (C) were molded at a temperature of 140° C. using a single screw extruder to produce a sheet having a thickness of 1.0 mm. The strongly adhesive face of double faced tape having a thickness of 0.12 mm (No. 535A, manufactured by Nitto Denko Corp.) was affixed to one side of the sheet to produce lubricant sheet for assisting machining process a. Table 24 shows the flexible volume, following properties, and tenacity of the lubricant sheet for assisting machining process a.

Examples HA2 to HA8

Each sheet was produced using a single screw extruder according to the resin composition of the high molecular weight compound (A), the medium molecular weight compound (B), and the carbon (C) shown in Table 24 in the same way as in Example HA1. The strongly adhesive face of double faced tape having a thickness of 0.12 mm (No. 535A, manufactured by Nitto Denko Corp.) was affixed to one side of the sheet to produce lubricant sheets b to h for machining process. Table 24 shows the flexible volume, following properties, and tenacity of the lubricant sheet for assisting machining process b to h.

Comparative Examples HA1 to HA5

Each sheet was produced using a single screw extruder according to the resin composition of the high molecular weight compound (A), the medium molecular weight compound (B), and the carbon (C) shown in Table 24 in the same way as in Example HA1 The strongly adhesive face of double faced tape having a thickness of 0.12 mm (No. 535A, manufactured by Nitto Denko Corp.) was affixed to one side of the sheet to produce lubricant sheet for assisting machining process i to m. Table 24 shows the flexible volume, following properties, and tenacity of the lubricant sheet for assisting machining process i to m.

Comparative Example HA6

A polyester resin layer having a thickness of 0.01 mm (VYLONAL MD-1200, manufactured by Toyobo Co., Ltd.) was formed as an adhesive resin layer on one side of an aluminum foil having a thickness of 0.15 mm (1N30-H18, manufactured by Mitsubishi Aluminum Co., Ltd.). The thus-prepared aluminum foils with the adhesive resin layer formed thereon (aluminum foils with the adhesive resin layer) and the lubricant sheet for assisting machining process i were laminated in the form of the lubricant sheet for assisting machining process i sandwiched by the aluminum foils with the adhesive resin layer, i.e., aluminum foil with the adhesive resin layer/lubricant sheet for assisting machining process i/aluminum foil with the adhesive resin layer. In this respect, the adhesive resin layer on the aluminum foil surface was placed in contact with the lubricant sheet for assisting machining process. These were integrally laminated by thermal lamination at a temperature of 150° C. using a lamination apparatus (OHL-2400, manufactured by ONC Inc.) to produce lubricant sheet for assisting machining process n.

Comparative Examples HA7 to HA9

Each sheet was produced using a single screw extruder according to the resin composition of the high molecular weight compound (A), the medium molecular weight compound (B), and the carbon (C) shown in Table 24 in the same way as in Example HA1 The strongly adhesive face of double faced tape having a thickness of 0.12 mm (No. 535A, manufactured by Nitto Denko Corp.) was affixed to one side of the sheet to produce lubricant sheet for assisting machining process o to q.

Examples HB1 to HB14

Each of the produced lubricant sheet for assisting machining process a to h was affixed to a portion to be the entry (entry portion) of the machining tool (cemented carbide drill), in the workpiece material. The lubricant sheet for assisting machining process and the workpiece material were fixed to the drilling work instrument using a jig. The drilling work with the cemented carbide drill was performed under the conditions shown in Table 25. Table 25 shows results of evaluating chippings, burrs, and splintering at the periphery of a processed hole on the entrance side and the exit side of the drill bit, and the abrasion of the point of the drill bit.

In Examples HB9 to HB12, a composite of CFRP and Ti was used as the workpiece material. In this respect, the lubricant sheet for assisting machining process and the composite were laminated in the form of lubricant sheet for machining process/CFRP/Ti, and the drilling work was performed from the lubricant sheet side for machining process.

In Examples HB13 and HB14, the produced lubricant sheet for assisting machining process b were affixed to a portion to be the entry (entry portion) and a portion to be the exit (exit portion) of the machining tool (cemented carbide drill), in CFRTP having a curved surface. The lubricant sheet for assisting machining process and the workpiece material were fixed to the drilling work instrument using a jig. The lubricant sheet for assisting machining process were excellent in following properties and tenacity and therefore attained close contact with the workpiece material.

Comparative Examples HB1 to HB7

In Comparative Examples HB1 to HB5, each of the produced lubricant sheet for assisting machining process i to m was affixed to the entry portion of the machining tool (cemented carbide drill), in the workpiece material in the same way as in Example HB1. The lubricant sheet for assisting machining process and the workpiece material were fixed to the drilling work instrument using a jig.

In Comparative Examples HB6 and HB7, the same operation as in Example HB13 was performed except that no lubricant sheet for assisting machining process was used.

The drilling work with the cemented carbide drill was performed under the conditions shown in Table 25. Table 25 shows results of evaluating chippings, burrs, and splintering at the periphery of a processed hole on the entrance side and the exit side of the drill bit, and the abrasion of the point of the drill bit. In Comparative Example HB5, the lubricant sheet for assisting machining process and the composite were laminated in the form of lubricant sheet for assisting machining process/CFRP/Ti, and the drilling work was performed from the lubricant sheet for assisting machining process side.

[Evaluation: Flexible Volume]

As shown in FIG. 5, lubricant sheet for assisting machining process X having a width of 30 mm and a length of 150 mm was fixed in a state protruding 100 mm to a holding jig. Then, load Z of 25 g was applied to the end portion of the assisting lubricant sheet X for machining process. Displacement Y from the position of the lubricant sheet for assisting machining process X without the load Z was used as the flexible volume of the lubricant sheet for assisting machining process. When the assisting lubricant sheet for machining process was cut off from the supporting point at which the lubricant sheet for assisting machining process was fixed with a holding jig, it was impossible to measure the flexible volume.

[Following Properties]

Figure 33:
FIG. 33 shows a photograph showing results of a tenacity test of Example HA2.
Figure 34:
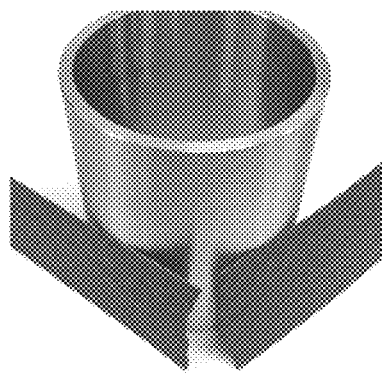
FIG. 34 shows a photograph showing results of a tenacity test of Comparative Example HA2.

The lubricant sheet for assisting machining process was wrapped around a cylinder having a diameter of 90 mm. The space between the lubricant sheet for assisting machining process and the cylinder was visually observed. The following properties were evaluated according to criteria described below. FIGS. 33 and 34 show photographs showing the following properties and tenacity test results of Example HA2 and Comparative Example HA2.

Excellent: the space between the lubricant sheet for assisting machining process and the cylinder was smaller than 1 mm.

Good: the space between the lubricant sheet for assisting machining process and the cylinder was 1 mm or larger and smaller than 5 mm.

Poor: the space between the lubricant sheet for assisting machining process and the cylinder was 5 mm or larger, or it was impossible to wrap the lubricant sheet for assisting machining process around the cylinder.

[Tenacity]

The lubricant sheet for assisting machining process was wrapped around a cylinder having a diameter of 90 mm. After 24 hours, the state of the lubricant sheet for assisting machining process was visually observed. The tenacity was evaluated according to evaluation criteria described below. FIGS. 33 and 34 show photographs showing the following properties and tenacity test results of Example HA2 and Comparative Example HA2.

Excellent: no crack occurred on the lubricant sheet for assisting machining process surface.

Good: smaller than 1 mm crack occurred on the lubricant sheet for assisting machining process surface.

Poor: the lubricant sheet for assisting machining process was ruptured or broken, or 1 mm or larger crack occurred on the lubricant sheet for assisting machining process surface.

[Evaluation: Chippings, Burrs, and Splintering]

In Examples H and Comparative Examples H, the number of holes where burrs, chippings, and splintering occurred at the periphery of a processed hole at the drill bit entrance and exit was visually counted using a ×10 loupe. Criteria for the evaluation of burrs, chippings, and splintering were as described below.

(Evaluation Criteria)

Burrs: protrusions that occurred around the drill bit exit when the machining tool passed from the drill bit entrance toward the drill bit exit. The drill bit becomes dull due to its abrasion to thereby facilitate the occurrence of large burrs.

Chippings: concave portions that occurred at the drill bit entrance and the drill bit exit.

Splintering: phenomenon in which a part of fiber constituting a fiber reinforced composite material remained as burrs around processed holes without being cut off.

[Evaluation: Abrasion of Point of Drill Bit]

In Examples H and Comparative Examples H, the abrasion of the point of the drill bit after opening of holes according to the number of processed holes of Table 25 was visually evaluated using a ×10 loupe from the drill bit point direction. The ratio of the area of No. 2 face of a drill bit (cemented carbide drill, RG-GDN, manufactured by OSG Corp.) after use (after abrasion) to the area (100%) of the No. 2 face of the drill bit in an unused fresh state was confirmed, and the abrasion of the point of the drill bit was evaluated according to evaluation criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.

[Evaluation: Amount of Components of Lubricant for Machining Process and Adhesive Layer Attached to Workpiece Material]

After the processing, the lubricant sheet for machining process was peeled off from the workpiece material, and the amount of components of the lubricant for machining process and the adhesive layer attached to the workpiece material was confirmed by the solution extraction method. Specifically, the workpiece material after peeling off of the lubricant sheet for machining process was dipped in ultrapure water. Then, only the solvent was concentrated, followed by decomposition with hydrobromic acid. Polyethylene oxide was quantitatively analyzed to confirm the amount of components of the lubricant for machining process and the adhesive layer. As a result, in Examples H, the amount of components attached was $3 \times 10^{-9}$ to $4 \times 10^{-9}$ g per mm$^2$ of a total of the area of the contact portion between the workpiece material and the lubricant material for assisting machining process and the area of the machined portion.

TABLE 24

| | | Composition | | | | | | | | |
|---|---|---|---|---|---|---|---|---|---|---|
| | | High molecular weight compound (A) | | Medium molecular weight compound (B) | Carbon (C) | | | | | |
| Name of lubricant sheet for assisting machining process | | A-1 part by mass | A-2 part by mass | B-1 part by mass | C-1 part by mass | C-2 part by mass | C-3 part by mass | C-4 part by mass | C-5 part by mass | Average particle size μm |
| Example HA1 | a | 24 | 24 | 47 | 5 | | | | | 250 |
| Example HA2 | b | 20 | 20 | 40 | 20 | | | | | 250 |
| Example HA3 | c | 17 | 17 | 33 | 33 | | | | | 250 |

TABLE 24-continued

| | | | | | | | | | |
|---|---|---|---|---|---|---|---|---|---|
| Example HA4 | d | 13 | 13 | 24 | 50 | | | | 250 |
| Example HA5 | e | 10 | 10 | 20 | 60 | | | | 250 |
| Example HA6 | f | 25 | 25 | 30 | 20 | | | | 250 |
| Example HA7 | g | 30 | 30 | 20 | 20 | | | | 250 |
| Example HA8 | h | 17 | 17 | 33 | | 33 | | | 150 |
| Comparative Example HA1 | i | 0 | 10 | 40 | | 50 | | | 60 |
| Comparative Example HA2 | j | 17 | 17 | 33 | | 33 | | | 60 |
| Comparative Example HA3 | k | 17 | 17 | 33 | | | 33 | | 33 |
| Comparative Example HA4 | l | 17 | 17 | 33 | | | | 33 | 10 |
| Comparative Example HA5 | m | 0 | 10 | 40 | | 50 | | | 60 |
| Comparative Example HA6 | n | 0 | 10 | 40 | | 50 | | | 60 |
| Comparative Example HA7 | o | 0 | 0 | 50 | 50 | | | | 250 |
| Comparative Example HA8 | p | 25 | 25 | 0 | 50 | | | | 250 |
| Comparative Example HA9 | q | 10 | 10 | 80 | | | | | — |

| | Name of lubricant sheet for assisting machining process | | Thickness mm | Adhesive layer | Flexible volume mm | Following properties — | Tenacity — |
|---|---|---|---|---|---|---|---|
| | Example HA1 | a | 1 | Present | 29 | Excellent | Excellent |
| | Example HA2 | b | 1 | Present | 22 | Excellent | Excellent |
| | Example HA3 | c | 1 | Present | 9 | Good | Good |
| | Example HA4 | d | 1 | Present | 7 | Good | Good |
| | Example HA5 | e | 1 | Present | 6 | Good | Good |
| | Example HA6 | f | 1 | Present | 25 | Excellent | Excellent |
| | Example HA7 | g | 1 | Present | 27 | Excellent | Excellent |
| | Example HA8 | h | 1 | Present | 37 | Excellent | Excellent |
| | Comparative Example HA1 | i | 1 | Present | Ruptured | Poor | Poor |
| | Comparative Example HA2 | j | 1 | Present | Ruptured | Poor | Poor |
| | Comparative Example HA3 | k | 1 | Present | Ruptured | Poor | Poor |
| | Comparative Example HA4 | l | 1 | Present | Ruptured | Poor | Poor |
| | Comparative Example HA5 | m | 5 | Present | Ruptured | Poor | Poor |
| | Comparative Example HA6 | n | 1.3 | Present | 0 | Poor | Poor |
| | Comparative Example HA7 | o | *1 | — | — | — | — |
| | Comparative Example HA8 | p | *2 | — | — | — | — |
| | Comparative Example HA9 | q | *3 | — | — | — | — |

*1: It was impossible to form a sheet due to too low a viscosity of the resin composition.
*2: It was impossible to form a sheet due to too high a viscosity of the resin composition.
*3: It was impossible to form a practical sheet because the sheet had no body and was fragile.

TABLE 25

| Category | Lubricant sheet for assisting machining process | | Workpiece material | | Processing conditions | | | The number of processed holes |
|---|---|---|---|---|---|---|---|---|
| | | | | | Drill | The number of | Moving | |
| | Name | Placement | Material/ configuration | Thickness mm | diameter mmφ | rotations rpm | speed mm/min | holes |
| Example HB1 | a | Entry portion | CFRP | 5 | 6 | 5000 | 500 | 100 |
| Example HB2 | b | Entry portion | CFRP | 5 | 6 | 5000 | 500 | 100 |
| Example HB3 | c | Entry portion | CFRP | 5 | 6 | 5000 | 500 | 100 |
| Example HB4 | d | Entry portion | CFRP | 5 | 6 | 5000 | 500 | 100 |
| Example HB5 | e | Entry portion | CFRP | 5 | 6 | 5000 | 500 | 100 |
| Example HB6 | f | Entry portion | CFRP | 5 | 6 | 5000 | 500 | 100 |
| Example HB7 | g | Entry portion | CFRP | 5 | 6 | 5000 | 500 | 100 |

TABLE 25-continued

| | | | | | | | | |
|---|---|---|---|---|---|---|---|---|
| Example HB8 | h | Entry portion | CFRP | 5 | 6 | 5000 | 500 | 100 |
| Example HB9 | a | Entry portion | CFRP/Ti | 5/3 | 6 | 1000 | 50 | 100 |
| Example HB10 | c | Entry portion | CFRP/Ti | 5/3 | 6 | 1000 | 50 | 100 |
| Example HB11 | e | Entry portion | CFRP/Ti | 5/3 | 6 | 1000 | 50 | 100 |
| Example HB12 | h | Entry portion | CFRP/Ti | 5/3 | 6 | 1000 | 50 | 100 |
| Example HB13 | b | Entry portion/Exit portion | CFRTP-1 | 1 | 6 | 5000 | 500 | 5 |
| Example HB14 | b | Entry portion/Exit portion | CFRTP-2 | 1 | 6 | 5000 | 500 | 5 |
| Comparative Example HB1 | i | Entry portion | CFRP | 5 | 6 | 5000 | 500 | 100 |
| Comparative Example HB2 | j | Entry portion | CFRP | 5 | 6 | 5000 | 500 | 100 |
| Comparative Example HB3 | k | Entry portion | CFRP | 5 | 6 | 5000 | 500 | 100 |
| Comparative Example HB4 | l | Entry portion | CFRP | 5 | 6 | 5000 | 500 | 100 |
| Comparative Example HB5 | m | Entry portion | CFRP/Ti | 5/3 | 6 | 1000 | 50 | 100 |
| Comparative Example HB6 | None | None | CFRTP-1 | 1 | 6 | 5000 | 500 | 5 |
| Comparative Example HB7 | None | None | CFRTP-2 | 1 | 6 | 5000 | 500 | 5 |

| Category | Drill bit entrance | | | Drill bit exit | | | Abrasion of point of drill bit |
|---|---|---|---|---|---|---|---|
| | Chippings /100 holes | Burrs /100 holes | Splintering /100 holes | Chippings /100 holes | Burrs /100 holes | Splintering /100 holes | |
| Example HB1 | 0 | 0 | 0 | 8 | 0 | 15 | Small |
| Example HB2 | 0 | 0 | 0 | 9 | 0 | 13 | Small |
| Example HB3 | 0 | 0 | 0 | 2 | 0 | 2 | Small |
| Example HB4 | 0 | 0 | 0 | 0 | 0 | 1 | Small |
| Example HB5 | 0 | 0 | 0 | 1 | 0 | 0 | Small |
| Example HB6 | 0 | 0 | 0 | 2 | 0 | 3 | Small |
| Example HB7 | 0 | 0 | 0 | 4 | 0 | 4 | Small |
| Example HB8 | 0 | 0 | 0 | 7 | 0 | 11 | Small |
| Example HB9 | 0 | 0 | 0 | 18 | 12 | — | Small |
| Example HB10 | 0 | 0 | 0 | 8 | 9 | — | Small |
| Example HB11 | 0 | 0 | 0 | 0 | 9 | — | Small |
| Example HB12 | 0 | 0 | 0 | 0 | 18 | — | Small |
| Example HB13 | 1 | 0 | 1 | 0 | 0 | 1 | Small |
| Example HB14 | 1 | 0 | 1 | 0 | 0 | 2 | Small |
| Comparative Example HB1 | 42 | 0 | 30 | 18 | 0 | 32 | Small |
| Comparative Example HB2 | 54 | 0 | 51 | 19 | 0 | 34 | Small |
| Comparative Example HB3 | 69 | 0 | 58 | 25 | 0 | 39 | Small |
| Comparative Example HB4 | 79 | 0 | 63 | 33 | 0 | 42 | Small |
| Comparative Example HB5 | 62 | 0 | 59 | 49 | 87 | 89 | Large |
| Comparative Example HB6 | 5 | 5 | 5 | 3 | 3 | 5 | Small |
| Comparative Example HB7 | 5 | 5 | 5 | 5 | 5 | 5 | Small |

Examples I

Table 26 shows specifications such as a workpiece material (machining process material) used in each of Examples I and Comparative Examples I, each component used in the production of a lubricant sheet for assisting machining process, an adhesive layer, a drill bit used in the machining process, a machining process instrument, and an apparatus used in evaluation.

TABLE 26

| Category | Notation in table | Name | Trade name/ model | Manufacturer | Remarks |
|---|---|---|---|---|---|
| Workpiece material | Ti | Titanium alloy plate | Ti—6Al—4V | — | Thickness: 3 mmt, equivalent material intended for aircrafts |

TABLE 26-continued

| Category | Notation in table | Name | Trade name/model | Manufacturer | Remarks |
|---|---|---|---|---|---|
| | CFRP | Carbon fiber reinforced plastic plate | — | Ibaraki Industry Corp. | Thickness: 5 mmt, quasi-isotropic laminated equivalent material intended for aircrafts (UD material) |
| | CFRP/Ti | Composite material of carbon fiber reinforced plastic plate and titanium alloy plate | — | — | Laminate of the Ti and the CFRP |
| High molecular weight compound (A) | A-1 | Polyethylene oxide | Alkox E-45 | Meisei Chemical Works, Ltd. | $Mw = 5.6 \times 10^5$ |
| | A-2 | Polyethylene oxide | Alkox R150 | Meisei Chemical Works, Ltd. | $Mw = 1.5 \times 10^5$ |
| Medium molecular weight compound (B) | B-1 | Polyoxyethylene monostearate | Nonion S-40 | NOF Corp. | $Mw = 3.5 \times 10^3$ |
| Carbon (C) | C-1 | Carbon (graphite) | XD100 | Ito Graphite Co., Ltd. | Flake shape, average particle size = 250 μm |
| | C-2 | Carbon (graphite) | XD150 | Ito Graphite Co., Ltd. | Flake shape, average particle size = 150 μm |
| | C-3 | Carbon (graphite) | X-100 | Ito Graphite Co., Ltd. | Flake shape, average particle size = 60 μm |
| Adhesive layer | — | Double faced tape | No. 535A | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Aluminum foil with adhesive resin layer formed thereon | — | Aluminum foil | H18-1N30 | Mitsubishi Aluminum Co., Ltd. | Thickness: 0.15 mm |
| | — | Adhesive polyester resin | VYLONAL MD-1200 | Toyobo Co. Ltd. | Polyester resin |
| Drill | — | Cemented carbide drill | RG-GDN | OSG Corp. | Diameter: 6.0 mmφ Point angle: 120° Angle of twist: 40° Solid drill, not diamond coated |
| Drilling work instrument | — | Machining center | M-V5B | Mitsubishi Electric Corp. | — |

*The Vickers hardness of Ti—6Al—4V was 320.

The average particle size (median diameter) of the carbon (C) and the weight average molecular weights of the high molecular weight compound (A) and the medium molecular weight compound (B) were measured in the same way as in Examples A.

Example IA1

24 parts by mass of polyethylene oxide (Alkox E-45 manufactured by Meisei Chemical Works, Ltd.) and 24 parts by mass of polyethylene oxide (Alkox R-150 manufactured by Meisei Chemical Works, Ltd.) as the high molecular weight compound (A), 47 parts by mass of polyethylene oxide monostearate (Nonion S-40 manufactured by NOF Corp.) as the medium molecular weight compound (B), and 5 parts by mass of graphite (XD-100 manufactured by Ito Graphite Co., Ltd.) as the carbon (C) were molded at a temperature of 140° C. using a single screw extruder to produce a sheet having a thickness of 1.0 mm. The strongly adhesive face of double faced tape having a thickness of 0.12 mm (No. 535A, manufactured by Nitto Denko Corp.) was affixed to one side of the sheet to produce lubricant sheet for assisting machining process a. Table 27 shows the flexible volume, following properties, and tenacity of the lubricant sheet for assisting machining process a.

Examples IA2 to IA4

Each sheet was produced using a single screw extruder according to the resin composition of the high molecular weight compound (A), the medium molecular weight compound (B), and the carbon (C) shown in Table 27 in the same way as in Example IA1. The strongly adhesive face of double faced tape having a thickness of 0.12 mm (No. 535A, manufactured by Nitto Denko Corp.) was affixed to one side of the sheet to produce lubricant sheets b to d for machining process. Table 27 shows the flexible volume, following properties, and tenacity of the lubricant sheet for assisting machining process b to d.

Comparative Examples IA1 and IA2

Each sheet was produced using a single screw extruder according to the resin composition of the high molecular weight compound (A), the medium molecular weight compound (B), and the carbon (C) shown in Table 27 in the same way as in Example IA1. The strongly adhesive face of double faced tape having a thickness of 0.12 mm (No. 535A, manufactured by Nitto Denko Corp.) was affixed to one side of the sheet to produce lubricant sheet for assisting machining process e and f. Table 27 shows the flexible volume, following properties, and tenacity of the lubricant sheet for assisting machining process e and f.

Comparative Example IA3

A polyester resin layer having a thickness of 0.01 mm (VYLONAL MD-1200, manufactured by Toyobo Co., Ltd.) was formed as an adhesive resin layer on one side of an aluminum foil having a thickness of 0.15 mm (1N30-H18, manufactured by Mitsubishi Aluminum Co., Ltd.). The thus-prepared aluminum foils with the adhesive resin layer formed thereon (aluminum foils with the adhesive resin layer) and the lubricant sheet for assisting machining process e were laminated in the form of the lubricant sheet for assisting machining process e sandwiched by the aluminum foils, i.e., aluminum foil with the adhesive resin layer/lubricant sheet for assisting machining process e/aluminum foil with the adhesive resin layer. In this respect, the adhesive resin layer on the aluminum foil surface was placed in contact with the lubricant sheet for assisting machining process. These were integrally laminated by thermal lamination at a temperature of 150° C. using a lamination apparatus (OHL-2400, manufactured by ONC Inc.) to produce lubricant sheet for assisting machining process g.

Comparative Examples IA4 to IA6

Each sheet was produced using a single screw extruder according to the resin composition of the high molecular weight compound (A), the medium molecular weight compound (B), and the carbon (C) shown in Table 27 in the same way as in Example IA1. The strongly adhesive face of double faced tape having a thickness of 0.12 mm (No. 535A, manufactured by Nitto Denko Corp.) was affixed to one side of the sheet to produce lubricant sheet for assisting machining process h to j.

Examples IB1 to IB8

Each of the produced lubricant sheet for assisting machining process a to d was affixed to a portion to be the entry (entry portion) of the machining tool (cemented carbide drill), in the workpiece material. The lubricant sheet for assisting machining process and the workpiece material were fixed to the drilling work instrument using a jig. The drilling work with the cemented carbide drill was performed under the conditions shown in Table 28. Table 28 shows results of evaluating chippings, burrs, and splintering at the periphery of a processed hole on the entrance side and the exit side of the drill bit, and the abrasion of the point of the drill bit.

In Examples IB5 to IB8, a composite of CFRP and Ti was used. In this respect, the lubricant sheet for assisting machining process and the composite were laminated in the form of lubricant sheet for machining process/CFRP/Ti, and the drilling work was performed from the lubricant sheet side for machining process.

Comparative Examples IB1 and IB2

Each of the produced lubricant sheet for assisting machining process e and f was affixed to the entry portion of the machining tool (cemented carbide drill), in the workpiece material in the same way as in Example IB1. The lubricant sheet for assisting machining process and the workpiece material were fixed to the drilling work instrument using a jig. The drilling work with the cemented carbide drill was performed under the conditions shown in Table 28. Table 28 shows results of evaluating chippings, burrs, and splintering at the periphery of a processed hole on the entrance side and the exit side of the drill bit, and the abrasion of the point of the drill bit. In Comparative Example IB2, the lubricant sheet for assisting machining process and the composite were laminated in the form of lubricant sheet for assisting machining process/CFRP/Ti, and the drilling work was performed from the lubricant sheet for assisting machining process side.

[Evaluation: Flexible Volume]

As shown in FIG. 5, lubricant sheet for assisting machining process X having a width of 30 mm and a length of 150 mm was fixed in a state protruding 100 mm to a holding jig. Then, load Z of 25 g was applied to the end portion of the assisting lubricant sheet X for machining process. Displacement Y from the position of the lubricant sheet for assisting machining process X without the load Z was used as the flexible volume of the lubricant sheet for assisting machining process. When the assisting lubricant sheet for machining process was cut off from the supporting point at which the lubricant sheet for assisting machining process was fixed with a holding jig, it was impossible to measure the flexible volume.

[Following Properties]

The lubricant sheet for assisting machining process was wrapped around a cylinder having a diameter of 90 mm. The space between the lubricant sheet for assisting machining process and the cylinder was visually observed. The following properties were evaluated according to evaluation criteria described below.

Excellent: the space between the lubricant sheet for assisting machining process and the cylinder was smaller than 1 mm.

Good: the space between the lubricant sheet for assisting machining process and the cylinder was 1 mm or larger and smaller than 5 mm.

Poor: the space between the lubricant sheet for assisting machining process and the cylinder was 5 mm or larger, or it was impossible to wrap the lubricant sheet for assisting machining process around the cylinder.

[Tenacity]

Figure 35:
FIG. 35 shows a photograph showing results of a tenacity test of Example IA2.
Figure 36:
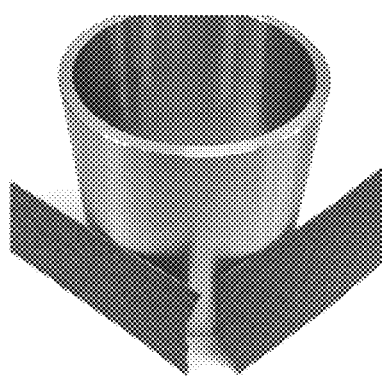
FIG. 36 shows a photograph showing results of a tenacity test of Comparative Example IA1.

The lubricant sheet for assisting machining process was wrapped around a cylinder having a diameter of 90 mm. After 24 hours, the state of the lubricant sheet for assisting machining process was visually observed. The tenacity was evaluated according to evaluation criteria described below. FIGS. 35 and 36 show photographs showing the following properties and tenacity test results of Example IA2 and Comparative Example IA1.

Excellent: no crack occurred on the lubricant sheet for assisting machining process surface.

Good: smaller than 1 mm crack occurred on the lubricant sheet for assisting machining process surface.

Poor: the lubricant sheet for assisting machining process was ruptured or broken, or 1 mm or larger crack occurred on the lubricant sheet for assisting machining process surface.
[Evaluation: Chippings, Burrs, and Splintering]

In Examples I and Comparative Examples I, the number of holes where burrs, chippings, and splintering occurred at the periphery of a processed hole at the drill bit entrance and exit was visually counted using a ×10 loupe. Criteria for the evaluation of burrs, chippings, and splintering were as described below.
(Evaluation Criteria)

Burrs: protrusions that occurred around the drill bit exit when the machining tool passed from the drill bit entrance toward the drill bit exit. The ambient temperature of a processed hole was elevated due to friction so that the metal at the periphery of the processed hole was softened to thereby facilitate the occurrence of large burrs.

Chippings: concave portions that occurred at the drill bit entrance and the drill bit exit.

Splintering: phenomenon in which a part of fiber constituting a fiber reinforced composite material remained as burrs around processed holes without being cut off.
[Evaluation: Abrasion of Point of Drill Bit]

In Examples I and Comparative Examples I, the abrasion of the point of the drill bit after opening of holes according to the number of processed holes of Table 28 was visually evaluated using a ×10 loupe from the drill bit point direction. The ratio of the area of No. 2 face of a drill bit (cemented carbide drill, RG-GDN, manufactured by OSG Corp.) after use (after abrasion) to the area (100%) of the No. 2 face of the drill bit in an unused fresh state was confirmed, and the abrasion of the point of the drill bit was evaluated according to evaluation criteria described below. FIG. 6 shows a schematic diagram of the drill bit viewed from the drill bit point direction.

Large: less than 80% of the area of the No. 2 face remained.

Medium: less than 95% and 80% or more of the area of the No. 2 face remained.

Small: 95% or more of the area of the No. 2 face remained.
[Evaluation: Amount of Components of Lubricant for Machining Process and Adhesive Layer Attached to Workpiece Material]

After the processing, the lubricant sheet for machining process was peeled off from the workpiece material, and the amount of components of the lubricant for machining process and the adhesive layer attached to the workpiece material was confirmed by the solution extraction method. Specifically, the workpiece material after peeling off of the lubricant sheet for machining process was dipped in ultra-pure water. Then, only the solvent was concentrated, followed by decomposition with hydrobromic acid. Polyethylene oxide was quantitatively analyzed to confirm the amount of components of the lubricant for machining process and the adhesive layer. As a result, in Examples I, the amount of components attached was $3 \times 10^{-9}$ to $4 \times 10^{-9}$ g per $mm^2$ of a total the area of the contact portion between the workpiece material and the lubricant material for assisting machining process and the area of the machined portion.

TABLE 27

| Name of lubricant sheet for assisting machining process | | High molecular weight compound (A) A-1 part by mass | High molecular weight compound (A) A-2 part by mass | Medium molecular weight compound (B) B-1 part by mass | Carbon (C) C-1 part by mass | Carbon (C) C-2 part by mass | Carbon (C) C-3 part by mass | Average particle size μm | Thickness mm | Adhesive layer | Flexible volume mm | Flexibility | Following properties |
|---|---|---|---|---|---|---|---|---|---|---|---|---|---|
| Example IA1 | a | 24 | 24 | 47 | 5 | | | 250 | 1 | Present | 29 | Excellent | Excellent |
| Example IA2 | b | 17 | 17 | 33 | 33 | | | 250 | 1 | Present | 9 | Good | Good |
| Example IA3 | c | 10 | 10 | 20 | 60 | | | 250 | 1 | Present | 6 | Good | Good |
| Example IA4 | d | 17 | 17 | 33 | | 33 | | 150 | 1 | Present | 37 | Excellent | Excellent |
| Comparative Example IA1 | e | 0 | 10 | 40 | | | 50 | 60 | 1 | Present | Ruptured | Poor | Poor |
| Comparative Example IA2 | f | 0 | 10 | 40 | | | 50 | 60 | 5 | Present | Ruptured | Poor | Poor |
| Comparative Example IA3 | g | 0 | 10 | 40 | | | 50 | 60 | 1.3 | Present | 0 | Poor | Poor |
| Comparative Example IA4 | h | 0 | 0 | 50 | 50 | | | 250 | *1 | — | — | — | — |
| Comparative Example IA5 | i | 25 | 25 | 0 | 50 | | | 250 | *2 | — | — | — | — |
| Comparative Example IA6 | j | 10 | 10 | 80 | | | | — | *3 | — | — | — | — |

*1: It was impossible to form a sheet due to too low a viscosity of the resin composition.
*2: It was impossible to form a sheet due to too high a viscosity of the resin composition.
*3: It was impossible to form a practical sheet because the sheet had no body and was fragile.

TABLE 28

| Category | Lubricant sheet for assisting machining process Name | Lubricant sheet for assisting machining process Placement | Workpiece material Material/configuration | Workpiece material Thickness mm | Processing conditions Drill diameter mmφ | Processing conditions The number of rotations rpm | Processing conditions Moving speed mm/min | Processing conditions The number of processed holes holes |
|---|---|---|---|---|---|---|---|---|
| Example IB1 | a | Entry portion | Ti | 3 | 6 | 500 | 25 | 100 |
| Example IB2 | b | Entry portion | Ti | 3 | 6 | 500 | 25 | 100 |
| Example IB3 | c | Entry portion | Ti | 3 | 6 | 500 | 25 | 100 |
| Example IB4 | d | Entry portion | Ti | 3 | 6 | 500 | 25 | 100 |
| Example IB5 | a | Entry portion | CFRP/Ti | 5/3 | 6 | 1000 | 50 | 100 |
| Example IB6 | b | Entry portion | CFRP/Ti | 5/3 | 6 | 1000 | 50 | 100 |
| Example IB7 | c | Entry portion | CFRP/Ti | 5/3 | 6 | 1000 | 50 | 100 |
| Example IB8 | d | Entry portion | CFRP/Ti | 5/3 | 6 | 1000 | 50 | 100 |
| Comparative Example IB1 | e | Entry portion | Ti | 3 | 6 | 500 | 25 | 100 |
| Comparative Example IB2 | f | Entry portion | CFRP/Ti | 5/3 | 6 | 1000 | 50 | 100 |

| Category | Drill bit entrance Chippings /100 holes | Drill bit entrance Burrs /100 holes | Drill bit entrance Splintering /100 holes | Drill bit exit Chippings /100 holes | Drill bit exit Burrs /100 holes | Drill bit exit Splintering /100 holes | Abrasion of point of drill bit |
|---|---|---|---|---|---|---|---|
| Example IB1 | 0 | 0 | — | 0 | 9 | — | Small |
| Example IB2 | 0 | 0 | — | 0 | 6 | — | Small |
| Example IB3 | 0 | 0 | — | 0 | 4 | — | Small |
| Example IB4 | 0 | 0 | — | 0 | 10 | — | Small |
| Example IB5 | 0 | 0 | 0 | 18 | 12 | — | Small |
| Example IB6 | 0 | 0 | 0 | 8 | 9 | — | Small |
| Example IB7 | 0 | 0 | 0 | 0 | 9 | — | Small |
| Example IB8 | 0 | 0 | 0 | 0 | 18 | — | Small |
| Comparative Example IB1 | 10 | 0 | — | 9 | 80 | — | Medium |
| Comparative Example IB2 | 62 | 0 | 59 | 49 | 87 | 89 | Large |

The present application is based on Japanese Patent Application No. 2015-156386 filed with the Japan Patent Office on Aug. 6, 2015, the contents of which are incorporated herein by reference. Also, the present application is based on Japanese Patent Application No. 2015-217797 filed with the Japan Patent Office on Nov. 5, 2015, the contents of which are incorporated herein by reference. Further, the present application is based on Japanese Patent Application No. 2015-217799 filed with the Japan Patent Office on Nov. 5, 2015, the contents of which are incorporated herein by reference. Further, the present application is based on Japanese Patent Application No. 2015-221629 filed with the Japan Patent Office on Nov. 11, 2015, the contents of which are incorporated herein by reference. Further, the present application is based on Japanese Patent Application No. 2015-221031 filed with the Japan Patent Office on Nov. 11, 2015, the contents of which are incorporated herein by reference. Further, the present application is based on Japanese Patent Application No. 2015-221630 filed with the Japan Patent Office on Nov. 11, 2015, the contents of which are incorporated herein by reference. Further, the present application is based on Japanese Patent Application No. 2015-221032 filed with the Japan Patent Office on Nov. 11, 2015, the contents of which are incorporated herein by reference. Further, the present application is based on Japanese Patent Application No. 2015-219830 filed with the Japan Patent Office on Nov. 9, 2015, the contents of which are incorporated herein by reference. Further, the present application is based on Japanese Patent Application No. 2015-219832 filed with the Japan Patent Office on Nov. 9, 2015, the contents of which are incorporated herein by reference.

In the machining process of a workpiece material, particularly, a difficult-to-machining material, the lubricant material for assisting machining process of the present invention has industrial applicability as a sheet that improves the processing quality thereof and reduces processing cost.

REFERENCE SIGNS LIST

1 . . . Workpiece material
2 . . . Lubricant material for assisting machining process
3 . . . Machining tool X ... Lubricant sheet for assisting machining process
Y ... Displacement
Z ... Load

The invention claimed is:

1. A lubricant material for assisting machining process comprising:
   a high molecular weight compound (A) having a weight average molecular weight of $5\times10^4$ or higher and $1\times10^6$ or lower;
   a medium molecular weight compound (B) having a weight average molecular weight of $1\times10^3$ or higher and lower than $5\times10^4$; and
   a carbon (C) having an average particle size of 100 μm or larger.

2. The lubricant material for assisting machining process according to claim 1, wherein
   the lubricant material for assisting machining process is used in a machining method comprising a machining step of machining a workpiece material with a machining tool while bringing the lubricant material for assisting machining process into contact with the machining tool and/or the to-be-processed portion of the workpiece material.

3. The lubricant material for assisting machining process according to claim 1, wherein
   a shape of the carbon (C) is a flake shape.

4. The lubricant material for assisting machining process according to claim 1, wherein
   the high molecular weight compound (A) is a thermoplastic resin having a weight average molecular weight of $5\times10^4$ or higher and $1\times10^6$ or lower, and
   the medium molecular weight compound (B) is a thermoplastic resin having a weight average molecular weight of $1\times10^3$ or higher and $2\times10^4$ or lower.

5. The lubricant material for assisting machining process according to claim 1, wherein
   the high molecular weight compound (A) comprises a water soluble thermoplastic resin and/or a non-water soluble thermoplastic resin, wherein
   the water soluble thermoplastic resin is one or more resins selected from the group consisting of a polyalkylene oxide compound, a polyalkylene glycol compound, an ester compound of polyalkylene glycol, an ether compound of polyalkylene glycol, a monostearate compound of polyalkylene glycol, a water soluble urethane, a water soluble polyether resin, a water soluble polyester, sodium poly(meth)acrylate, polyacrylamide, polyvinylpyrrolidone, polyvinyl alcohol, saccharides, and modified polyamide, and
   the non-water soluble thermoplastic resin is one or more resins selected from the group consisting of a urethane polymer, an acrylic polymer, a vinyl acetate polymer, a vinyl chloride polymer, a polyester polymer, a polystyrene resin, and a copolymer thereof.

6. The lubricant material for assisting machining process according to claim 1, wherein
   the medium molecular weight compound (B) is one or more compounds selected from the group consisting of a polyalkylene glycol compound, a monoether compound of polyalkylene oxide, a monostearate compound of polyalkylene oxide, and a polyalkylene oxide compound.

7. The lubricant material for assisting machining process according to claim 1, wherein
   a content of the high molecular weight compound (A) is 20 to 60 parts by mass with respect to 100 parts by mass in total of the high molecular weight compound (A), the medium molecular weight compound (B), and the carbon (C),
   a content of the medium molecular weight compound (B) is 10 to 75 parts by mass with respect to 100 parts by mass in total of the high molecular weight compound (A), the medium molecular weight compound (B), and the carbon (C), and
   a content of the carbon (C) is 5 to 70 parts by mass with respect to 100 parts by mass in total of the high molecular weight compound (A), the medium molecular weight compound (B), and the carbon (C).

8. The lubricant material for assisting machining process according to claim 1, wherein
   the lubricant material for assisting machining process has a sheet shape having a thickness of 0.1 mm or larger and 20 mm or smaller.

9. The lubricant material for assisting machining process according to claim 1, wherein
   the lubricant material has a flexible volume of 5 mm or larger.

10. The lubricant material for assisting machining process according to claim 1, further comprising
    an adhesive layer on a face to be brought into contact with the workpiece material.

11. The lubricant material for assisting machining process according to claim 10, wherein
    the adhesive layer comprises an acrylic polymer.

12. The lubricant material for assisting machining process according to claim 1, wherein
    when the lubricant material for assisting machining process is removed from the workpiece material after machining the workpiece material, a total amount of components of the lubricant material for assisting machining process and the adhesive layer attached to the workpiece material is $1.0\times10^{-8}$ g or smaller per $mm^2$ of a total of the area of a contact portion between the workpiece material and the lubricant material for assisting machining process and the area of the machined portion.

13. A machining method comprising a machining step of forming a machined portion by machining a workpiece material with a machining tool while bringing a lubricant material for assisting machining process according to claim 1 into contact with the machining tool and/or the to-be-processed portion of the workpiece material, wherein the workpiece material comprises a fiber reinforced composite material, a difficult-to-machining metal material, or a composite material of the fiber reinforced composite material and the difficult-to-machining metal material.

14. The machining method according to claim 13, wherein
    the machining step is a step of forming a machined portion having an exit and an entrance of the machining tool, and
    the machining method comprises, before the machining step, a close contact step of closely bringing in advance the lubricant material for assisting machining process into contact with a portion to be an exit and/or a portion to be an entry of the machining tool, in the workpiece material.

15. The machining method according to claim 14, wherein
    in the close contact step, the lubricant material for assisting machining process is closely brought in advance into contact with a portion to be the exit of the machining tool, in the workpiece material.

16. The machining method according to claim 14, wherein
in the close contact step, the lubricant material for assisting machining process is closely brought in advance into contact with a portion to be the entry of the machining tool, in the workpiece material.

17. The machining method according to claim 13, wherein
the machining method comprises, before the machining step, a contact step of bringing in advance the lubricant material for assisting machining process into contact with the machining tool.

18. The machining method according to claim 13, wherein
in the machining step, the machined portion is formed by machining the workpiece material closely brought into contact with the lubricant material for assisting machining process in a state where another lubricant material for assisting machining process is brought into contact with the machining tool.

19. The machining method according to claim 13, wherein
a thickness of the workpiece material is 10 mm or larger.

20. The machining method according to claim 13, wherein
in the machining step, a hole is opened by drilling work using a drill as the machining tool.

21. The machining method according to claim 20, wherein
the diameter of the hole is 10 mm or larger.

22. The machining method according to claim 13, wherein
the fiber reinforced composite material is a carbon fiber reinforced plastic.

23. The machining method according to claim 13, wherein
the difficult-to-machining metal material comprises at least one member selected from the group consisting of titanium alloy, aluminum alloy, magnesium alloy, low alloy steel, stainless steel, and heat resistant alloy.

24. The machining method according to claim 23, wherein
the difficult-to-machining metal material is Ti-6Al-4V titanium alloy.

25. The machining method according to claim 13, wherein
the to-be-processed portion of the workpiece material has a curved surface.

* * * * *